US012689422B2

(12) United States Patent
Lee et al.

(10) Patent No.: US 12,689,422 B2
(45) Date of Patent: Jul. 21, 2026

(54) PARAMETER COMBINATION FOR COHERENT JOINT TRANSMISSION

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/406,019

(22) Filed: Jan. 5, 2024

(65) Prior Publication Data

US 2024/0275452 A1     Aug. 15, 2024

Related U.S. Application Data

(60) Provisional application No. 63/457,065, filed on Apr. 4, 2023, provisional application No. 63/453,367, filed
(Continued)

(51) Int. Cl.
H04B 7/06 (2006.01)
(52) U.S. Cl.
CPC ......... H04B 7/0626 (2013.01); H04B 7/0634 (2013.01); H04B 7/0639 (2013.01)
(58) Field of Classification Search
CPC .. H04B 7/0626; H04B 7/0634; H04B 7/0639; H04B 7/0469; H04B 7/048; H04B 7/024;
(Continued)

(56) References Cited

U.S. PATENT DOCUMENTS

2022/0210844 A1*   6/2022   MolavianJazi ....... H04L 5/0053
2024/0250728 A1*   7/2024   Hindy ................... H04L 5/0082

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.2.0, Jun. 2022, 250 pages.
(Continued)

*Primary Examiner* — Liem H. Nguyen

(57) ABSTRACT

Apparatuses and methods for subset restriction for parameter combination for coherent joint transmission in wireless networks. A method performed by a user equipment includes receiving information about a CSI report. The information includes codebook parameters $N_L \geq 1$ combinations of values of $\{L_1, \ldots, L_{N_{TRP}}\}$ from a first table and a value of $(p_v, \beta)$ from a second table. $\{L_1, \ldots, L_{N_{TRP}}\}$ is used to determine a number of first set of vectors associated with each of $N_{TRP}$ groups of ports, $N_{TRP}$ is a number $\geq 1$, $\beta$ is a parameter used to determine a maximum number of coefficients, and $p_v$ are parameters used to determine a second set of vectors. The method further includes determining the CSI report based on the information and transmitting the CSI report. The codebook parameters are configured based on a third table that links the first and second tables.

20 Claims, 19 Drawing Sheets

Table for {Ln}

| index | $N_{TRP}$ | $L_1$ | $L_2$ | $L_3$ | $L_4$ | $L_{max}$ |
|---|---|---|---|---|---|---|
| 1 | | 2 | | | | 2 |
| 2 | 1 | 4 | | | | 4 |
| 3 | | 6 | | | | 6 |
| 4 | | 2 | 2 | | | 4 |
| 5 | 2 | 2 | 4 | | | 6 |
| ⋮ | | ⋮ | ⋮ | ⋮ | ⋮ | ⋮ |

Linkage

Table for {pv, beta}

| Index | $L_{max}$ | $p_v$ | | $\beta$ |
|---|---|---|---|---|
| | | $v \in \{1,2\}$ | $v \in \{3,4\}$ | |
| 1 | 2 | 1/2 | 1/4 | 1/2 |
| 2 | 4 | 1/2 | 1/4 | 1/2 |
| 3 | 6 | 1/4 | 1/8 | 1/4 |
| 4 | 8 | 1/4 | 1/8 | 1/4 |
| ⋮ | ⋮ | ⋮ | ⋮ | ⋮ |

Related U.S. Application Data on Mar. 20, 2023, provisional application No. 63/451,466, filed on Mar. 10, 2023, provisional application No. 63/449,212, filed on Mar. 1, 2023, provisional application No. 63/448,800, filed on Feb. 28, 2023, provisional application No. 63/448,187, filed on Feb. 24, 2023, provisional application No. 63/447,829, filed on Feb. 23, 2023, provisional application No. 63/447,565, filed on Feb. 22, 2023, provisional application No. 63/446,732, filed on Feb. 17, 2023, provisional application No. 63/443,307, filed on Feb. 3, 2023, provisional application No. 63/439,782, filed on Jan. 18, 2023.

(58) Field of Classification Search
    CPC .... H04B 7/0456; H04B 7/063; H04B 7/0632; H04L 5/0023; H04L 5/0016; H04L 5/0053; H04L 5/0057; H04L 5/005
    See application file for complete search history.

(56) References Cited

OTHER PUBLICATIONS

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.2.0, Jun. 2022, 584 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022, 147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.2.0, Jun. 2022, 136 pages.

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

Samsung, "Feature lead summary for offline email discussion", 3GPP TSG RAN WG1 98, R1-1908499, Aug. 2019, 2 pages.

International Search Report and Written Opinion issued Apr. 30, 2024 regarding International Application No. PCT/KR2024/000770, 6 pages.

CATT, "CSI enhancement for high/medium UE velocities and coherent JT", 3GPP TSG-RAN WG1 #111, R1-2211169, Nov. 2022, 17 pages.

MediaTek Inc., "CSI enhancement" 3GPP TSG RAN WG1 #111, R1-2212232, Nov. 2022, 20 pages.

ZTE, "CSI enhancement for high/medium UE velocities and CJT", 3GPP TSG RAN WG1 Meeting #111, R1-2210937, Nov. 2022, 26 pages.

Samsung, "Views on CSI enhancements", 3GPP TSG RAN WG1 #111, R1-2212030, Nov. 2022, 31 pages.

* cited by examiner

500

600

700

Port layout in a panel $N_2$-1   × × × ×    ×

⋮

2$^{nd}$ dim.     × × × × ··· ×
             × × × ×    ×
      0 × × × ×    ×
        0             $N_1$-1

1$^{st}$ dim.

Single panel | Multi-panel $Ng = 1$        $Ng = 2$        $Ng = 4$

800

3D grid of beams in
($1^{st}$ port dim., $2^{nd}$ port dim., freq. dim.)

$O_3N_3$-1

Frequency dim.

$2^{nd}$ port dim.

$O_2N_2$-1

1

0

1

0

0   1   2

$O_1N_1$-1

$1^{st}$ port dim.

1000

Table for (pv, beta)

| Index | $L_{max}$ | $p_v$ $v \in \{1,2\}$ | $p_v$ $v \in \{3,4\}$ | $\beta$ |
|---|---|---|---|---|
| 1 | 2 | 1/2 | 1/4 | 1/2 |
| 2 | 4 | 1/2 | 1/4 | 1/2 |
| 3 | 6 | 1/4 | 1/8 | 1/4 |
| 4 | 8 | 1/4 | 1/8 | 1/4 |
| ... | ... | ... | ... | ... |

Linkage

Table for {Ln}

| Index | $N_{TRP}$ | $L_1$ | $L_2$ | $L_3$ | $L_4$ | $L_{max}$ |
|---|---|---|---|---|---|---|
| 1 | 1 | 2 | | | | 2 |
| 2 | | 4 | | | | 4 |
| 3 | | 6 | | | | 6 |
| 4 | 2 | 2 | 2 | | | 4 |
| 5 | | 2 | 4 | | | 6 |
| ... | | ... | ... | ... | ... | ... |

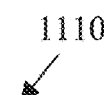
1110
Table for {Ln}
| Index | $N_{TRP}$ | $L_1$ | $L_2$ | $L_3$ | $L_4$ | $L_{max}$ |
|---|---|---|---|---|---|---|
| 1 | 1 | 2 | | | | 2 |
| 2 | | 4 | | | | 4 |
| 3 | | 6 | | | | 6 |
| 4 | 2 | 2 | 2 | | | 4 |
| 5 | | 2 | 4 | | | 6 |
| ⋮ | | ⋮ | ⋮ | ⋮ | ⋮ | ⋮ |
| | | | | | | |
Table for (pv, beta)
| Index | $p_v$ | | $\beta$ |
|---|---|---|---|
| | $v \in \{1,2\}$ | $v \in \{3,4\}$ | |
| 1 | 1/2 | 1/4 | 1/2 |
| 2 | 1/2 | 1/4 | 1/2 |
| 3 | 1/4 | 1/8 | 1/4 |
| 4 | 1/4 | 1/8 | 1/4 |
| ⋮ | ⋮ | ⋮ | ⋮ |
FIG. 11A
1120
| Index | $N_{TRP}$ | $L_1$ | $L_2$ | $L_3$ | $L_4$ |
|---|---|---|---|---|---|
| 1 | 1 | | | | |
| 2 | | | | | |
| 3 | | | | | |
| 4 | 2 | | | | |
| 5 | | | | | |
| ⋮ | | | | | |
| ⋮ | ⋮ | | | | |
FIG. 11B
1130
| Index | $L_1$ | $L_2$ | $L_3$ |
|---|---|---|---|
| 1 | | | |
| 2 | | | |
| 3 | | | |
| 4 | | | |
| 5 | | | |
| ⋮ | | | |
FIG. 11C
1140
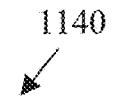
| Index | $N_{TRP}$ | $L_1$ | $L_2$ | $L_3$ | $L_4$ |
|---|---|---|---|---|---|
| 1 | 1 | | | | |
| 2 | | | | | |
| 3 | | | | | |
| 4 | 2 | | | | |
| 5 | | | | | |
| ⋮ | | | | | |
| ⋮ | ⋮ | | | | |
FIG. 11D

1200

1400

| | (pv, beta) [Ln] | (1/8, 1/8) | (1/8, 1/4) | (1/8, 1/2) | (1/8, 3/4) | (1/4, 1/8) | (1/4, 1/4) | (1/4, 1/2) | (1/4, 3/4) | (1/2, 1/8) | (1/2, 1/4) | (1/2, 1/2) | (1/2, 3/4) |
|---|---|---|---|---|---|---|---|---|---|---|---|---|---|
| Dynamic Rank up to 2 | | | | | | | | | | | | | |
| N_TRP=2 | (2,2) | 1 | 1 | 1 | | | | | | | | | |
| | (4,2) | 1 | 1 | 1 | | 1 | 1 | | | 1 | 1 | | |
| | (4,4) | 1 | 1 | 1 | 1 | | 1 | 1 | 1 | | 1 | | |
| N_TRP=3 | (2,2,2) | 1 | 1 | 1 | | | | | | | | | |
| | (4,2,2) | 1 | 1 | 1 | | | 1 | 1 | | 1 | 1 | | |
| | (4,4,2) | 1 | 1 | 1 | | | 1 | 1 | | | | | |
| | (4,4,4) | 1 | 1 | 1 | 1 | | 1 | 1 | 1 | | 1 | | |
| N_TRP=4 | (2,2,2,2) | 1 | 1 | 1 | | | | | | | | | |
| | (4,2,2,2) | 1 | 1 | 1 | | 1 | 1 | | | 1 | | | |
| | (4,4,2,2) | 1 | 1 | 1 | | | 1 | 1 | | | | | 1 |
| | (4,4,4,2) | 1 | 1 | 1 | | | 1 | | | | | | |
| | (4,4,4,4) | 1 | 1 | 1 | 1 | | | 1 | | | 1 | | |
| Dynamic Rank up to 4 | | | | | | | | | | | | | |
| N_TRP=2 | (2,2) | 1 | 1 | 1 | | | | | | | | | |
| | (4,2) | 1 | 1 | 1 | | 1 | 1 | | | 1 | 1 | | |
| | (4,4) | 1 | 1 | 1 | 1 | | 1 | 1 | 1 | | 1 | | |
| N_TRP=3 | (2,2,2) | 1 | 1 | 1 | | | | | | | | | |
| | (4,2,2) | 1 | 1 | 1 | | | 1 | 1 | | 1 | 1 | | |
| | (4,4,2) | 1 | 1 | 1 | | | 1 | 1 | | 1 | | 1 | |
| | (4,4,4) | 1 | 1 | 1 | 1 | | 1 | 1 | 1 | | 1 | | |
| N_TRP=4 | (2,2,2,2) | 1 | 1 | 1 | | | | | | | | | |
| | (4,2,2,2) | 1 | 1 | 1 | | 1 | 1 | | | 1 | 1 | | |
| | (4,4,2,2) | 1 | 1 | | | | 1 | | 1 | | 1 | | |
| | (4,4,4,2) | 1 | 1 | | | | 1 | | | | | | |
| | (4,4,4,4) | 1 | 1 | | 1 | | | 1 | | | 1 | | |
| | Total | 24 | 24 | 21 | 6 | 4 | 13 | 10 | 5 | 7 | 12 | 1 | 1 |
| | Rank | 1 | 1 | 3 | 8 | 10 | 4 | 6 | 9 | 7 | 5 | 11 | 11 |

PARAMETER COMBINATION FOR COHERENT JOINT TRANSMISSION

CROSS-REFERENCE TO RELATED APPLICATION AND CLAIM OF PRIORITY

This application claims priority under 35 U.S.C. § 119(e) to U.S. Provisional Patent Application No. 63/439,782 filed on Jan. 18, 2023, U.S. Provisional Patent Application No. 63/443,307 filed on Feb. 3, 2023, U.S. Provisional Patent Application No. 63/446,732 filed on Feb. 17, 2023, U.S. Provisional Patent Application No. 63/447,565 filed on Feb. 22, 2023, U.S. Provisional Patent Application No. 63/447,829 filed on Feb. 23, 2023, U.S. Provisional Patent Application No. 63/448,187 filed on Feb. 24, 2023, U.S. Provisional Patent Application No. 63/448,800 filed on Feb. 28, 2023, U.S. Provisional Patent Application No. 63/449,212 filed on Mar. 1, 2023, U.S. Provisional Patent Application No. 63/451,466 filed on Mar. 10, 2023, U.S. Provisional Patent Application No. 63/453,367 filed on Mar. 20, 2023, and U.S. Provisional Patent Application No. 63/457,065 filed on Apr. 4, 2023. The above-identified provisional patent applications are hereby incorporated by reference in their entirety.

TECHNICAL FIELD

The present disclosure relates generally to wireless communication systems and, more specifically, to electronic devices and methods for parameter combination for coherent joint transmission.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for parameter combination for coherent joint transmission.

In one embodiment, a user equipment (UE) is provided. The UE includes a transceiver configured to receive information about a channel state information (CSI) report. The information includes codebook parameters $N_L \geq 1$ combinations of values of $\{L_1, \ldots, L_{N_{TRP}}\}$ from a first table and a value of $(p_v, \beta)$ from a second table. $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors. The UE further includes a processor operably coupled to the transceiver. The processor is configured to determine the CSI report based on the information. The transceiver is further configured to transmit the CSI report. The codebook parameters are configured based on a third table that links the first and second tables.

In another embodiment, a base station (BS) is provided. The BS includes a processor and a transceiver operably coupled to the processor. The transceiver is configured to transmit information about a CSI report and receive the CSI report that is based on the information. The information includes codebook parameters $N_L \geq 1$ combinations of values of $\{L_1, \ldots, L_{N_{TRP}}\}$ from a first table and a value of $(p_v, \beta)$ from a second table. $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors. The codebook parameters are configured based on a third table that links the first and second tables.

In yet another embodiment, a method performed by a UE is provided. The method includes receiving information about a CSI report. The information includes codebook parameters $N_L \geq 1$ combinations of values of $\{L_1, \ldots, L_{N_{TRP}}\}$ from a first table and a value of $(p_v, \beta)$ from a second table. $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors. The method further includes determining the CSI report based on the information and transmitting the CSI report. The codebook parameters are configured based on a third table that links the first and second tables.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A-11D illustrate examples of a table that can be constructed according to embodiments of the present disclosure;

DETAILED DESCRIPTION

Figure 1:
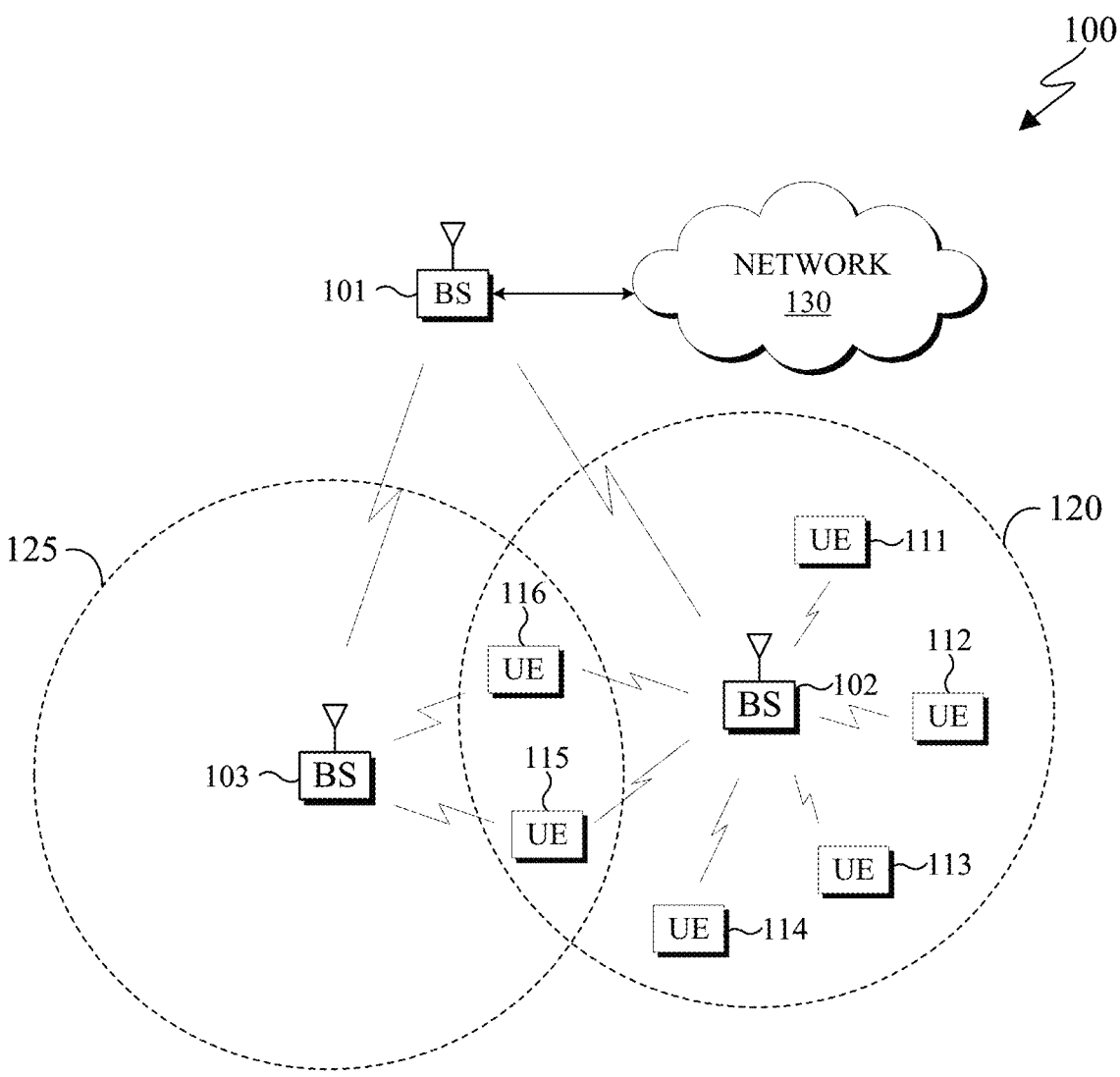
FIG. 1 illustrates an example wireless network according to embodiments of the present disclosure.

FIGS. 1 through 18C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.2.0, "E-UTRA, Physical channels and modulation" (herein "REF 1"); 3GPP TS 36.212 v17.1.0, "E-UTRA, Multiplexing and Channel coding" (herein "REF 2"); 3GPP TS 36.213 v17.2.0, "E-UTRA, Physical Layer Procedures" (herein "REF 3"); 3GPP TS 36.321 v17.1.0, "E-UTRA, Medium Access Control (MAC) protocol specification" (herein "REF 4"); 3GPP TS 36.331 v17.1.0, "E-UTRA, Radio Resource Control (RRC) Protocol Specification" (herein "REF 5"); 3GPP TS 38.211 v17.2.0, "NR, Physical channels and modulation" (herein "REF 6"); 3GPP TS 38.212 v17.2.0, "NR, Multiplexing and Channel coding" (herein "REF 7"); 3GPP TS 38.213 v17.2.0, "NR, Physical Layer Procedures for Control" (herein "REF 8"); 3GPP TS 38.214 v17.2.0, "NR, Physical Layer Procedures for Data" (herein "REF 9"); 3GPP TS 38.215 v17.1.0, "NR, Physical Layer Measurements" (herein "REF 10"); 3GPP TS 38.321 v17.1.0, "NR, Medium Access Control (MAC) protocol specification" (herein "REF 11"); and 3GPP TS 38.331 v17.1.0, "NR, Radio Resource Control (RRC) Protocol Specification" (herein "REF 12").

For a cellular system operating in a sub-1 GHz frequency range (e.g., less than 1 GHz), supporting large number of CSI-RS antenna ports (e.g., 32) at a single location or remote radio head (RRH) or TRP is challenging due to that a larger antenna form factor size is needed at these frequencies than a system operating at a higher frequency such as 2 GHz or 4 GHz. At such low frequencies, the maximum number of CSI-RS antenna ports that can be co-located at a single site (or TRP/RRH) can be limited, for example to 8. This limits the spectral efficiency of such systems. In particular, the MU-MIMO spatial multiplexing gains offered due to large number of CSI-RS antenna ports (such as 32) can't be achieved.

One way to operate a sub-1 GHz system with large number of CSI-RS antenna ports is based on distributing antenna ports at multiple locations (or TRP/RRHs). The multiple sites or TRPs/RRHs can still be connected to a single (common) base unit, hence the signal transmitted/received via multiple distributed TRPs/RRHs can still be processed at a centralized location. This is called distributed MIMO or multi-TRP coherent joint transmission (C-JT).

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Embodiments of the present disclosure propose methods and apparatuses for parameter combinations for C-JT transmissions.

Embodiments of the present disclosure recognize that CSI enhancement described in Rel-18 MIMO considers Rel-16/17 Type-II CSI codebook refinements to support mTRP coherent joint transmission (C-JT) operations by considering performance-and-overhead trade-off. The Rel-16/17 Type-II CSI codebook has three components $W_1$, $W_2$, and $W_f$. Rel-18 Type-II CSI codebook for CJT requires $\{L_n\}$ values and $p_v$, $\beta$ for the case of Rel-16-based refinement CJT codebook, and $\{\alpha_n\}$ values and M, $\beta$ for the case of Rel-17-based refinement CJT codebook, respectively. In Rel-16/17 Type-II CSI codebook, a joint parameter combination table is used for NW to configure one of the possible combinations in the table to the UE. However, in Rel-18 Type-II CSI codebook, following the legacy approach using a joint table for the parameters may not be efficient since the joint table can be too long and complicated.

Embodiments of the present disclosure propose two (or more than two) separate tables for configuring codebook parameter combinations (an extension of the tables of para-Combination-r16, paraCombination-r17) having good performance-and-overhead trade-off for mTRP C-JT operations. Additionally, embodiments of the present disclosure propose linkage between two separate tables to provide more efficient parameter-combination framework for Rel-18 Type-II CSI codebook for CJT.

Figure 2:
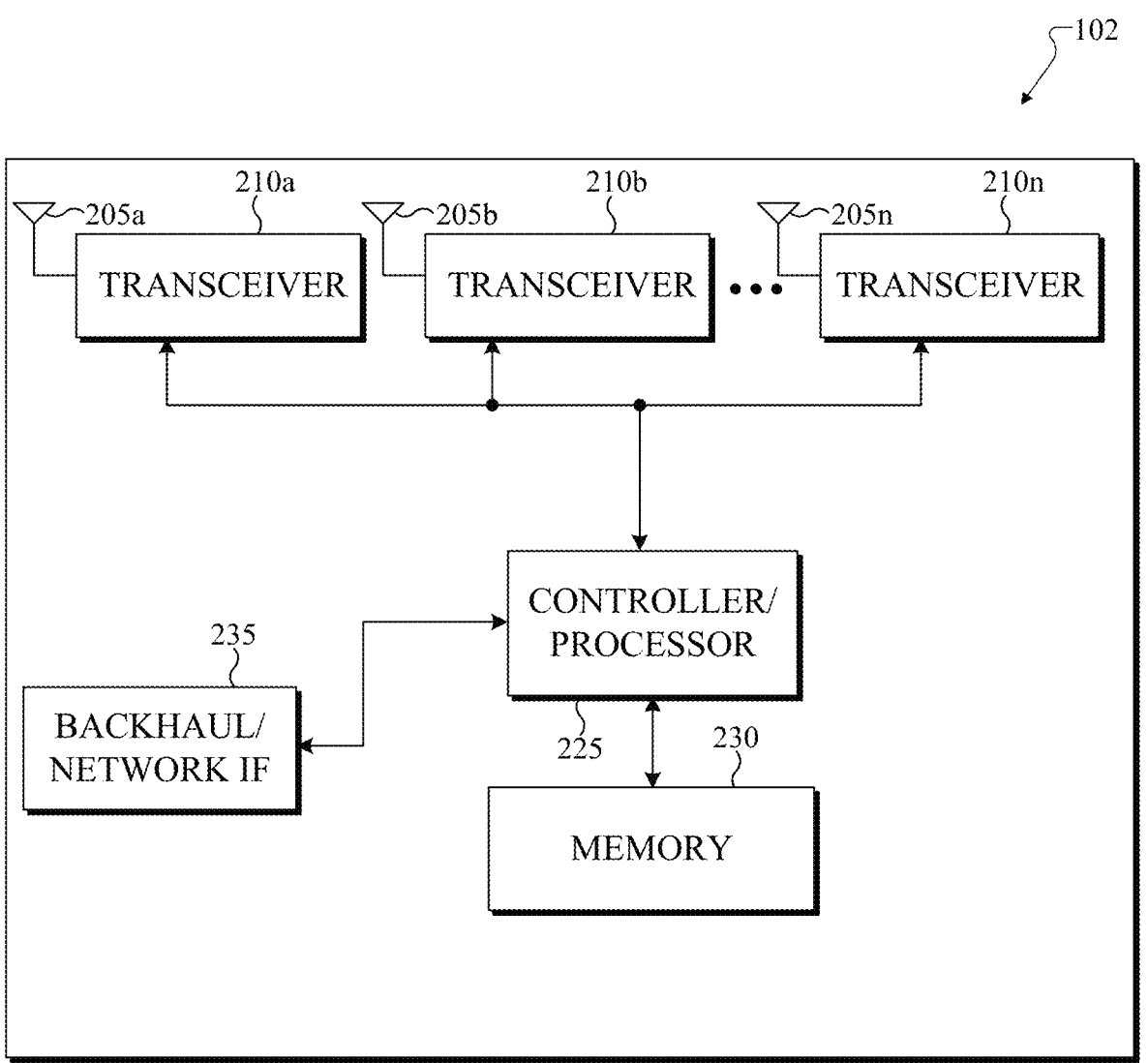
FIG. 2 illustrates an example gNodeB (gNB) according to embodiments of the present disclosure.
Figure 3:
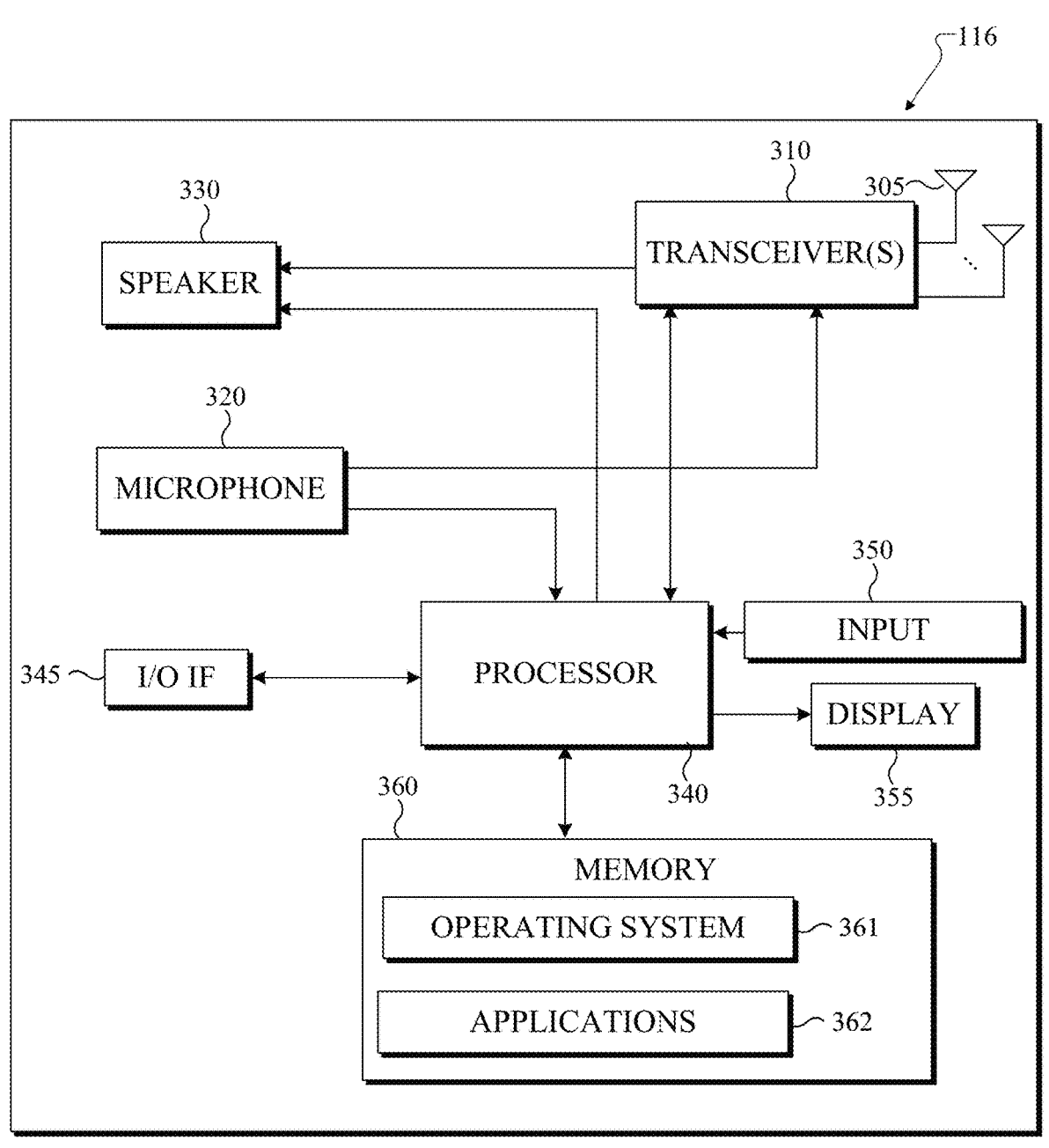
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting parameter combination for coherent joint transmission. In certain embodiments, one or more of the BSs 101-103 include circuitry, programing, or a combination thereof for supporting parameter combination for coherent joint transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNB s 101 and 103 of FIG. 1 could have the same or similar configuration. However, gNB s come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting parameter combination for coherent joint transmission. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. As another example, the processor 340 could support methods for parameter combination for coherent joint transmission. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 4:
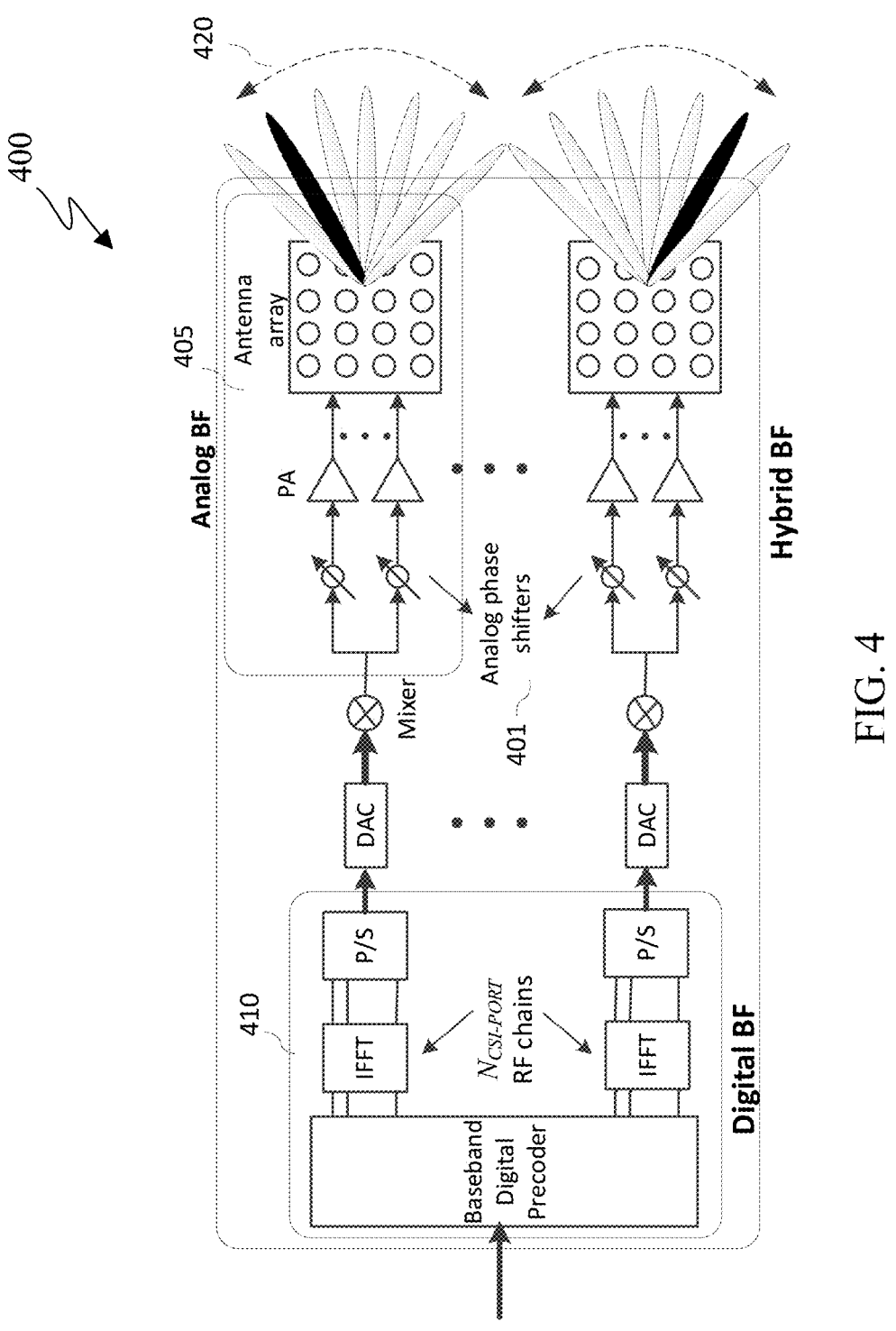
FIG. 4 illustrates an example antenna blocks or arrays forming beams according to embodiments of the present disclosure.

FIG. 4 illustrates an example antenna blocks or arrays 400 according to embodiments of the present disclosure. The embodiment of the antenna blocks or arrays 400 illustrated in FIG. 4 is for illustration only. FIG. 4 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes. The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as <1 GHz, on the other hand, the number of antenna elements may not be large in a given form factor due to the large wavelength. As an example, for the case of the wavelength size (λ) of the center frequency 600 MHz (which is 50 cm), it desires 4 m for uniform-linear-array (ULA) antenna panel of 16 antenna elements with the half-wavelength distance between two adjacent antenna elements. Considering a plurality of antenna elements is mapped to one digital port in practical cases, the desirable size for antenna panel(s) at gNB to support a large number of antenna ports such as 32 CSI-RS ports becomes very large in such low frequency bands, and it leads the difficulty of deploying 2-D antenna element arrays within the size of a conventional form factor. This results in a limited number of CSI-RS ports that can be supported at a single site and limits the spectral efficiency of such systems.

Various embodiments of the present disclosure recognize that for a cellular system operating in a sub-1 GHz frequency range (e.g., less than 1 GHz), supporting large number of CSI-RS antenna ports (e.g., 32) at a single location or remote radio head (RRH) or TRP is challenging due to that a larger antenna form factor size is needed at these frequencies than a system operating at a higher frequency such as 2 GHz or 4 GHz. At such low frequencies, the maximum number of CSI-RS antenna ports that can be co-located at a single site (or TRP/RRH) can be limited, for example to 8. This limits the spectral efficiency of such systems. In particular, the MU-MIMO spatial multiplexing gains offered due to large number of CSI-RS antenna ports (such as 32) can't be achieved.

One way to operate a sub-1 GHz system with large number of CSI-RS antenna ports is based on distributing antenna ports at multiple locations (or TRP/RRHs). The multiple sites or TRPs/RRHs can still be connected to a single (common) base unit, hence the signal transmitted/received via multiple distributed TRPs/RRHs can still be processed at a centralized location. This is called distributed MIMO or multi-TRP coherent joint transmission (C-JT).

Various embodiments of the present disclosure recognize that CSI enhancement described in Rel-18 MIMO considers Rel-16/17 Type-II CSI codebook refinements to support mTRP coherent joint transmission (C-JT) operations by considering performance-and-overhead trade-off. Various embodiments of the present disclosure recognize that utilizing codebook subset restriction (CBSR) is one of the ways to manage CSI feedback overhead. Especially, in multi-TRP C-JT scenarios, CBSR could be useful in terms of reducing overhead.

Accordingly, various embodiments of the present disclosure provide mechanisms for CBSR for multi-TRP C-JT scenarios.

Figure 5:
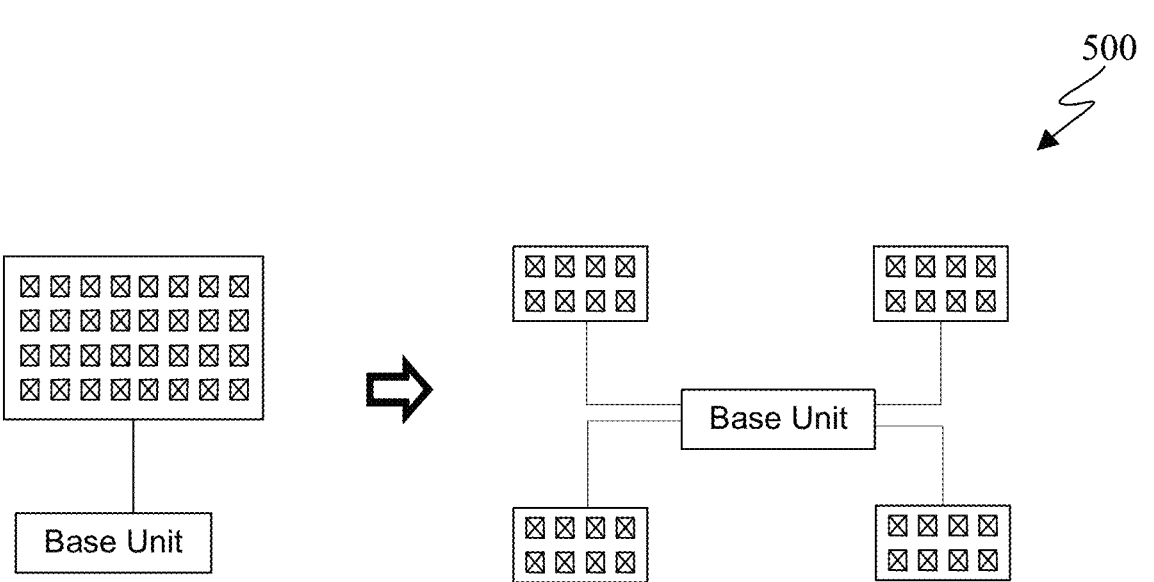
FIG. 5 illustrates an example distributed multiple-input multiple-output (MIMO) system according to embodiments of the present disclosure.

FIG. 5 illustrates an example distributed MIMO system 500 according to embodiments of the present disclosure. The embodiment of the distributed MIMO system 500 illustrated in FIG. 5 is for illustration only. FIG. 5 does not limit the scope of this disclosure to any particular implementation of the distributed MIMO system 500.

One possible approach to resolving the issue is to form multiple TRPs (multi-TRP) or RRHs with a small number of antenna ports instead of integrating all of the antenna ports in a single panel (or at a single site) and to distribute the multiple panels in multiple locations/sites (or TRPs, RRHs). This approach is shown in FIG. 5.

Figure 6:
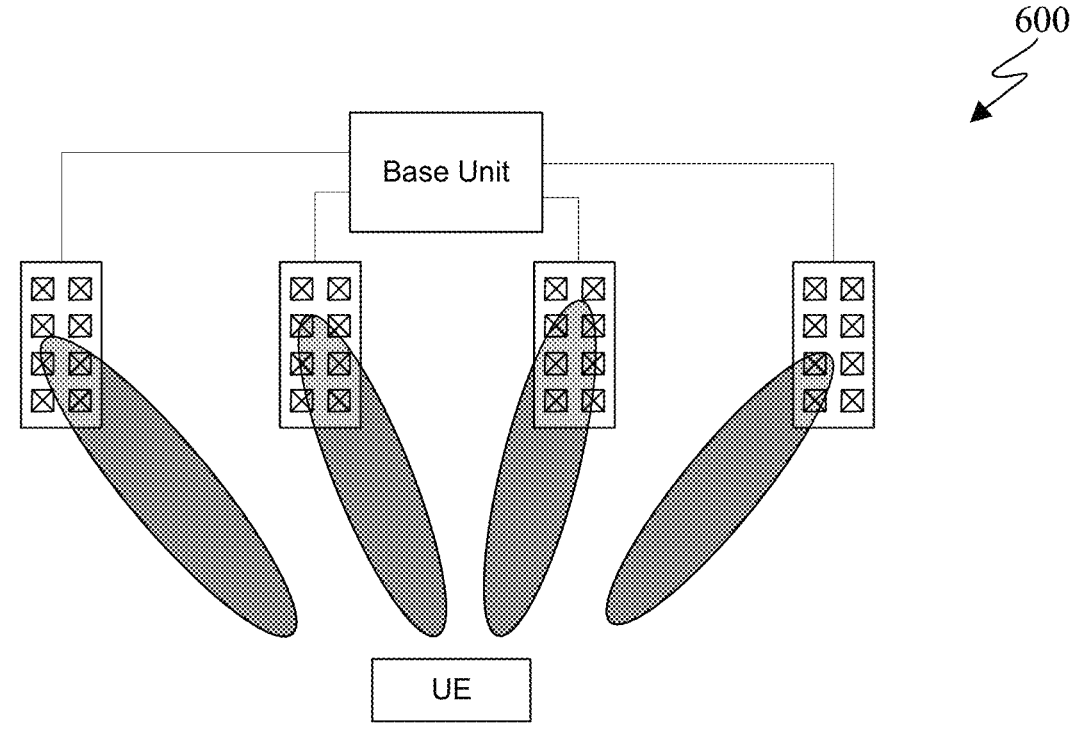
FIG. 6 illustrates an example distributed MIMO system according to embodiments of the present disclosure.

FIG. 6 illustrates an example distributed MIMO system 600 according to embodiments of the present disclosure. The embodiment of the distributed MIMO system 600 illustrated in FIG. 6 is for illustration only. FIG. 6 does not limit the scope of this disclosure to any particular implementation of the distributed MIMO system 600.

As illustrated in FIG. 6, the multiple TRPs at multiple locations can still be connected to a single base unit, and thus the signal transmitted/received via multiple distributed TRPs can be processed in a centralized manner through the single base unit.

Note that although the present disclosure has mentioned low frequency band systems (sub-1 GHz band) as a motivation for distributed MIMO (or mTRP), the distributed MIMO technology is frequency-band-agnostic and can be useful in mid- (sub-6 GHz) and high-band (above-6 GHz) systems in addition to low-band (sub-1 GHz) systems.

The terminology "distributed MIMO" is used as an illustrative purpose, it can be considered under another terminology such as multi-TRP, mTRP, cell-free network, and so on.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \leq N$ CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 7:
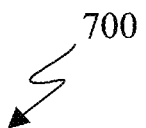
FIG. 7 illustrates an example antenna port layout according to embodiments of the present disclosure.

FIG. 7 illustrates an example antenna port layout 700 according to embodiments of the present disclosure. The embodiment of the antenna port layout 700 illustrated in FIG. 7 is for illustration only. FIG. 7 does not limit the scope of this disclosure to any particular implementation of the antenna port layout.

As illustrated in FIG. 7, $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. Therefore, for a dual-polarized antenna port layout, the total number of antenna ports is $2N_1N_2$ when each antenna maps to an antenna port. An illustration is shown in FIG. 7 where "X" represents two antenna polarizations. In this disclosure, the term "polarization" refers to a group of antenna ports. For example, antenna ports $$ j = X + 0, X + 1, \ldots, X + \frac{P_{CSIRS}}{2} - 1 $$

comprise a first antenna polarization, and antenna ports $$ j = X + \frac{P_{CSIRS}}{2}, X + \frac{P_{CSIRS}}{2} + 1, \ldots, X + P_{CSIRS} - 1 $$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g > 1$), we assume that each panel is dual-polarized antenna ports with $N_1$ and $N_2$ ports in two dimensions. This is illustrated in FIG. 7. Note that the antenna port layouts may or may not be the same in different antenna panels.

In one example, the antenna architecture of a D-MIMO or CJT (coherent joint-transmission) system is structured. For example, the antenna structure at each RRH (or TRP) is dual-polarized (single or multi-panel as shown in FIG. 7. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g=N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

The remainder of the present disclosure assumes a structured antenna architecture. For simplicity, in the remainder of the present disclosure it is assumed that each RRH/TRP is equivalent to a panel, although, an RRH/TRP can have multiple panels in practice. The present disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, it can be implicit.

In one example, when implicit, it could be based on the value of K. For example, when K>1 CSI-RS resources, an RRH corresponds to one or more examples described above, and when K=1 CSI-RS resource, an RRH corresponds to one or more examples described above.

In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across TRPs/RRHs).

In one example, when RRH or TRP maps (or corresponds to) a CSI-RS resource or resource group, and a UE can select a subset of RRHs (resources or resource groups) and report the CSI for the selected TRPs/RRHs (resources or resource groups), the selected TRPs/RRHs can be reported via an indicator. For example, the indicator can be a CRI or a PMI (component) or a new indicator.

In one example, when RRH or TRP maps (or corresponds to) a CSI-RS port group, and a UE can select a subset of TRPs/RRHs (port groups) and report the CSI for the selected TRPs/RRHs (port groups), the selected TRPs/RRHs can be reported via an indicator. For example, the indicator can be a CRI or a PMI (component) or a new indicator.

In one example, when multiple (K>1) CSI-RS resources are configured for $N_{RRH}$ TRPs/RRHs, a decoupled (modular) codebook is used/configured, and when a single (K=1) CSI-RS resource for $N_{RRH}$ TRPs/RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 8:
FIG. 8 illustrates a 3D grid of oversampled discrete Fourier transform (DFT) beams according to embodiments of the present disclosure.

FIG. 8 illustrates a 3D grid of oversampled DFT beams 800 according to embodiments of the present disclosure. The embodiment of the 3D grid of oversampled DFT beams 800 illustrated in FIG. 8 is for illustration only. FIG. 8 does not limit the scope of this disclosure to any particular implementation of the 3D grid of oversampled DFT beams.

As illustrated, FIG. 8 shows a 3D grid 800 of the oversampled DFT beams (1st port dim., 2nd port dim., freq. dim.) in which a 1st dimension is associated with the 1st port dimension, a 2nd dimension is associated with the 2nd port dimension, and a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_1$ belongs to $\{2, 4, 8\}$. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_l B^H =$$ (Eq. 1)

$$[a_0 \; a_1 \; ... \; a_{L-1}] \begin{bmatrix} c_{l,0,0} & c_{l,0,1} & ... & c_{l,0,M-1} \\ c_{l,1,0} & c_{l,1,1} & ... & c_{l,1,M-1} \\ \vdots & \vdots & \vdots & \vdots \\ c_{l,L-1,0} & c_{l,L-1,1} & ... & c_{l,L-1,M-1} \end{bmatrix} [b_0 \; b_1 \; ... \; b_{M-1}]^H$$

$$= \sum_{f=0}^{M-1} \sum_{i=0}^{L-1} c_{l,i,f}\left(a_i b_f^H\right) = \sum_{i=0}^{L-1} \sum_{f=0}^{M-1} c_{l,i,f}\left(a_i b_f^H\right), \text{ or}$$

$$W^l = \begin{bmatrix} A & 0 \\ 0 & A \end{bmatrix} C_l B^H =$$ (Eq. 2)

$$\begin{bmatrix} a_0 \; a_1 \; ... \; a_{L-1} & 0 \\ 0 & a_0 \; a_1 \; ... \; a_{L-1} \end{bmatrix} \begin{bmatrix} c_{l,0,0} & c_{l,0,1} & ... & c_{l,0,M-1} \\ c_{l,1,0} & c_{l,1,1} & ... & c_{l,1,M-1} \\ \vdots & \vdots & \vdots & \vdots \\ c_{l,L-1,0} & c_{l,L-1,1} & ... & c_{l,L-1,M-1} \end{bmatrix}$$

$$[b_0 \; b_1 \; ... \; b_{M-1}]^H = \begin{bmatrix} \sum_{f=0}^{M-1} \sum_{i=0}^{L-1} c_{l,i,f}\left(a_i b_f^H\right) \\ \sum_{i=0}^{L-1} \sum_{f=0}^{M-1} c_{l,i+L,f}\left(a_i b_f^H\right) \end{bmatrix},$$

where:
   $N_1$ is a number of antenna ports in a first antenna port dimension (having the same antenna polarization),
   $N_2$ is a number of antenna ports in a second antenna port dimension (having the same antenna polarization),
   $P_{CSI-RS}$ is a number of CSI-RS ports configured to the UE,
   $N_3$ is a number of SBs for PMI reporting or number of FD units or number of FD components (that comprise the CSI reporting band) or a total number of precoding matrices indicated by the PMI (one for each FD unit/component),
   $a_i$ is a $2N_1N_2 \times 1$ (Eq. 1) or $N_1N_2 \times 1$ (Eq. 2) column vector, or $a_i$ is a $P_{CSIRS} \times 1$ (Eq. 1) or $$\frac{P_{CSIRS}}{2} \times 1$$

port selection column vector, where a port selection vector is a defined as a vector which contains a value of 1 in one element and zeros elsewhere,
   $b_f$ is a $N_3 \times 1$ column vector,
   $c_{l,i,f}$ is a complex coefficient.
   In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$, where
   $x_{l,i,f}=1$ if the coefficient $c_{l,i,f}$ is reported by the UE according to some embodiments of this disclosure.
   $x_{l,i,f}=0$ otherwise (i.e., $c_{l,i,f}$ is not reported by the UE).
   The indication whether $x_{l,i,f}=1$ or 0 is according to some embodiments of this disclosure. For example, it can be via a bitmap.
   In a variation, the precoder equations Eq. 1 or Eq. 2 are respectively generalized to $$W^l = \sum_{i=0}^{L-1} \sum_{f=0}^{M_i-1} c_{l,i,f}\left(a_i b_{i,f}^H\right) \text{ and}$$ (Eq. 3)

-continued $$W^l = \begin{bmatrix} \sum_{i=0}^{L-1} \sum_{f=0}^{M_i-1} c_{l,i,f}\left(a_i b_{i,f}^H\right) \\ \sum_{i=0}^{L-1} \sum_{f=0}^{M_i-1} c_{l,i+L,f}\left(a_i b_{i,f}^H\right) \end{bmatrix},$$ (Eq. 4)

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}}\left[W^1 \; W^2 \; ... \; W^R\right].$$

Eq. 2 is assumed in the rest of the disclosure. The embodiments of the disclosure, however, are general and are also application to Eq. 1, Eq. 3 and Eq. 4.
   Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M < N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2 n_{3,l}^{(f)}}{O_3 N_3}} & ... & e^{j\frac{2\pi (N_3-1) n_{3,l}^{(f)}}{O_3 N_3}} \end{bmatrix}^T.$$

When $O_3=1$, the FD basis vector for layer $l \in \{1, . . . , v\}$ (where v is the RI or rank value) is given by $$w_f = \begin{bmatrix} y_{0,l}^{(f)} & y_{1,l}^{(f)} & ... & y_{N_3-1,l}^{(f)} \end{bmatrix}^T,$$

where $$y_{t,l}^{(f)} = e^{j\frac{2\pi t n_{3,l}^{(f)}}{N_3}}$$

and $$n_{3,l} = \begin{bmatrix} n_{3,l}^{(0)}, ... , n_{3,l}^{(M-1)} \end{bmatrix} \text{ where } n_{3,l}^{(f)} \in \{0, 1, ... , N_3 - 1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \dfrac{1}{\sqrt{K}}, \; n = 0 \\ \sqrt{\dfrac{2}{K}} \cos \dfrac{\pi(2m+1)n}{2K}, \; n = 1, \ldots K-1 \end{cases},$$

$$\text{and } K = N_3, \text{ and } m = 0, \ldots, N_3 - 1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad \text{(Eq. 5)}$$

where $A = W_1$ corresponds to the Rel. 15 $W_1$ in Type II CSI codebook [REFS], and $B = W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $$p_{l,i,f} = p_{l,i,f}^{(1)} p_{l,i,f}^{(2)}$$

where $$p_{l,i,f}^{(1)}$$

is a reference or first amplitude which is reported using an A1-bit amplitude codebook where A1 belongs to {2, 3, 4}, and $$p_{l,i,f}^{(2)}$$

is a differential or second amplitude which is reported using a A2-bit amplitude codebook where A2≤A1 belongs to {2, 3, 4}.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$ and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = [\beta \times 2LM] < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*, f*) where $X = \lceil \log_2 K_{NZ} \rceil$ or $\lceil \log_2 2L \rceil$.

Strongest coefficient $c_{l,i^*,f^*} = 1$ (hence its amplitude/phase are not reported)

Two antenna polarization-specific reference amplitudes is used.

i. For the polarization associated with the strongest coefficient $c_{l,i^*,f^*} = 1$, since the reference amplitude $$p_{l,i,f}^{(1)} = 1,$$

it is not reported ii. For the other polarization, reference amplitude $$p_{l,i,f}^{(1)}$$

is quantized to 4 bits.

1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i, f) \neq (i^*, f^*)\}$:

i. For each polarization, differential amplitudes $$p_{l,i,f}^{(2)}$$

of of the coefficients calculated relative to the associated polarization-specific reference amplitude and quantized to 3 bits.

1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $$p_{l,i,f}^{(1)} \times p_{l,i,f}^{(2)}$$

ii. Each phase is quantized to either 8PSK ($N_{ph} = 8$) or 16PSK ($N_{ph} = 16$) (which is configurable).

For the polarization $r^* \in \{0, 1\}$ associated with the strongest coefficient $c_{l,i^*,f^*}$, we have $$r^* = \left\lfloor \frac{i^*}{L} \right\rfloor$$

and the reference amplitude $$p_{l,i,f}^{(1)} = p_{l,r^*}^{(1)} = 1.$$

For the other polarization $r \in \{0, 1\}$ and $r \neq r^*$, we have $$r = \left( \left\lfloor \frac{i^*}{L} \right\rfloor + 1 \right)$$

mod 2 and the reference amplitude $$p_{l,i,f}^{(1)} = p_{l,r}^{(1)}$$

is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from $\{1, 2\}$ and p is higher-layer configured from $$\left\{ \frac{1}{4}, \frac{1}{2} \right\}.$$

In one example, the p value is higher-layer configured for rank 1-2 CSI reporting. For rank >2 (e.g., rank 3-4), the p value (denoted by $v_0$) can be different. In one example, for rank 1-4, $(p, v_0)$ is jointly configured from $$\left\{ \left( \frac{1}{2}, \frac{1}{4} \right), \left( \frac{1}{4}, \frac{1}{4} \right), \left( \frac{1}{4}, \frac{1}{8} \right) \right\}, \text{i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_v$ to show its dependence on the rank value v, hence p is replaced with $p_v$, $v \in \{1, 2\}$ and $v_0$ is replaced with $p_v$, $v \in \{3, 4\}$.

A UE can be configured to report $M_v$ FD basis vectors in one-step from $N_3$ basis vectors freely (independently) for each layer $l \in \{1, \ldots, v\}$ of a rank v CSI reporting. Alternatively, a UE can be configured to report $M_v$ FD basis vectors in two-step as follows.

In step 1, an intermediate set (InS) comprising $$N_3' < N_3$$

basis vectors is selected/reported, wherein the InS is common for all layers.

In step 2, for each layer $l \in \{1, \ldots, v\}$ of a rank v CSI reporting, $M_v$ FD basis vectors are selected/reported freely (independently) from $$N_3'$$

basis vectors in the InS.

In one example, one-step method is used when $N_3 \leq 19$ and two-step method is used when $N_3 > 19$. In one example, $$N_3' = \lceil \alpha M_v \rceil$$

where $\alpha > 1$ is either fixed (to 2 for example) or configurable.

The codebook parameters used in the DFT based frequency domain compression (Eq. 5) are (L, $p_v$ for $v \in \{1, 2\}$, $p_v$ for $v \in \{3, 4\}$, $\beta$, $\alpha$, $N_{Ph}$). The set of values for these codebook parameters are as follows.

L: the set of values is $\{2, 4\}$ in general, except $L_n \in \{2, 4, 6\}$ for rank 1-2, 32 CSI-RS antenna ports, and R=1.

$p_v$ for $v \in \{1, 2\}$, $p_v$ for $$v \in \{3, 4\}) \in \left\{ \left( \frac{1}{2}, \frac{1}{4} \right), \left( \frac{1}{4}, \frac{1}{4} \right), \left( \frac{1}{4}, \frac{1}{8} \right) \right\}.$$

$$\beta \in \left\{ \frac{1}{4}, \frac{1}{2}, \frac{3}{4} \right\}.$$

$\alpha = 2$ $N_{ph} = 16$.

The set of values for these codebook parameters are as in Table 1.

TABLE 1

| paramCombination | L | $p_v$ | | $\beta$ |
|---|---|---|---|---|
| | | $v \in \{1, 2\}$ | $v \in \{3, 4\}$ | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), $M \in \{1, 2\}$, $$L = \frac{K_1}{2}$$

where $K_1 = \alpha \times P_{CSIRS}$, and codebook parameters (M, $\alpha$, $\beta$) are configured from Table 2.

TABLE 2

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The above-mentioned framework (Eq. 5) represents the precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H,$$ (Eq. 5A)

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

In one example, the codebook for the CSI report is according to at least one of the following examples.

In one example, the codebook can be a Rel. 15 Type I single-panel codebook (cf. 5.2.2.2.1, TS 38.214).

In one example, the codebook can be a Rel. 15 Type I multi-panel codebook (cf. 5.2.2.2.2, TS 38.214).

In one example, the codebook can be a Rel. 15 Type II codebook (cf. 5.2.2.2.3, TS 38.214).

In one example, the codebook can be a Rel. 15 port selection Type II codebook (cf. 5.2.2.2.4, TS 38.214).

In one example, the codebook can be a Rel. 16 enhanced Type II codebook (cf. 5.2.2.2.5, TS 38.214).

In one example, the codebook can be a Rel. 16 enhanced port selection Type II codebook (cf. 5.2.2.2.6, TS 38.214).

In one example, the codebook can be a Rel. 17 further enhanced port selection Type II codebook (cf. 5.2.2.2.7, TS 38.214).

In one example, the codebook is a new codebook for C-JT CSI reporting.

In one example, the new codebook is a decoupled codebook comprising the following components:

Intra-TRP: per TRP Rel. 16/17 Type II codebook components, i.e., SD basis vectors (W1), FD basis vectors ($W_f$), W2 components (e.g., SCI, indices of NZ coefficients, and amplitude/phase of NZ coefficients).

Inter-TRP: co-amplitude and co-phase for each TRP.

In one example, the new codebook is a joint codebook comprising following components Per TRP SD basis vectors (W1)

Single joint FD basis vectors (Wf)

Single joint W2 components (e.g., SCI, indices of NZ coefficients, and amplitude/phase of NZ coefficients)

Figure 9:
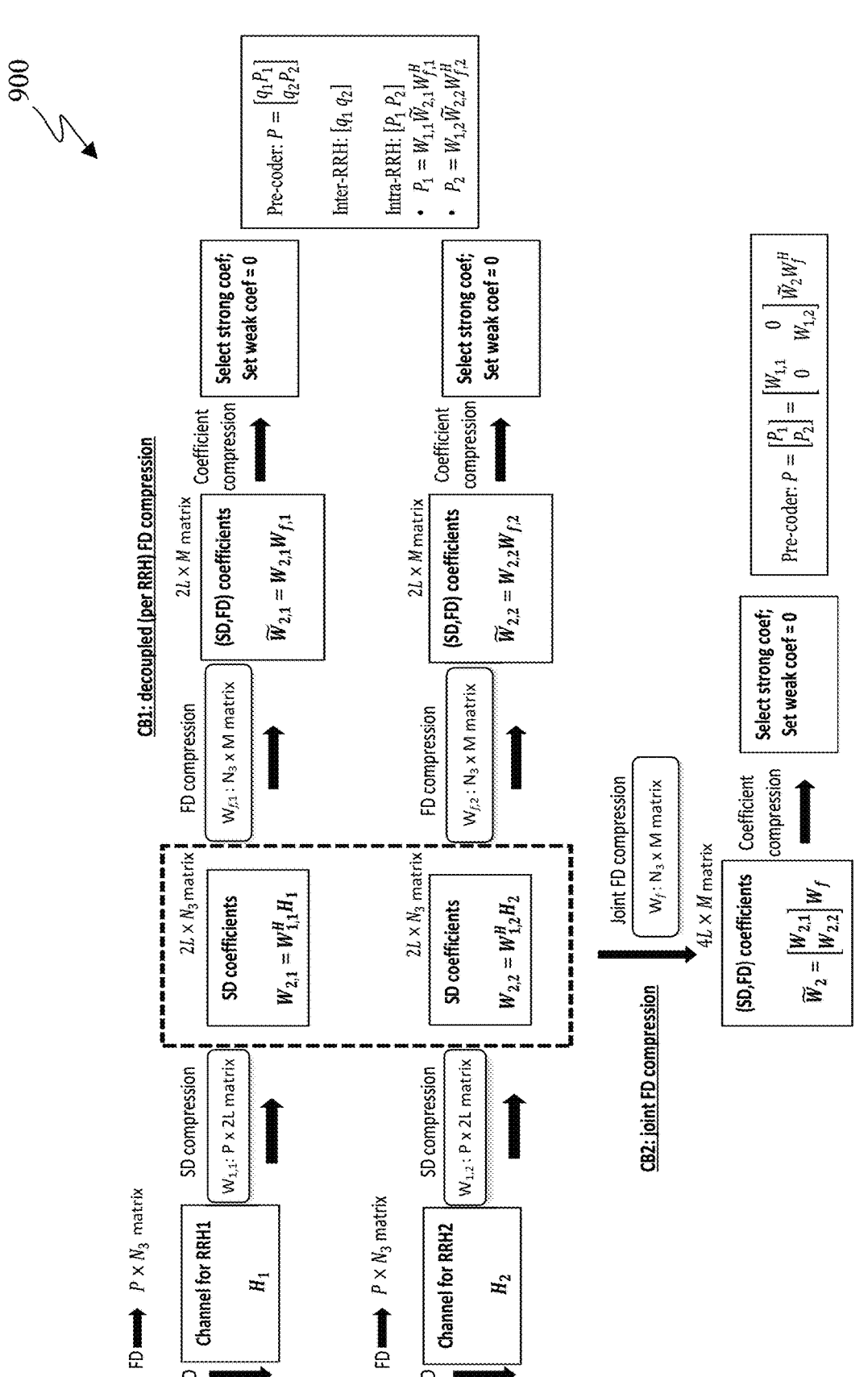
FIG. 9 illustrates two new codebooks according to embodiments of the present disclosure.

FIG. 9 illustrates two new codebooks 900 according to embodiments of the present disclosure. The embodiment of the two new codebooks 900 illustrated in FIG. 9 is for illustration only. FIG. 9 does not limit the scope of this disclosure to any particular implementation of the two new codebooks 900.

In one example, when the codebook is a legacy codebook (e.g., one of Rel. 15/16/17 NR codebooks, according to one of the examples above), then the CSI reporting is based on a CSI resource set comprising one or multiple NZP CSI-RS resource(s), where each NZP CSI-RS resource comprises CSI-RS antenna ports for all TRPs/RRHs, i.e., $$P = \sum_{r=1}^{N} P_r,$$

where P is the total number of antenna ports, and $P_r$ is the number of antenna ports associated with r-th TRP. In this case, a TRP corresponds to (or maps to or is associated with) a group of antenna ports.

In one example, when the codebook is a new codebook (e.g., one of the two new codebooks above), then the CSI reporting is based on a CSI resource set comprising one or multiple NZP CSI-RS resource(s).

In one example, each NZP CSI-RS resource comprises CSI-RS antenna ports for all TRPs/RRHs. i.e., $$P = \sum_{r=1}^{N} P_r,$$

where P is the total number of antenna ports, and $P_r$ is the number of antenna ports associated with r-th TRP. In this case, a TRP corresponds to (or maps to or is associated with) a group of antenna ports. A TRP group is a group of multiple TRPs.

In one example, each NZP CSI-RS resource corresponds to (or maps to or is associated with) a TRP/RRH.

In one embodiment, a UE is configured with an mTRP (or D-MIMO or C-JT) codebook, via e.g., higher layer parameter codebookType set to 'typeII-r18-cjt', which is designed based on Rel-16/17 Type-II codebook. For example, The mTRP codebook has a triple-stage structure which can be represented as $$W = W_1 W_2 W_f^H,$$

where the component $W_1$ is used to report/indicate a spatial-domain (SD) basis matrix comprising SD basis vectors, the component $W_f$ is used to report/indicate a frequency-domain (FD) basis matrix comprising FD basis vectors, and the component $W_2$ is used to report/indicate coefficients corresponding to SD and FD basis vectors.

In one example, in Rel-16 Type-II codebook, L vectors, $$v_{m_1^{(i)}, m_2^{(i)}}, i = 0, 1, \ldots, L-1,$$

are identified by the indices $q_1$, $q_2$, $n_1$, $n_2$, indicated by $i_{1,1}$, $i_{1,2}$, obtained as in 5.2.2.2.3, where the values of $C(x, y)$ are given in Table 5.2.2.2.5-4 of [9].

In Rel-18 Type-II codebook for multi-TRP, $L_n$ SD basis vectors for each TRP n can be selected/reported, where we denote that $L_n$ is a number of SD basis vectors for TRP n (CSI-RS resource n).

In one embodiment, on the SD basis selection for (Rel-18) Type-II codebook refinement for CJT mTRP, each of the $\{L_n, n=1, \ldots, N_{TRP}\}$ is configured by NW via higher-layer (RRC) signaling, where $N_{TRP}$ is a number of TRPs configured by the NW.

In one example, $L_n \in \{2, 4, 6\}$. In one example, $L_n \in \{1, 2, 4, 6\}$. In one example, $L_n \in \{1, 2, 3, 4, 5, 6\}$. In one example, $L_n \in \{1, 2, 3, 4\}$. In one example, $L_n \in \{1, 2, 3\}$. In one example, $L_n \in \{1, 2, 4\}$. In one example, $L_n$ can be selected from $L_n$, where $L_n$ is a subset of $\{1, 2, 3, 4, 5, 6\}$.

In embodiment 0, on the SD basis selection for (Rel-18) Type-II codebook refinement for CJT mTRP, $$L_{max} \geq \sum_{n=1}^{N_{TRP}} L_n$$

is configured by NW via higher-layer (RRC) signaling and the relative value(s) of $\{L_n, n=1, \ldots, N_{TRP}\}$ are reported by the UE, where $N_{TRP}$ is a number of TRPs configured by the NW. Although we denote $L_{max}$ for an upper bound of $$\sum_{n=1}^{N_{TRP}} L_n,$$

another notation can be used for $L_{max}$, such as $L_{sum}$, $L'$, $\overline{L}$, etc. In one example, $N_{TRP} \in \{1, 2, 3, 4\}$.

In one example, $L_{max} \in \{2N_{TRP}, 4N_{TRP}, 6N_{TRP}\}$. In one example, $L_{max} \in \{1N_{TRP}, 2N_{TRP}, 4N_{TRP}, 6N_{TRP}\}$. In one example, $L_{max} \in \{1N_{TRP}, 2N_{TRP}, 3N_{TRP}, 4N_{TRP}, 5N_{TRP}, 6N_{TRP}\}$. In one example, $L_{max} \in \{1N_{TRP}, 2N_{TRP}, 3N_{TRP}, 4N_{TRP}\}$. In one example, $L_{max} \in \{1N_{TRP}, 2N_{TRP}, 3N_{TRP}\}$.

In one example, $L_{max} \in \{1N_{TRP}, 2N_{TRP}, 4N_{TRP}\}$. In one example, $L_{max}$ can be selected from $\mathcal{L}_{max}$, where $\mathcal{L}_{max}$ is a subset of $\{1, \ldots, 24\}$.

In one example, $L_{max} \in \mathcal{L}_{max,1}$ for $N_{TRP} \geq x$ and $L_{max} \in \mathcal{L}_{max,2}$ for $N_{TRP} < x$, where $\mathcal{L}_{max,1}$ and $\mathcal{L}_{max,2}$ is a subset of $\{1, \ldots, 24\}$ and $x=1, 2, 3,$ or 4.

In one example, $L_{max} \in \mathcal{L}_{max,1}$ for $N_{TRP} > x$ and $L_{max} \in \mathcal{L}_{max,2}$ for $N_{TRP} \leq x$, where $\mathcal{L}_{max,1}$ and $\mathcal{L}_{max,2}$ is a subset of $\{1, \ldots, 24\}$ and $x=1, 2, 3,$ or 4.

In example 0.1, $\{L_n, n=1, \ldots, N_{TRP}\}$ are explicitly reported via a joint indicator or separate multiple indicators in CSI part 1. For example, a joint indicator can be used to indicate $(L_1, \ldots, L_{N_{TRP}})$ under the constraint of $$L_{max} \geq \sum_{n=1}^{N_{TRP}} L_n \text{ and } L_n \geq 0, n = 1, \ldots, N_{TRP}$$

where $L_n$ is a non-negative integer. In another example, an indicator can be used to indicate each $L_n$ for $n=1, \ldots, N_{TRP}$ under the constraint of $$L_{max} \geq \sum_{n=1}^{N_{TRP}} L_n \text{ and } L_n \geq 0.$$

In one example, each $L_n$ is selected from a set $\mathcal{L}$ and indicated via $\lceil \log_2 |\mathcal{L}| \rceil$-bit indicator. So, in this case, $N_{TRP}$ $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil \text{ bits}$$

(bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \sum_{n=1}^{N_{TRP}} \binom{N_1 N_2}{L_n} \right\rceil \text{ bits}$$

(bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_n$s associated with TRPs that are selected are explicitly reported via a joint indicator or separate multiple indicators in CSI part 1. In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{max} \geq \sum_{n \in S} L_n$ and $L_n \geq 1$, for $n \in S$ where $L_n$ is a positive integer and S is a set of selected TRP indexes (i.e., a subset of $\{1, 2, \ldots, N_{TRP}\}$.

In one example, a joint indicator can be used to indicate $$\{L_n\}_{n=1}^N$$

under the constraint of $$L_{max} \geq \sum_{n=1}^N L_n \text{ and } L_n \geq 1,$$

for $n=1, \ldots, N$ where $L_n$ is a positive integer.

In one example, an indicator can be used to indicate each $L_n$ for $n \in S$ under the constraint of $L_{max} \geq \sum_{n \in S} L_n$ and $L_n \geq 1$ where $L_n$ is a positive integer and S is a set of selected TRP indexes (i.e., a subset of $\{1, 2, \ldots,$ $N_{TRP}$}. In one example, each $L_n$ is selected from a set L and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1,2,4\}$. In one example, $\mathcal{L} \in \{1,2,3\}$. In one example, $\mathcal{L}$ is a subset of $\{1, 2, 3, 4, 5, 6\}$.

In one example, an indicator can be used to indicate each $L_n$ for n=1, . . . , N under the constraint of $$L_{max} \geq \sum\nolimits_{n=1}^{N} L_n \text{ and } L_n \geq 1, \text{ for } n = 1,$$

. . . , N where $L_n$ is a positive integer.

In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1,2,4\}$. In one example, $\mathcal{L} \in \{1,2,3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil \text{ bits}$$

(bit-width), where $N_1$ and $N_2$ are the values of $(N_1, N_2)$ configured via higher-layer (RRC) signaling by the NW, where n∈S or n=1, . . . , N.

In one example, a joint indicator to indicate $\{L_n\}$ SD basis vectors has the payload of $$\left\lceil \log_2 \sum\nolimits_{n=1}^{N} \binom{N_1 N_2}{L_n} \right\rceil \text{ bits or } \left\lceil \log_2 \sum\nolimits_{n \in S} \binom{N_1 N_2}{L_n} \right\rceil \text{ bits.}$$

In one example, $L_n$s associated with TRPs that are selected are explicitly reported via a joint indicator or separate multiple indicators in CSI part 2. The remaining part is similar to other examples described herein. For example, when $N_{TRP}$=4 and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{max} \geq \Sigma_{n \in S} L_n$ and $L_n \geq 1$, for n∈S where $L_n$ is a positive integer and S is a set of selected TRP indexes (i.e., a subset of $\{1, 2, . . . , N_{TRP}\}$.

In one example, a joint indicator can be used to indicate $$\{L_n\}_{n=1}^{N}$$

under the constraint of $$L_{max} \geq \sum\nolimits_{n=1}^{N} L_n \text{ and } L_n \geq 1, \text{ for } n = 1, \ldots, N$$

where $L_n$ is a positive integer.

In one example, an indicator can be used to indicate each $L_n$ for n∈S under the constraint of $L_{max} \geq \Sigma_{n \in S} L_n$ and $L_n \geq 1$ where $L_n$ is a positive integer and S is a set of selected TRP indexes (i.e., a subset of $\{1, 2, . . . , N_{TRP}\}$. In one example, each $L_n$ is selected from a set and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1,2,4\}$. In one example, $\mathcal{L} \in \{1,2,3\}$. In one example, $\mathcal{L}$ is a subset of $\{1, 2, 3, 4, 5, 6\}$.

In one example, an indicator can be used to indicate each $L_n$ for n=1, . . . , N under the constraint of $$L_{max} \geq \sum\nolimits_{n=1}^{N} L_n \text{ and } L_n \geq 1, \text{ for } n = 1, \ldots, N$$

where $L_n$ is a positive integer. In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1,2,4\}$. In one example, $\mathcal{L} \in \{1,2,3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil \text{ bits}$$

(bit-width), where $N_1$ and $N_2$ are the values of $(N_1, N_2)$ configured via higher-layer (RRC) signaling by the NW, where n∈S or n=1, . . . , N.

In one example, a joint indicator to indicate $\{L_n\}$ SD basis vectors has the payload of $$\left\lceil \log_2 \sum\nolimits_{n=1}^{N} \binom{N_1 N_2}{L_n} \right\rceil \text{ bits or } \left\lceil \log_2 \sum\nolimits_{n \in S} \binom{N_1 N_2}{L_n} \right\rceil \text{ bits.}$$

In one embodiment, $L_{tot}$ is determined the UE where $$L_{max} \geq L_{tot} = \sum\nolimits_{n=1}^{N_{TRP}} L_n$$

and the determined $L_{tot}$ is reported in CSI part 1. In one example, an indicator to indicate $L_{tot}$ has the size of payload $\lceil \log_2 L_{max} \rceil$ bits, i.e., $L_{tot}$ is selected from $\{1, 2, . . . , L_{max}\}$. In another example, an indicator to indicate $L_{tot}$ has the size of payload $\lceil \log_2 |\mathcal{L}_{tot}| \rceil$ bits, where $\mathcal{L}_{tot}$ is a set including $L_{max}$ and positive integers less than or equal to $L_{max}$, and |

$\mathcal{L}_{tot}|$ is a number of the elements in $\mathcal{L}_{tot}$. In one example, $\mathcal{L}_{tot}$ can be any subset of $\{1, 2, \ldots, L_{max}\}$. In one example, $\mathcal{L}_{tot}$ can be any subset of $$\left\{ \left\lceil \frac{L_{max}}{4} \right\rceil, \left\lceil \frac{L_{max}}{3} \right\rceil, \left\lceil \frac{L_{max}}{2} \right\rceil, L_{max} \right\}.$$

In one example, $L_{tot} \in \{2N_{TRP}, 4N_{TRP}, 6N_{TRP}\}$. In one example, $L_{tot} \in \{1N_{TRP}, 2N_{TRP}, 4N_{TRP}, 6N_{TRP}\}$. In one example, $L_{tot} \in \{1N_{TRP}, 2N_{TRP}, 3N_{TRP}, 4N_{TRP}, 5N_{TRP}, 6N_{TRP}\}$. In one example, $L_{tot} \in \{1N_{TRP}, 2N_{TRP}, 3N_{TRP}, 4N_{TRP}\}$. In one example, $L_{tot} \in \{1N_{TRP}, 2N_{TRP}, 3N_{TRP}\}$.

In one example, $L_{tot} \in \{1N_{TRP}, 2N_{TRP}, 4N_{TRP}\}$. In one example, $L_{tot}$ can be selected from a subset of $\{1, \ldots, 24\}$.

In one example, $L_{tot} \in \{2N_{TRP}, 4N_{TRP}, 6N_{TRP}\} \cap \{1, 2, \ldots, L_{max}\}$. In one example, $L_{tot} \in \{1N_{TRP}, 2N_{TRP}, 4N_{TRP}, 6N_{TRP}\} \cap \{1, 2, \ldots, L_{max}\}$. In one example, $L_{tot} \in \{1N_{TRP}, 2N_{TRP}, 3N_{TRP}, 4N_{TRP}, 5N_{TRP}, 6N_{TRP}\} \cap \{1, 2, \ldots, L_{max}\}$. In one example, $L_{tot} \in \{1N_{TRP}, 2N_{TRP}, 3N_{TRP}, 4N_{TRP}\} \cap \{1, 2, \ldots, L_{max}\}$. In one example, $L_{tot} \in \{1N_{TRP}, 2N_{TRP}, 3N_{TRP}\} \cap \{1, 2, \ldots, L_{max}\}$.

In one example, $L_{tot} \in \{1N_{TRP}, 2N_{TRP}, 4N_{TRP}\} \cap \{1, 2, \ldots, L_{max}\}$. In one example, $L_{tot}$ can be selected from a subset of $\{1, \ldots, 24\} \cap \{1, 2, \ldots, L_{max}\}$.

In one example, some of $\{L_n, n=1, \ldots, N_{TRP}\}$ are explicitly reported via a joint indicator or separate multiple indicators in CSI part 1 and the others of $\{L_n, n=1, \ldots, N_{TRP}\}$ are reported implicitly (or determined implicitly hence not explicitly reported).

In one example, a joint indicator can be used to indicate $(L_1, \ldots, L_{N_{TRP}-1})$, (i.e., excluding L with the highest index), and $L_{N_{TRP}}$ is implicitly determined by $(L_1, \ldots, L_{N_{TRP}-1})$ and $$L_{tot} = \sum_{n=1}^{N_{TRP}} L_n$$

hence $L_{N_{TRP}}$ is not reported. Here, $L_n \geq 0$, for $n=1, \ldots, N_{TRP}-1$ where $L_n$ is a non-negative integer.

In one example, a joint indicator can be used to indicate $(L_2, \ldots, L_{N_{TRP}})$, (i.e., excluding L with the lowest index), and $L_1$ is implicitly determined by $(L_2, \ldots, L_{N_{TRP}})$ and $$L_{tot} = \sum_{n=1}^{N_{TRP}} L_n$$

hence $L_1$ is reported. Here, $L_n \geq 0$, for $n=2, \ldots, N_{TRP}$ where $L_n$ is a non-negative integer.

In one example, a joint indicator can be used to indicate $\{L_n\}_{n \in \{1, \ldots, N_{TRP}\} \backslash \{n^*\}}$ (i.e., excluding L with a reference TRP index n*, which can be determined by UE or configured by NW or determined by a pre-defined rule), and $L_{n^*}$ is implicitly determined by $\{L_n\}_{n \in \{1, \ldots, N_{TRP}\} \backslash \{n^*\}}$ and $$L_{tot} = \sum_{n=1}^{N_{TRP}} L_n$$

hence $L_{n^*}$ is not reported. Here, $L_n \geq 0$, for $n \in \{1, \ldots, N_{TRP}\} \backslash \{n^*\}$ where $L_n$ is a non-negative integer.

In one example, an indicator can be used to indicate each $L_n$ for $n=1, \ldots, N_{TRP}-1$ (i.e., excluding L with the highest index), and $L_{N_{TRP}}$ is implicitly determined by $L_1, \ldots, L_{N_{TRP}-1}$ and $$L_{tot} = \sum_{n=1}^{N_{TRP}} L_n$$

hence $L_{N_{TRP}}$ is not reported. Here, $L_n \geq 0$, for $n=1, \ldots, N_{TRP}-1$ where $L_n$ is a non-negative integer.

In one example, an indicator can be used to indicate each $L_n$ for $n=2, \ldots, N_{TRP}$ (i.e., excluding L with the lowest index), and $L_1$ is implicitly determined by $L_2, \ldots, L_{N_{TRP}}$ and $$L_{tot} = \sum_{n=1}^{N_{TRP}} L_n$$

hence $L_1$ is not reported. Here, $L_n \geq 0$, for $n=2, \ldots, N_{TRP}$ where $L_n$ is a non-negative integer.

In one example, an indicator can be used to indicate each $L_n$ for $n \in \{1, \ldots, N_{TRP}\} \backslash \{n^*\}$ (i.e., excluding L with a reference TRP index n*, which can be determined by UE or configured by NW or determined by a pre-defined rule), and $L_{n^*}$ is implicitly determined by $\{L_n\}_{n \in \{1, \ldots, N_{TRP}\} \backslash \{n^*\}}$ and $$L_{tot} = \sum_{n=1}^{N_{TRP}} L_n$$

hence $L_{n^*}$ is not reported. Here, $L_n \geq 0$, for $n \in \{1, \ldots, N_{TRP}\} \backslash \{n^*\}$ where $L_n$ is a non-negative integer.

In one example, $L_n$ SD basis vector selection for each TRP n is reported via a joint indicator or separate multiple indicators in CSI part 2. (Similar to/same as example 0.1.1)

In one example, an indicator to indicate (each) $L_n$ SD basis vectors has the payload of $$\left\lceil \log_2 \binom{N_1 N_2}{L_n} \right\rceil \text{ bits}$$

(bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \sum_{n=1}^{N_{TRP}} \binom{N_1 N_2}{L_n} \right\rceil \text{ bits}$$

(bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil \text{ bits}$$

in CSI part 1. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil \text{ bits}$$

in CSI part 2. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil \text{ bits}$$

in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil \text{ bits}$$

in CSI part 2. In this case, $L_n$ is implicitly determined by counting the number of selected SD basis vectors that belong to the candidate SD basis vectors of each of the selected TRPs.

In one embodiment, $L_{tot}$ is determined by UE where $$L_{max} \ge L_{tot} = \sum_{n=1}^{N} L_n$$

(or $L_{max} \ge L_{tot} = \Sigma_{n \in S} L_n$), and the determined $L_{tot}$ is reported in CSI part 1. Here, N is a number of selected TRPs out of $N_{TRP}$ TRPs and S is a set of selected TRP indexes (i.e., a subset of $\{1, 2, \ldots, N_{TRP}\}$). Note that in CSI part 1, $N_{TRP}$-bit bitmap can be used to indicate selected N TRPs out of $N_{TRP}$ TRPs. In one example, an indicator to indicate $L_{tot}$ has the size of payload $\lceil \log_2 L_{max} \rceil$ bits, i.e., $L_{tot}$ is selected from $\{1, 2, \ldots, L_{max}\}$. In another example, an indicator to indicate $L_{tot}$ has the size of payload $\lceil \log_2 | \mathcal{L}_{tot} | \rceil$ bits, where $\mathcal{L}_{tot}$ is a set including $L_{max}$ and positive integers less than or equal to $L_{max}$, and $| \mathcal{L}_{tot} |$ is a number of the elements in tot. In one example, $\mathcal{L}_{tot}$ can be any subset of $\{1, 2, \ldots, L_{max}\}$. In one example, $\mathcal{L}_{tot}$ can be any subset of $$\left\{ \left\lceil \frac{L_{max}}{4} \right\rceil, \left\lceil \frac{L_{max}}{3} \right\rceil, \left\lceil \frac{L_{max}}{2} \right\rceil, L_{max} \right\}.$$

In one example, an indicator to indicate $L_{tot}$ has the size of payload $$\left\lceil \log_2 \left( L_{max} \cdot \frac{N}{N_{TRP}} \right) \right\rceil \text{ bits,}$$

i.e., $L_{tot}$ is selected from $$\left\{ 1, 2, \ldots, \left\lceil L_{max} \cdot \frac{N}{N_{TRP}} \right\rceil \right\}.$$

In one example, $L_{tot} \in \{2N, 4N, 6N\}$. In one example, $L_{tot} \in \{1N, 2N, 4N, 6N\}$. In one example, $L_{tot} \in \{1N, 2N, 3N, 4N, 5N, 6N\}$. In one example, $L_{tot} \in \{1N, 2N, 3N, 4N\}$. In one example, $L_{tot} \in \{1N, 2N, 3N\}$.

In one example, $L_{tot} \in \{1N, 2N, 4N\}$. In one example, $L_{tot}$ can be selected from a subset of $\{1, \ldots, 24\}$.

In one example, $L_{tot} \in \{2N, 4N, 6N\} \cap \{1, 2, \ldots, L_{max}\}$. In one example, $L_{tot} \in \{1N, 2N, 4N, 6N\} \cap \{1, 2, \ldots, L_{max}\}$. In one example, $L_{tot} \in \{1N, 2N, 3N, 4N, 5N, 6N\} \cap \{1, 2, \ldots, L_{max}\}$. In one example, $L_{tot} \in \{1N, 2N, 3N, 4N\} \cap \{1, 2, \ldots, L_{max}\}$. In one example, $L_{tot} \in \{1N, 2N, 3N\} \cap \{1, 2, \ldots, L_{max}\}$.

In one example, $L_{tot} \in \{1N, 2N, 4N\} \cap \{1, 2, \ldots, L_{max}\}$. In one example, $L_{tot}$ can be selected from a subset of $\{1, \ldots, 24\} \cap \{1, 2, \ldots, L_{max}\}$.

In one example, some of $L_n$s associated with TRPs that are selected are explicitly reported via a joint indicator or separate multiple indicators in CSI part 1 and the others of $L_n$s associated with TRPs that are selected are reported implicitly (or determined implicitly hence not explicitly reported). In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, some of $L_n$ associated with the selected TRPs are explicitly reported and the others are implicitly determined.

In one example, a joint indicator can be used to indicate $\{L_n\}_{n \in S \setminus \{n_{Low}\}}$ and $L_{n_{Low}}$ is implicitly determined by $\{L_n\}_{n \in S \setminus \{n_{Low}\}}$ and $L_{tot} = \Sigma_{n \in S} L_n$ and $L_n \ge 1$ for $n \in S \setminus \{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, a joint indicator can be used to indicate $\{L_n\}_{n \in S \setminus \{n_{High}\}}$ and $L_{n_{High}}$ is implicitly determined by $\{L_n\}_{n \in S \setminus \{n_{High}\}}$ and $L_{tot} = \Sigma_{n \in S} L_n$ and $L_n \ge 1$ for $n \in S \setminus \{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, a joint indicator can be used to indicate $\{L_n\}_{n \in S \setminus \{n^*\}}$ and $L_{n^*}$ is implicitly determined by $\{L_n\}_{n \in S \setminus \{n^*\}}$ and $L_{tot} = \Sigma_{n \in S} L_n$ and $L_n \ge 1$ for $n \in S \setminus \{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, a joint indicator can be used to indicate $\{L_n\}n=1$ and $L_N$ is implicitly determined by $$\{L_n\}_{n=1}^{N-1} \text{ and } L_{tot} = \sum_{n=1}^{N} L_n \text{ and } L_n \geq 1, \text{ for } n = 1, \ldots, N-1$$

where $L_n$ is a positive integer.

In one example, a joint indicator can be used to indicate $\{L_n\}n=_2$ and $L_1$ is implicitly determined by $$\{L_n\}_{n=2}^{N} \text{ and } L_{tot} = \sum_{n=1}^{N} L_n \text{ and } L_n \geq 1, \text{ for } n = 2, \ldots, N$$

where $L_n$ is a positive integer.

In one example, a joint indicator can be used to indicate $\{L_n\}_{n\in\{1, \ldots, N\}\backslash\{n^*\}}$ and $L_{n^*}$ is implicitly determined by $\{L_n\}_{n\in\{1, \ldots, N\}\backslash\{n^*\}}$ and $$L_{tot} = \sum_{n=1}^{N} L_n \text{ and } L_n \geq 1,$$

for $n\in\{1, \ldots, N\}\backslash\{n^*\}$ where $L_n$ is a positive integer.

In one example, an indicator can be used to indicate each $L_n$ for $n\in S\backslash\{n_{Low}\}$ and $L_{n_{Low}}$ is implicitly determined by $\{L_n\}_{n\in S\backslash\{n_{Low}\}}$ and $L_{tot}=\Sigma_{n\in S} L_n$ and $L_n\geq 1$ for $n\in S\backslash\{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, an indicator can be used to indicate each $L_n$ for $n\in S\backslash\{n_{High}\}$ and $L_{n_{High}}$ is implicitly determined by $\{L_n\}_{n\in S\backslash\{n_{High}\}}$ and $L_{tot}=\Sigma_{n\in S} L_n$ and $L_n\geq 1$ for $n\in S\backslash\{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, an indicator can be used to indicate each $L_n$ for $n\in S\backslash\{n^*\}$ and $L_{n_{(n^*)}}$ is implicitly determined by $\{L_n\}_{n\in S\backslash\{n^*\}}$ and $L_{tot}=\Sigma_{n\in S} L_n$ and $L_n\geq 1$ for $n\in S\backslash\{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, an indicator can be used to indicate each $L_n$ for $n=1, \ldots, N-1$ and $L_N$ is implicitly determined by $$\{L_n\}_{n=1}^{N-1} \text{ and } L_{tot} = \sum_{n=1}^{N} L_n \text{ and } L_n \geq 1,$$

for $n=1, \ldots, N-1$ where $L_n$ is a positive integer.

In one example, an indicator can be used to indicate each $L_n$ for $n=2, \ldots, N$ and $L_1$ is implicitly determined by $$\{L_n\}_{n=2}^{N} \text{ and } L_{tot} = \sum_{n=1}^{N} L_n \text{ and } L_n \geq 1,$$

for $n=1, \ldots, N-1$ where $L_n$ is a positive integer.

In one example, an indicator can be used to indicate each $L_n$ for $n\in\{1, \ldots, N\}\backslash\{n^*\}$ and $L_{n^*}$ is implicitly determined by $\{L_n\}_{n\in\{1, \ldots, N\}\backslash\{n^*\}}$ and $$L_{tot} = \sum_{n=1}^{N} L_n \text{ and } L_n \geq 1,$$

$n\in\{1, \ldots, N\}\backslash\{n^*\}$ where $L_n$ is a positive integer.

In one example, $L_n$ SD basis vector selection for each TRP n is reported via a joint indicator or separate multiple indicators in CSI part 2. (Similar to/same as example 0.1A.1)

In one example, an indicator to indicate (each) $L_n$ SD basis vectors has the payload of $$\left\lceil \log_2 \binom{N_1 N_2}{L_n} \right\rceil \text{ bits}$$

(bit-width), where $N_1$ and $N_2$ are the values of $(N_1, N_2)$ configured via higher-layer (RRC) signaling by the NW, where $n\in S$ or $n=1, \ldots, N$.

In one example, a joint indicator to indicate $\{L_n\}$ SD basis vectors has the payload of $$\left\lceil \log_2 \sum_{n=1}^{N} \binom{N_1 N_2}{L_n} \right\rceil \text{ bits}$$

or $$\left\lceil \log_2 \sum_{n\in S} \binom{N_1 N_2}{L_n} \right\rceil \text{ bits.}$$

In one example, some of $L_n$s associated with TRPs that are selected are explicitly reported via a joint indicator or separate multiple indicators in CSI part 2 and the others of $L_n$s associated with TRPs that are selected are reported implicitly (or determined implicitly hence not explicitly reported). The remaining part is similar to example 0.2A.1 (examples under example 0.2A.1).

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{N N_1 N_2}{L_{tot}} \right\rceil \text{ bits}$$

in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{N N_1 N_2}{L_{tot}} \right\rceil \text{ bits}$$

in CSI part 2. In this case, $L_n$ is implicitly determined by counting the number of selected SD basis vectors that belong to the candidate SD basis vectors of each of the selected TRPs.

In one embodiment, a bitmap with size of $NN_1N_2$ is used to indicate SD basis vectors for selected N TRPs (CSI-RS resources) in CSI part 2. For example, in the bitmap, '0' refers 'not selected' for corresponding SD vector and '1' refers 'selected' for corresponding SD vector. In this case, $L_n$ can be inferred from the bitmap, by counting the number of selected SD vectors corresponding to each TRP. In this case, a restriction can be described such as "UE shall not report a CSI with $L_{tot} = \sum_n L_n > L_{max}$, where $L_n$ is inferred from the bitmap".

In one embodiment, in all embodiments/examples under embodiment 0, $L_n$, $L_{tot}$, $L_{max}$ can be replaced by $\alpha_n$, $\alpha_{tot}$, $\alpha_{max}$ where $$\alpha_n = \frac{L_n}{N_1 N_2}, \alpha_{tot} = \frac{L_{tot}}{N_{TRP} N_1 N_2} \left( \text{or } \alpha_{tot} = \frac{L_{tot}}{N N_1 N_2} \right),$$

and $$\alpha_{max} = \frac{L_{max}}{N_{TRP} N_1 N_2} \left( \text{or } \alpha_{max} = \frac{L_{max}}{N N_1 N_2} \right).$$

On Parameter Combination Table with Lmax (Ltot or Lsum), pv, Beta

In one embodiment, a UE is configured with a CSI report (e.g., via higher layer CSI-ReportConfig) based on a codebook for C-JT transmission from multiple TRPs, as described in this disclosure, where codebook parameters (such as α or L, β, $p_v$ or $M_v$) are configured via a higher-layer parameter 'paramCombination-r18' or 'paramCombination-CJT-r18'.

In one example, the Rel. 16 parameter combination table for 'paraCombination-r16' is reused for 'paramCombination-r18' (cf. Table 1).

In one example, the Rel. 17 parameter combination table for 'paraCombination-r17' is reused for 'paramCombination-r18' (cf. Table 2).

In one example, a new table of parameter combination is used for 'paramCombination-r18'.

In one example, a table including existing Rel. 16 or Rel. 17 parameter combination(s) and new parameter combination(s) is used for 'paramCombination-r18'.

Any table including at least one of the combinations provided in the (sub)-tables in this disclosure can be an example for the table of 'paraCombination-r18'.

In one embodiment, a table used for 'paramCombination-r18' is designed based on the following parameter candidates:

Candidate values for $L_{max}$ (or $L_{sum}$): $\mathcal{L}_{max} = \{1, 2, 3, \ldots, 24\}$ where $$L_{max} \geq \sum_{n=1}^{N_{TRP}} L_n$$

and $L_n$ is L for CSI-RS resource n (TRP n); and $N_{TRP} \in \{1, 2, 3, 4\}$ is a number of CSI-RS resources (or TRPs) and is configured by NW via higher-layer signaling.

Candidate values for $p_v$, for $$v = 1, 2: \mathcal{P}_{12} = \left\{ \frac{1}{16}, \frac{1}{8}, \frac{1}{4}, \frac{3}{8}, \frac{1}{2} \right\}$$

Candidate values for $p_v$ for $$v = 3, 4: \mathcal{P}_{34} = \left\{ \frac{1}{32}, \frac{3}{16}, \frac{1}{16}, \frac{1}{8}, \frac{1}{4}, \frac{3}{8}, \frac{1}{2} \right\}$$

Candidate values for β:

$$\mathcal{B} = \left\{ \frac{1}{8}, \frac{1}{4}, \frac{1}{2}, \frac{3}{4}, 1 \right\}$$

In one example, the parameter names in (or related to) any table of this disclosure can be written in different names of parameters. For example, $L_{max}$ can be replaced by $L_{tot}$. For example, $N_{TRP}$ can be replaced by N.

In one example, any table including at least one of the combinations provided in the tables in this disclosure can be an example for the table of 'paraCombination-r18'.

TABLE 3

| paramCombination-r18 | $L_{max}$ | $p_v$ | | β |
|---|---|---|---|---|
| | | $v \in \{1, 2\}$ | $v \in \{3, 4\}$ | |
| 1 | 1 | 1/16 | 1/32 | 1/8 |
| 2 | 1 | 1/16 | 1/32 | 1/4 |
| 3 | 1 | 1/16 | 1/32 | 1/2 |
| 4 | 1 | 1/16 | 1/32 | 3/4 |
| 5 | 1 | 1/16 | 1/32 | 1 |
| 6 | 1 | 1/16 | 1/16 | 1/8 |
| 7 | 1 | 1/16 | 1/16 | 1/4 |
| 8 | 1 | 1/16 | 1/16 | 1/2 |
| 9 | 1 | 1/16 | 1/16 | 3/4 |
| 10 | 1 | 1/16 | 1/16 | 1 |
| 11 | 1 | 1/8 | 1/16 | 1/8 |
| 12 | 1 | 1/8 | 1/16 | 1/4 |
| 13 | 1 | 1/8 | 1/16 | 1/2 |
| 14 | 1 | 1/8 | 1/16 | 3/4 |
| 15 | 1 | 1/8 | 1/16 | 1 |
| 16 | 1 | 1/8 | 1/8 | 1/8 |
| 17 | 1 | 1/8 | 1/8 | 1/4 |
| 18 | 1 | 1/8 | 1/8 | 1/2 |
| 19 | 1 | 1/8 | 1/8 | 3/4 |
| 20 | 1 | 1/8 | 1/8 | 1 |
| 21 | 1 | 1/4 | 1/8 | 1/8 |
| 22 | 1 | 1/4 | 1/8 | 1/4 |
| 23 | 1 | 1/4 | 1/8 | 1/2 |
| 24 | 1 | 1/4 | 1/8 | 3/4 |
| 25 | 1 | 1/4 | 1/8 | 1 |
| 26 | 1 | 1/4 | 1/4 | 1/8 |
| 27 | 1 | 1/4 | 1/4 | 1/4 |
| 28 | 1 | 1/4 | 1/4 | 1/2 |
| 29 | 1 | 1/4 | 1/4 | 3/4 |
| 30 | 1 | 1/4 | 1/4 | 1 |
| 31 | 1 | 3/8 | 3/16 | 1/8 |
| 32 | 1 | 3/8 | 3/16 | 1/4 |
| 33 | 1 | 3/8 | 3/16 | 1/2 |
| 34 | 1 | 3/8 | 3/16 | 3/4 |
| 35 | 1 | 3/8 | 3/16 | 1 |
| 36 | 1 | 3/8 | 3/8 | 1/8 |
| 37 | 1 | 3/8 | 3/8 | 1/4 |
| 38 | 1 | 3/8 | 3/8 | 1/2 |
| 39 | 1 | 3/8 | 3/8 | 3/4 |
| 40 | 1 | 3/8 | 3/8 | 1 |
| 41 | 1 | 1/2 | 1/4 | 1/8 |
| 42 | 1 | 1/2 | 1/4 | 1/4 |
| 43 | 1 | 1/2 | 1/4 | 1/2 |
| 44 | 1 | 1/2 | 1/4 | 3/4 |
| 45 | 1 | 1/2 | 1/4 | 1 |
| 46 | 1 | 1/2 | 1/2 | 1/8 |
| 47 | 1 | 1/2 | 1/2 | 1/4 |
| 48 | 1 | 1/2 | 1/2 | 1/2 |
| 49 | 1 | 1/2 | 1/2 | 3/4 |
| 50 | 1 | 1/2 | 1/2 | 1 |
| 51 | 2 | 1/16 | 1/32 | 1/8 |

TABLE 3-continued

| paramCombination-r18 | $L_{max}$ | $p_\upsilon$ $\upsilon \in \{1, 2\}$ | $\upsilon \in \{3, 4\}$ | $\beta$ |
|---|---|---|---|---|
| 52 | 2 | 1/16 | 1/32 | 1/4 |
| 53 | 2 | 1/16 | 1/32 | 1/2 |
| 54 | 2 | 1/16 | 1/32 | 3/4 |
| 55 | 2 | 1/16 | 1/32 | 1 |
| 56 | 2 | 1/16 | 1/16 | 1/8 |
| 57 | 2 | 1/16 | 1/16 | 1/4 |
| 58 | 2 | 1/16 | 1/16 | 1/2 |
| 59 | 2 | 1/16 | 1/16 | 3/4 |
| 60 | 2 | 1/16 | 1/16 | 1 |
| 61 | 2 | 1/8 | 1/16 | 1/8 |
| 62 | 2 | 1/8 | 1/16 | 1/4 |
| 63 | 2 | 1/8 | 1/16 | 1/2 |
| 64 | 2 | 1/8 | 1/16 | 3/4 |
| 65 | 2 | 1/8 | 1/16 | 1 |
| 66 | 2 | 1/8 | 1/8 | 1/8 |
| 67 | 2 | 1/8 | 1/8 | 1/4 |
| 68 | 2 | 1/8 | 1/8 | 1/2 |
| 69 | 2 | 1/8 | 1/8 | 3/4 |
| 70 | 2 | 1/8 | 1/8 | 1 |
| 71 | 2 | 1/4 | 1/8 | 1/8 |
| 72 | 2 | 1/4 | 1/8 | 1/4 |
| 73 | 2 | 1/4 | 1/8 | 1/2 |
| 74 | 2 | 1/4 | 1/8 | 3/4 |
| 75 | 2 | 1/4 | 1/8 | 1 |
| 76 | 2 | 1/4 | 1/4 | 1/8 |
| 77 | 2 | 1/4 | 1/4 | 1/4 |
| 78 | 2 | 1/4 | 1/4 | 1/2 |
| 79 | 2 | 1/4 | 1/4 | 3/4 |
| 80 | 2 | 1/4 | 1/4 | 1 |
| 81 | 2 | 3/8 | 3/16 | 1/8 |
| 82 | 2 | 3/8 | 3/16 | 1/4 |
| 83 | 2 | 3/8 | 3/16 | 1/2 |
| 84 | 2 | 3/8 | 3/16 | 3/4 |
| 85 | 2 | 3/8 | 3/16 | 1 |
| 86 | 2 | 3/8 | 3/8 | 1/8 |
| 87 | 2 | 3/8 | 3/8 | 1/4 |
| 88 | 2 | 3/8 | 3/8 | 1/2 |
| 89 | 2 | 3/8 | 3/8 | 3/4 |
| 90 | 2 | 3/8 | 3/8 | 1 |
| 91 | 2 | 1/2 | 1/4 | 1/8 |
| 92 | 2 | 1/2 | 1/4 | 1/4 |
| 93 | 2 | 1/2 | 1/4 | 1/2 |
| 94 | 2 | 1/2 | 1/4 | 3/4 |
| 95 | 2 | 1/2 | 1/4 | 1 |
| 96 | 2 | 1/2 | 1/2 | 1/8 |
| 97 | 2 | 1/2 | 1/2 | 1/4 |
| 98 | 2 | 1/2 | 1/2 | 1/2 |
| 99 | 2 | 1/2 | 1/2 | 3/4 |
| 100 | 2 | 1/2 | 1/2 | 1 |
| 101 | 3 | 1/16 | 1/32 | 1/8 |
| 102 | 3 | 1/16 | 1/32 | 1/4 |
| 103 | 3 | 1/16 | 1/32 | 1/2 |
| 104 | 3 | 1/16 | 1/32 | 3/4 |
| 105 | 3 | 1/16 | 1/32 | 1 |
| . | . | . | . | . |
| . | . | . | . | . |
| . | . | . | . | . |
| 151 | 4 | 1/16 | 1/32 | 1/8 |
| 152 | 4 | 1/16 | 1/32 | 1/4 |
| 153 | 4 | 1/16 | 1/32 | 1/2 |
| 154 | 4 | 1/16 | 1/32 | 3/4 |
| 155 | 4 | 1/16 | 1/32 | 1 |
| . | . | . | . | . |
| . | . | . | . | . |
| . | . | . | . | . |
| 201 | 5 | 1/16 | 1/32 | 1/8 |
| . | . | . | . | . |
| . | . | . | . | . |
| . | . | . | . | . |
| 251 | 6 | 1/16 | 1/32 | 1/8 |
| . | . | . | . | . |
| . | . | . | . | . |
| . | . | . | . | . |

TABLE 3-continued

| paramCombination-r18 | $L_{max}$ | $p_\upsilon$ $\upsilon \in \{1, 2\}$ | $\upsilon \in \{3, 4\}$ | $\beta$ |
|---|---|---|---|---|
| 301 | 7 | 1/16 | 1/32 | 1/8 |
| . | . | . | . | . |
| . | . | . | . | . |
| 351 | 8 | 1/16 | 1/32 | 1/8 |
| . | . | . | . | . |
| . | . | . | . | . |
| 401 | 9 | 1/16 | 1/32 | 1/8 |
| . | . | . | . | . |
| . | . | . | . | . |
| 451 | 10 | 1/16 | 1/32 | 1/8 |
| . | . | . | . | . |
| . | . | . | . | . |
| 501 | 11 | 1/16 | 1/32 | 1/8 |
| . | . | . | . | . |
| . | . | . | . | . |
| 551 | 12 | 1/16 | 1/32 | 1/8 |
| . | . | . | . | . |
| . | . | . | . | . |
| 601 | 13 | 1/16 | 1/32 | 1/8 |
| . | . | . | . | . |
| . | . | . | . | . |
| 651 | 14 | 1/16 | 1/32 | 1/8 |
| . | . | . | . | . |
| . | . | . | . | . |
| 701 | 15 | 1/16 | 1/32 | 1/8 |
| . | . | . | . | . |
| . | . | . | . | . |
| 751 | 16 | 1/16 | 1/32 | 1/8 |
| . | . | . | . | . |
| . | . | . | . | . |
| 801 | 17 | 1/16 | 1/32 | 1/8 |
| . | . | . | . | . |
| . | . | . | . | . |
| 851 | 18 | 1/16 | 1/32 | 1/8 |
| . | . | . | . | . |
| . | . | . | . | . |
| 901 | 19 | 1/16 | 1/32 | 1/8 |
| . | . | . | . | . |
| . | . | . | . | . |
| 951 | 20 | 1/16 | 1/32 | 1/8 |
| . | . | . | . | . |
| . | . | . | . | . |
| 1001 | 21 | 1/16 | 1/32 | 1/8 |
| . | . | . | . | . |
| . | . | . | . | . |
| 1051 | 22 | 1/16 | 1/32 | 1/8 |
| . | . | . | . | . |
| . | . | . | . | . |
| 1101 | 23 | 1/16 | 1/32 | 1/8 |
| . | . | . | . | . |
| . | . | . | . | . |
| 1151 | 24 | 1/16 | 1/32 | 1/8 |
| . | . | . | . | . |
| . | . | . | . | . |
| 1196 | 24 | 1/2 | 1/2 | 1/8 |
| 1197 | 24 | 1/2 | 1/2 | 1/4 |


TABLE 3-continued

| paramCombination- | | $p_\upsilon$ | | |
|---|---|---|---|---|
| r18 | $L_{max}$ | $\upsilon \in \{1, 2\}$ | $\upsilon \in \{3, 4\}$ | β |
| 1198 | 24 | ½ | ½ | ½ |
| 1199 | 24 | ½ | ½ | ¾ |
| 1200 | 24 | ½ | ½ | 1 |

In Table 3, some rows were omitted for the sake of space limitation. The values in the omitted rows can clearly be determined based on earlier rows. Also, the table index numbers (from 1 to 1200) in Table 3 should be interpreted as just indexes for corresponding parameter combinations. That is, the table index number can be any value based on the ordering of parameter combinations and the number of parameter combinations in a table.

In one example, any sub-table of Table 3 can be an example for the table of 'paraCombination-r18'.

In one embodiment, any table including at least one of parameter combinations in a sub-table of Table 3 can be used for the table of 'paramCombination-r18', where the sub-table includes parameter combinations associated with $L_{max} \in \bar{L}_{max}$, where $\bar{L}_{max}$ is a subset of $\mathcal{L}_{max}$. For example, if $\bar{L}_{max}=\{8, 10, 12, 14, 16\}$, the sub-table includes the parameter combinations associated with $L_{max}=8, 10, 12, 14, 16$ in Table 3.

In one example, $\bar{L}_{max}=\{8, 10, 12, 14, 16\}$ and the sub-table includes parameter combinations associated with $L_{max}=\{8, 10, 12, 14, 16\}$ in Table 3.

In one example, $\bar{L}_{max}=\{6, 8, 10, 12\}$ and the sub-table includes parameter combinations associated with $L_{max}=\{6, 8, 10, 12\}$ in Table 3.

In one example, $\bar{L}_{max}=\{4, 6, 8\}$ and the sub-table includes parameter combinations associated with $L_{max}=\{4, 6, 8\}$ in Table 3.

In one example, $\bar{L}_{max}=\{2, 4\}$ and the sub-table includes parameter combinations associated with $L_{max}=\{2, 4\}$ in Table 3.

In one example, $\bar{L}_{max}=\{8, 10, 12, 14, 16, 18, 20, 22, 24\}$ and the sub-table includes parameter combinations associated with $L_{max}=\{8, 10, 12, 14, 16, 18, 20, 22, 24\}$ in Table 3.

In one example, $\bar{L}_{max}=\{6, 8, 10, 12, 14, 16, 18\}$ and the sub-table includes parameter combinations associated with $L_{max}=\{6, 8, 10, 12, 14, 16, 18\}$ in Table 3.

In one example, $\bar{L}_{max}=\{4, 6, 8, 10, 12\}$ and the sub-table includes parameter combinations associated with $L_{max}=\{4, 6, 8, 10, 12\}$ in Table 3.

In one example, $\bar{L}_{max}=\{2, 4, 6\}$ and the sub-table includes parameter combinations associated with $L_{max}=\{2, 4, 6\}$ in Table 3.

In one example, $\bar{L}_{max}=\{4, 5, 6, 7, 8, 9, 10, 11, 12, 13, 14, 15, 16, 17, 18, 19, 20, 22, 24\}$ and the sub-table includes parameter combinations associated with $L_{max}=\{4, 5, 6, 7, 8, 9, 10, 11, 12, 13, 14, 15, 16, 17, 18, 19, 20, 22, 24\}$ in Table 3.

In one example, $\bar{L}_{max}=\{3, 4, 5, 6, 7, 8, 9, 10, 11, 12, 13, 14, 16, 18\}$ and the sub-table includes parameter combinations associated with $L_{max}=\{3, 4, 5, 6, 7, 8, 9, 10, 11, 12, 13, 14, 16, 18\}$ in Table 3.

In one example, $\bar{L}_{max}=\{2, 3, 4, 5, 6, 7, 8, 10, 12\}$ and the sub-table includes parameter combinations associated with $L_{max}=\{2, 3, 4, 5, 6, 7, 8, 10, 12\}$ in Table 3.

In one example, $\bar{L}_{max}=\{1, 2, 4, 6\}$ and the sub-table includes parameter combinations associated with $L_{max}=\{1, 2, 4, 6\}$ in Table 3.

In one embodiment, $\bar{L}_{max}$ can be defined for each value of $N_{TRP}=\{1, 2, 3, 4\}$, and the sub-table includes parameter combinations associated with $L_{max} \in \bar{L}_{max}$ in Table 3 for each value of $N_{TRP}=\{1, 2, 3, 4\}$.

In one example, $\bar{L}_{max}$ can be defined as follow and the sub-table includes parameter combinations associated with $\bar{L}_{max}$ for each value of $N_{TRP}$:

$\bar{L}_{max}=\{8, 10, 12, 14, 16\}$ for $N_{TRP}=4$, $\bar{L}_{max}=\{6, 8, 10, 12\}$ for $N_{TRP}=3$, $\bar{L}_{max}=\{4, 6, 8\}$ for $N_{TRP}=2$, and $\bar{L}_{max}=\{2, 4\}$ for $N_{TRP}=1$.

In one example, $\bar{L}_{max}$ can be defined as follow and the sub-table includes parameter combinations associated with $\bar{L}_{max}$ for each value of $N_{TRP}$:

$\bar{L}_{max}=\{8, 10, 12, 14, 16, 18, 20, 22, 24\}$ for $N_{TRP}=4$, $\bar{L}_{max}=\{6, 8, 10, 12, 14, 16, 18\}$ for $N_{TRP}=3$, $\bar{L}_{max}=\{4, 6, 8, 10, 12\}$ for $N_{TRP}=2$, and $\bar{L}_{max}=\{2, 4, 6\}$ for $N_{TRP}=1$.

In one example, $\bar{L}_{max}$ can be defined as follow and the sub-table includes parameter combinations associated with $\bar{L}_{max}$ for each value of $N_{TRP}$:

$$\mathcal{L}_{max} = \{4, 5, 6, 7, 8, 9, 10, 11, 12, 13, 14, 15, 16, 17, 18, 19, 20, 22, 24\}$$
$$\text{for } N_{TRP} = 4,$$

$$\mathcal{L}_{max} = \{3, 4, 5, 6, 7, 8, 9, 10, 11, 12, 13, 14, 16, 18\} \text{ for } N_{TRP} = 3,$$

$$\mathcal{L}_{max} = \{2, 3, 4, 5, 6, 7, 8, 10, 12\} \text{ for } N_{TRP} = 2, \text{ and}$$

$$\mathcal{L}_{max} = \{1, 2, 4, 6\} \text{ for } N_{TRP} = 1.$$

In one embodiment, any table including at least one of parameter combinations in a sub-table of Table 3 can be used for the table of 'paramCombination-r18', where the sub-table includes parameter combinations associated with $(\{p_\upsilon\}_{\upsilon=1,2}, \{p_\upsilon\}_{\upsilon=3,4}) \in \bar{\mathcal{P}}$, where $\bar{\mathcal{P}}$ is a subset of $\mathcal{P}$, where $\mathcal{P}=\{(x, y) | x \in \mathcal{P}_{12}, y \in \mathcal{P}_{34}\}$. For example, if $$\bar{\mathcal{P}} = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\},$$

the sub table includes the parameter combinations associated with $$(\{p_\upsilon\}_{\upsilon=1,2}, \{p_\upsilon\}_{\upsilon=3,4}) = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\}$$

in Table 3.

In one example, $$\bar{\mathcal{P}} = \left\{ \left( \frac{1}{4}, \frac{1}{8} \right), \left( \frac{1}{4}, \frac{1}{4} \right), \left( \frac{1}{2}, \frac{1}{4} \right) \right\}$$

and the sub-table includes parameter combinations associated with if $$(\{p_v\}_{v=1,2}, \{p_v\}_{v=3,4}) = \left\{ \left( \frac{1}{4}, \frac{1}{8} \right), \left( \frac{1}{4}, \frac{1}{4} \right), \left( \frac{1}{2}, \frac{1}{4} \right) \right\}$$

in Table 3.

In one example, $$\bar{\mathcal{P}} = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right) \right\}$$

and the Sub-table includes parameter combinations associated with if $$(\{p_v\}_{v=1,2}, \{p_v\}_{v=3,4}) = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right) \right\}$$

in Table 3.

In one example, $$\bar{\mathcal{P}} = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\}$$

and the sub table includes parameter combinations associated with if $$(\{p_v\}_{v=1,2}, \{p_v\}_{v=3,4}) = \left\{ \left( \frac{1}{8}, \frac{1}{16} \right), \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\}$$

in Table 3.

In one example, $$\bar{\mathcal{P}} = \left\{ \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\}$$

and the sub-table includes parameter combinations associated with if $$(\{p_v\}_{v=1,2}, \{p_v\}_{v=3,4}) = \left\{ \left( \frac{1}{4}, \frac{1}{8} \right), \left( \frac{1}{4}, \frac{1}{4} \right), \left( \frac{1}{2}, \frac{1}{4} \right), \left( \frac{1}{2}, \frac{1}{2} \right) \right\}$$

in Table 3.

In one embodiment, any table including at least one of parameter combinations in a sub-table of Table 3 can be used for the table of 'paramCombination-r18', where the sub-table includes combinations associated with $\beta \in \bar{\mathfrak{P}}$, where $\bar{\mathfrak{P}}$ is a subset of $\mathfrak{P}$. For example, if $$\bar{\mathfrak{P}} = \left\{ \frac{1}{8}, \frac{1}{4}, \frac{1}{2}, \frac{3}{4} \right\},$$

the sub table includes the parameter combinations associated with $$\beta = \frac{1}{8}, \frac{1}{4}, \frac{1}{2}, \frac{3}{4}$$

in Table 3.

In one example, $$\bar{\mathfrak{P}} = \left\{ \frac{1}{4}, \frac{1}{2}, \frac{3}{4} \right\}$$

and the sub-table includes parameter combinations associated with $$\beta = \frac{1}{4}, \frac{1}{2}, \frac{3}{4}$$

in Table 3.

In one example, $$\bar{\mathfrak{P}} = \left\{ \frac{1}{8}, \frac{1}{4}, \frac{1}{2}, \frac{3}{4} \right\}$$

and the sub table includes parameter combinations associated with $$\beta = \frac{1}{8}, \frac{1}{4}, \frac{1}{2}, \frac{3}{4}$$

in Table 3.

In one example, $$\bar{\mathfrak{P}} = \left\{ \frac{1}{8}, \frac{1}{4}, \frac{1}{2}, \frac{3}{4}, 1 \right\}$$

and the sub-table includes parameter combinations associated with $$\beta = \frac{1}{8}, \frac{1}{4}, \frac{1}{2}, \frac{3}{4},$$

1 in Table 3.

In one example, $$\bar{\mathfrak{P}} = \left\{ \frac{1}{4}, \frac{1}{2}, \frac{3}{4}, 1 \right\}$$

and the sub-table includes parameter combinations associated with $$\beta = \frac{1}{4}, \frac{1}{2}, \frac{3}{4},$$

in Table 3.

In one example, $$\bar{\mathfrak{P}} = \left\{ \frac{1}{8}, \frac{1}{4}, \frac{1}{2} \right\}$$

and the sub table includes parameter combinations associated with $$\beta = \frac{1}{8}, \frac{1}{4}, \frac{1}{2}$$

in Table 3.

In one embodiment, any table including at least one of parameter combinations in a sub-table of Table 3 can be used for the table of 'paramCombination-r18', where the sub-table includes parameter combinations associated with $L_{max} \in \bar{\mathcal{L}}_{max}$ and $(\{p_v\}_{v=1,2}, \{p_v\}_{v=3,4}) \in \bar{\mathcal{P}}$ and $\beta \in \bar{\mathfrak{P}}$, where $L_{max} \in \bar{\mathcal{L}}_{max}$ is defined in embodiment 1.1.1, $(\{p_v\}_{v=1,2}, \{p_v\}_{v=3,4}) \in \bar{\mathcal{P}}$ is defined in one or more embodiments herein, and $\beta \in \bar{\mathfrak{P}}$ is defined in one or more embodiments herein.

In one example, the sub-table includes parameter combinations associated with:

$$L_{max} \in \bar{\mathcal{L}}_{max} = \{8, 10, 12, 14, 16\} \text{ and}$$

$$(\{p_v\}_{v=1,2}, \{p_v\}_{v=3,4}) \in \bar{\mathcal{P}} = \left\{ \left(\frac{1}{8}, \frac{1}{16}\right), \left(\frac{1}{4}, \frac{1}{8}\right), \left(\frac{1}{4}, \frac{1}{4}\right), \left(\frac{1}{2}, \frac{1}{4}\right) \right\} \text{ and}$$

$$\beta \in \bar{\mathfrak{P}} = \left\{ \frac{1}{8}, \frac{1}{4}, \frac{1}{2}, \frac{3}{4} \right\} \text{ for } N_{TRP} = 4,$$

$$\bar{\mathcal{L}}_{max} = \{6, 8, 10, 12\} \text{ and}$$

$$(\{p_v\}_{v=1,2}, \{p_v\}_{v=3,4}) \in \bar{\mathcal{P}} = \left\{ \left(\frac{1}{8}, \frac{1}{16}\right), \left(\frac{1}{4}, \frac{1}{8}\right), \left(\frac{1}{4}, \frac{1}{4}\right), \left(\frac{1}{2}, \frac{1}{4}\right) \right\} \text{ and}$$

$$\beta \in \bar{\mathfrak{P}} = \left\{ \frac{1}{8}, \frac{1}{4}, \frac{1}{2}, \frac{3}{4} \right\} \text{ for } N_{TRP} = 3,$$

$$\bar{\mathcal{L}}_{max} = \{4, 6, 8\} \text{ and}$$

$$(\{p_v\}_{v=1,2}, \{p_v\}_{v=3,4}) \in \bar{\mathcal{P}} = \left\{ \left(\frac{1}{8}, \frac{1}{16}\right), \left(\frac{1}{4}, \frac{1}{8}\right), \left(\frac{1}{4}, \frac{1}{4}\right), \left(\frac{1}{2}, \frac{1}{4}\right) \right\} \text{ and}$$

$$\beta \in \bar{\mathfrak{P}} = \left\{ \frac{1}{8}, \frac{1}{4}, \frac{1}{2}, \frac{3}{4} \right\} \text{ for } N_{TRP} = 2, \text{ and}$$

$$\bar{\mathcal{L}}_{max} = \{2, 4\} \text{ and}$$

$$(\{p_v\}_{v=1,2}, \{p_v\}_{v=3,4}) \in \bar{\mathcal{P}} = \left\{ \left(\frac{1}{8}, \frac{1}{16}\right), \left(\frac{1}{4}, \frac{1}{8}\right), \left(\frac{1}{4}, \frac{1}{4}\right), \left(\frac{1}{2}, \frac{1}{4}\right) \right\} \text{ and}$$

$$\beta \in \bar{\mathfrak{P}} = \left\{ \frac{1}{8}, \frac{1}{4}, \frac{1}{2}, \frac{3}{4} \right\} \text{ for } N_{TRP} = 1.$$

In one embodiment, a subset of parameter combinations in a table designed based on one or more embodiments herein for the table of 'paramCombination-r18' can be restricted not to configure based on one or more aspects such as a number of TRPs ($N_{TRP}$), a number of SBs K (numberOfPMI-SubbandsPerCQI-Subband), and a number of CSI-RS ports ($N_1 N_2$ or $P_{CSI-RS}$).

In one example, the parameter combination with $L_n = 4$ and/or 6 for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}<3$ (i.e., $N_{TRP}=1, 2$).

In one example (C5), the condition corresponds to the case when $N_{TRP}<s$, where s is a threshold, which can be fixed, or configured, or subject to UE capability.

In one example (C6), the condition corresponds to the case when $N_{TRP}\leq s$, where s is a threshold, which can be fixed, or configured, or subject to UE capability.

In one example (C7), the condition corresponds to the case when $N_{TRP}>s$, where s is a threshold, which can be fixed, or configured, or subject to UE capability.

In one example (C8), the condition corresponds to the case when $N_{TRP}\geq s$, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C10), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C11), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $$p_v = \frac{1}{2}$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}$<3 (i.e., $N_{TRP}$=1, 2).

In one example (C5), the condition corresponds to the case when $N_{TRP}$<s, where s is a threshold, which can be fixed, or configured, or subject to UE capability.

In one example (C6), the condition corresponds to the case when $N_{TRP}$≤s, where s is a threshold, which can be fixed, or configured, or subject to UE capability.

In one example (C7), the condition corresponds to the case when $N_{TRP}$>s, where s is a threshold, which can be fixed, or configured, or subject to UE capability.

In one example (C8), the condition corresponds to the case when $N_{TRP}$≥s, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $$p_v = \frac{1}{16} \text{ and/or } p_v = \frac{1}{8}$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}$<3 (i.e., $N_{TRP}$=1, 2).

In one example (C5), the condition corresponds to the case when $N_{TRP}$<s, where s is a threshold, which can be fixed, or configured, or subject to UE capability.

In one example (C6), the condition corresponds to the case when $N_{TRP}$≤s, where s is a threshold, which can be fixed, or configured, or subject to UE capability.

In one example (C7), the condition corresponds to the case when $N_{TRP}$>s, where s is a threshold, which can be fixed, or configured, or subject to UE capability.

In one example (C8), the condition corresponds to the case when $N_{TRP}$≥s, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $$\beta = \frac{1}{2} \text{ and/or } \frac{3}{4}$$

and/or ¾ and/or 1 for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}<3$ (i.e., $N_{TRP}=1, 2$).

In one example (C5), the condition corresponds to the case when $N_{TRP}<s$, where s is a threshold, which can be fixed, or configured, or subject to UE capability.

In one example (C6), the condition corresponds to the case when $N_{TRP}\leq s$, where s is a threshold, which can be fixed, or configured, or subject to UE capability.

In one example (C7), the condition corresponds to the case when $N_{TRP}>s$, where s is a threshold, which can be fixed, or configured, or subject to UE capability.

In one example (C8), the condition corresponds to the case when $N_{TRP}\geq s$, where s is a threshold, which can be fixed, or configured, or subject to UE capability.

In one example (C9), the condition corresponds to the case when $K<k$, where k is a threshold, which can be fixed, or configured, or subject to UE capability.

In one example (C10), the condition corresponds to the case when $K\leq k$, where k is a threshold, which can be fixed, or configured, or subject to UE capability.

In one example (C11), the condition corresponds to the case when $K>k$, where k is a threshold, which can be fixed, or configured, or subject to UE capability.

In one example (C12), the condition corresponds to the case when $K\geq k$, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $L_n=4$ and/or 6 and/or $$p_v = \frac{1}{2} \text{ and/or } \frac{1}{8} \text{ and/or } \frac{1}{16}$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)$\geq$t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}<3$ (i.e., $N_{TRP}=1, 2$).

In one example (C5), the condition corresponds to the case when $N_{TRP}<s$, where s is a threshold, which can be fixed, or configured, or subject to UE capability.

In one example (C6), the condition corresponds to the case when $N_{TRP}\leq s$, where s is a threshold, which can be fixed, or configured, or subject to UE capability.

In one example (C7), the condition corresponds to the case when $N_{TRP}>s$, where s is a threshold, which can be fixed, or configured, or subject to UE capability.

In one example (C8), the condition corresponds to the case when $N_{TRP}\geq s$, where s is a threshold, which can be fixed, or configured, or subject to UE capability.

In one example (C9), the condition corresponds to the case when $K<k$, where k is a threshold, which can be fixed, or configured, or subject to UE capability.

In one example (C10), the condition corresponds to the case when $K\leq k$, where k is a threshold, which can be fixed, or configured, or subject to UE capability.

In one example (C11), the condition corresponds to the case when $K>k$, where k is a threshold, which can be fixed, or configured, or subject to UE capability.

In one example (C12), the condition corresponds to the case when $K\geq k$, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $L_n=4$ and/or 6 and/or $$\beta = \frac{1}{2} \text{ and/or } \frac{3}{4} \text{ and/or } 1$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)$\geq$t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP}<3$ (i.e., $N_{TRP}=1, 2$).

In one example (C5), the condition corresponds to the case when $N_{TRP}<s$, where s is a threshold, which can be fixed, or configured, or subject to UE capability.

In one example (C6), the condition corresponds to the case when $N_{TRP} \leq s$, where s is a threshold, which can be fixed, or configured, or subject to UE capability.

In one example (C7), the condition corresponds to the case when $N_{TRP} > s$, where s is a threshold, which can be fixed, or configured, or subject to UE capability.

In one example (C8), the condition corresponds to the case when $N_{TRP} \geq s$, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $$p_v = \frac{1}{2} \text{ and/or } \frac{1}{8} \text{ and/or } \frac{1}{16} \text{ and/or } \beta = \frac{1}{2} \text{ and/or } \frac{3}{4} \text{ and/or } 1$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP} < 3$ (i.e., $N_{TRP} = 1, 2$).

In one example (C5), the condition corresponds to the case when $N_{TRP} < s$, where s is a threshold, which can be fixed, or configured, or subject to UE capability.

In one example (C6), the condition corresponds to the case when $N_{TRP} \leq s$, where s is a threshold, which can be fixed, or configured, or subject to UE capability.

In one example (C7), the condition corresponds to the case when $N_{TRP} > s$, where s is a threshold, which can be fixed, or configured, or subject to UE capability.

In one example (C8), the condition corresponds to the case when $N_{TRP} \geq s$, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

In one example, the parameter combination with $L_n = 4$ and/or 6 and/or $$p_v = \frac{1}{2} \text{ and/or } \frac{1}{8} \text{ and/or } \frac{1}{16} \text{ and/or } \beta = \frac{1}{2} \text{ and/or } \frac{3}{4} \text{ and/or } 1$$

for any n can be used/reported (by the UE) or configured (by the NW) under a condition.

In one example (C1), the condition corresponds to the case when number of CSI-RS ports (for a TRP)=32.

In one example (C2), the condition corresponds to the case when number of CSI-RS ports (for a TRP)≥t, where t is a threshold, which can be fixed, or configured, or subject to UE capability.

In one example (C3), the condition corresponds to the case when number of CSI-RS ports (for a TRP)>t, where t is a threshold, which can be fixed, or configured, or subject to UE capability.

In one example (C4), the condition corresponds to the case when $N_{TRP} < 3$ (i.e., $N_{TRP} = 1, 2$).

In one example (C5), the condition corresponds to the case when $N_{TRP} < s$, where s is a threshold, which can be fixed, or configured, or subject to UE capability.

In one example (C6), the condition corresponds to the case when $N_{TRP} \leq s$, where s is a threshold, which can be fixed, or configured, or subject to UE capability.

In one example (C7), the condition corresponds to the case when $N_{TRP} > s$, where s is a threshold, which can be fixed, or configured, or subject to UE capability.

In one example (C8), the condition corresponds to the case when $N_{TRP} \geq s$, where s is a threshold, which can be fixed, or configured, or subject to UE capability.

In one example (C9), the condition corresponds to the case when K<k, where k is a threshold, which can be fixed, or configured, or subject to UE capability.

In one example (C10), the condition corresponds to the case when K≤k, where k is a threshold, which can be fixed, or configured, or subject to UE capability.

In one example (C11), the condition corresponds to the case when K>k, where k is a threshold, which can be fixed, or configured, or subject to UE capability.

In one example (C12), the condition corresponds to the case when K≥k, where k is a threshold, which can be fixed, or configured, or subject to UE capability.

In one example (C13), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction).

In one example (C14), the condition corresponds to (C1 and/or C2 and/or C3 and/or C4 and/or C5 and/or C6 and/or C7 and/or C8 and/or C9 and/or C10 and/or C11 and/or C12) and the value of R is 1 (e.g., configured via higher layer numberOfPMIsubbandPerCQIsubband).

In one example (C15), the condition corresponds to (C1 and/or C2 and/or C3 and/or C4 and/or C5 and/or C6 and/or C7 and/or C8 and/or C9 and/or C10 and/or C11 and/or C12) and the max rank value (for RI reporting) is 2 (e.g., configured via RI-restriction), and the value of R is 1 (e.g., configured via higher layer numberOfPMIsubbandPerCQIsubband).

On Parameter Combination Table on $L_n$, $L_{max}$ ($L_{tot}$ or $L_{sum}$)

In one embodiment, on the SD basis selection for (Rel-18) Type-II codebook refinement for CJT mTRP, each of the $\{L_n, n=1, \ldots, N_{TRP}\}$ is configured by NW via higher-layer (RRC) signaling, where $N_{TRP}$ is a number of TRPs configured by the NW.

In one example, $L_n \in \{2, 4, 6\}$. In one example, $L_n \in \{1, 2, 4, 6\}$. In one example, $L_n \in \{1, 2, 3, 4, 5, 6\}$. In one example, $L_n \in \{1, 2, 3, 4\}$. In one example, $L_n \in \{1, 2, 3\}$. In one example, $L_n \in \{1, 2, 4\}$. In one example, $L_n$ can be selected from $\mathcal{L}_n$, where $\mathcal{L}_n$ is a subset of $\{1, 2, 3, 4, 5, 6\}$.

In one embodiment, on the SD basis selection for (Rel-18) Type-II codebook refinement for CJT mTRP, a value of $L_{max}$, where $$L_{max} \geq \sum_{n=1}^{N_{TRP}} L_n$$

and/or the (relative) value(s) of $\{L_n, n=1, \ldots, N_{TRP}\}$ are configured by NW via higher-layer (RRC) signaling, where $N_{TRP}$ is a number of TRPs (CSI-RS resources) configured by the NW. The relative value(s) of $\{L_n, n=1, \ldots, N_{TRP}\}$ can be signaled by using a joint indicator or multiple separate indicators.

In one embodiment, on the SD basis selection for (Rel-18) Type-II codebook refinement for CJT mTRP, a set of $N_L > 1$ combinations of values for $\{L_n, n=1, \ldots, N_{TRP}\}$ is configured by NW via higher-layer (RRC) signaling, where $N_{TRP}$ is a number of TRPs (CSI-RS resources) configured by the NW. The $N_L$ combinations of value(s) for $\{L_n, n=1, \ldots, N_{TRP}\}$ can be signaled by using a joint indicator or multiple separate indicators. In one example, $N_L=1$. In another example, $N_L > 1$.

In one example, $L_n \in \{2, 4, 6\}$. In one example, $L_n \in \{1, 2, 4, 6\}$. In one example, $L_n \in \{1, 2, 3, 4, 5, 6\}$. In one example, $L_n \in \{1, 2, 3, 4\}$. In one example, $L_n \in \{1, 2, 3\}$. In one example, $L_n \in \{1, 2, 4\}$. In one example, $L_n$ can be selected from $\mathcal{L}_n$, where $\mathcal{L}_n$ is a subset of $\{1, 2, 3, 4, 5, 6\}$.

In one example, $\{L_n\}$ values can be configured based on at least one of the tables (or any table (i.e., sub-table, whole table) that can be constructed as) described in this disclosure.

In one example, $N_L$ can be explicitly configured via higher-layer (RRC) signaling with a separate parameter. The possible values for $N_L$ are a set of $\mathcal{N}$, i.e.; one of the values is selected from $\mathcal{N}$. Let denote a total number of a table including combinations of values for $\{L_n, n=1, \ldots, N_{TRP}\}$ by $N_T$. In one example, $$\left\lceil \log_2 \binom{N_T}{N_L} \right\rceil - \text{bit}$$

size parameter can be configured to indicate $N_L$ combinations of values for $\{L_n, n=1, \ldots, N_{TRP}\}$. In one example, the table can be any table (whole table or sub-table) described in this disclosure or any table that can be constructed as described in this disclosure. In one example, the table can be any table described in this disclosure (or any table that can be constructed as described in this disclosure) wherein N is replaced by $N_{TRP}$. In one example, the table can be any table described in this disclosure (or any table that can be constructed as described in this disclosure) wherein $L_{tot}$ is replaced by $L_{max}$. In one example, when N is replaced by $N_{TRP}$ in the table, a UE applies $L_n$ for CSI-RS resource (or TRP index) n, for $n=1, \ldots, N_{TRP}$. For example, when an $N_{TRP}$-bit bitmap for TRP selection is reported, the UE uses $L_n$ values for n values corresponding to the selected TRPs only, which are indicated in the bitmap.

In one example, $N_L$ is implicitly determined or configured via higher-layer RRC signaling.

In one example, an $N_T$-bit bitmap is used to indicate $N_L$ combinations of values for $\{L_n, n=1, \ldots, N_{TRP}\}$, and $N_L$ can be inferred from the configured $N_T$-bit bitmap.

(a) In one example, $N_L$ combinations of values for $\{L_n, n=1, \ldots, N_{TRP}\}$ are determined from the configured $\{L_n\}$ values and its associated $L_{tot}$ value. For example, one combination of the values for $\{L_n, n=1, \ldots, N_{TRP}\}$ is configured, and other combinations of the values for $\{L_n, n=1, \ldots, N_{TRP}\}$ associated with the same $L_{tot}$ for the configured combination are determined as $N_L-1$ combinations of values $\{L_n, n=1, \ldots, N_{TRP}\}$.

(b) $N_L$ combinations whose $L_{tot}$ (or $L_{max}$) value is less than (or equal to) $L_{tot}$ (or $L_{max}$) value associated with the configured $\{L_n\}$ values can be determined.

In one example, $N_L$ combinations of values for $\{L_n, n=1, \ldots, N_{TRP}\}$ are determined from the configured $N_{TRP}$ (or N) and $L_{tot}$ (or $L_{max}$). For example, the combinations of values for $\{L_n, n=1, \ldots, N_{TRP}\}$ are determined, in any table (whole table or sub-table) described in this disclosure, corresponding to the configured $N_{TRP}$ (or N) and $L_{tot}$ (or $L_{max}$).

In one example, when $N_L > 1$, a UE reports an indicator with the size of $\lceil \log_2 N_L \rceil$-bit to indicate one selected combination of values for $\{L_n, n=1, \ldots, N_{TRP}\}$ in CSI part 1.

In one example, when $N_L=1$, a UE follows the configured $\{L_n\}$ values, hence not reported.

In one example, $N_L$ combinations of $\{L_n\}$ is subject to the UE capability on $L_{tot}$ or $L_{max}$.

When $N=N_{TRP}$ is configured, (a) can be applied. When $N=N_{TRP}$ is not configured (i.e., $N<=N_{TRP}$), (b) can be applied.

When $N=N_{TRP}$ is configured, one example above can be applied. When $N=N_{TRP}$ is not configured (i.e., $N<=N_{TRP}$), another example above can be applied.

Table 4 can be used for configuring $\{L_n\}$ values (or $L_{tot}=\Sigma_n L_n$). In one example, only a subset of the table is used/configured. For example, the portion of the table corresponding to $L_{tot}>t$ can't be used, where t is threshold that can be fixed (e.g., 18 or 20 or 22 or 24), or configured, or reported by the UE (via UE capability).

TABLE 4

| Index | $N_{TRP}$ (or N) | $L_1$ | $L_2$ | $L_3$ | $L_4$ | $L_{tot}$ (or $L_{max}$) |
|---|---|---|---|---|---|---|
| 1 | 1 | 2 | | | | 2 |
| 2 | | 4 | | | | 4 |
| 3 | | 6 | | | | 6 |
| 4 | 2 | 2 | 2 | | | 4 |
| 5 | | 2 | 4 | | | 6 |
| 6 | | 2 | 6 | | | 8 |
| 7 | | 4 | 2 | | | 6 |
| 8 | | 4 | 4 | | | 8 |
| 9 | | 4 | 6 | | | 10 |
| 10 | | 6 | 2 | | | 8 |
| 11 | | 6 | 4 | | | 10 |
| 12 | | 6 | 6 | | | 12 |
| 13 | 3 | 2 | 2 | 2 | | 6 |
| 14 | | 2 | 2 | 4 | | 8 |
| 15 | | 2 | 2 | 6 | | 10 |
| 16 | | 2 | 4 | 2 | | 8 |
| 17 | | 2 | 4 | 4 | | 10 |
| 18 | | 2 | 4 | 6 | | 12 |
| 19 | | 2 | 6 | 2 | | 10 |
| 20 | | 2 | 6 | 4 | | 12 |
| 21 | | 2 | 6 | 6 | | 14 |
| 22 | | 4 | 2 | 2 | | 8 |
| 23 | | 4 | 2 | 4 | | 10 |
| 24 | | 4 | 2 | 6 | | 12 |
| 25 | | 4 | 4 | 2 | | 10 |
| 26 | | 4 | 4 | 4 | | 12 |
| 27 | | 4 | 4 | 6 | | 14 |
| 28 | | 4 | 6 | 2 | | 12 |
| 29 | | 4 | 6 | 4 | | 14 |
| 30 | | 4 | 6 | 6 | | 16 |
| 31 | | 6 | 2 | 2 | | 10 |
| 32 | | 6 | 2 | 4 | | 12 |
| 33 | | 6 | 2 | 6 | | 14 |
| 34 | | 6 | 4 | 2 | | 12 |
| 35 | | 6 | 4 | 4 | | 14 |
| 36 | | 6 | 4 | 6 | | 16 |
| 37 | | 6 | 6 | 2 | | 14 |
| 38 | | 6 | 6 | 4 | | 16 |
| 39 | | 6 | 6 | 6 | | 18 |
| 40 | 4 | 2 | 2 | 2 | 2 | 8 |
| 41 | | 2 | 2 | 2 | 4 | 10 |
| 42 | | 2 | 2 | 2 | 6 | 12 |
| 43 | | 2 | 2 | 4 | 2 | 10 |
| 44 | | 2 | 2 | 4 | 4 | 12 |
| 45 | | 2 | 2 | 4 | 6 | 14 |
| 46 | | 2 | 2 | 6 | 2 | 12 |
| 47 | | 2 | 2 | 6 | 4 | 14 |
| 48 | | 2 | 2 | 6 | 6 | 16 |
| 49 | | 2 | 4 | 2 | 2 | 10 |
| 50 | | 2 | 4 | 2 | 4 | 12 |
| 51 | | 2 | 4 | 2 | 6 | 14 |
| 52 | | 2 | 4 | 4 | 2 | 12 |
| 53 | | 2 | 4 | 4 | 4 | 14 |
| 54 | | 2 | 4 | 4 | 6 | 16 |
| 55 | | 2 | 4 | 6 | 2 | 14 |
| 56 | | 2 | 4 | 6 | 4 | 16 |
| 57 | | 2 | 4 | 6 | 6 | 18 |
| 58 | | 2 | 6 | 2 | 2 | 12 |

TABLE 4-continued

| Index | $N_{TRP}$ (or N) | $L_1$ | $L_2$ | $L_3$ | $L_4$ | $L_{tot}$ (or $L_{max}$) |
|---|---|---|---|---|---|---|
| 59 | | 2 | 6 | 2 | 4 | 14 |
| 60 | | 2 | 6 | 2 | 6 | 16 |
| 61 | | 2 | 6 | 4 | 2 | 14 |
| 62 | | 2 | 6 | 4 | 4 | 16 |
| 63 | | 2 | 6 | 4 | 6 | 18 |
| 64 | | 2 | 6 | 6 | 2 | 16 |
| 65 | | 2 | 6 | 6 | 4 | 18 |
| 66 | | 2 | 6 | 6 | 6 | 20 |
| 67 | | 4 | 2 | 2 | 2 | 10 |
| 68 | | 4 | 2 | 2 | 4 | 12 |
| 69 | | 4 | 2 | 2 | 6 | 14 |
| 70 | | 4 | 2 | 4 | 2 | 12 |
| 71 | | 4 | 2 | 4 | 4 | 14 |
| 72 | | 4 | 2 | 4 | 6 | 16 |
| 73 | | 4 | 2 | 6 | 2 | 14 |
| 74 | | 4 | 2 | 6 | 4 | 16 |
| 75 | | 4 | 2 | 6 | 6 | 18 |
| 76 | | 4 | 4 | 2 | 2 | 12 |
| 77 | | 4 | 4 | 2 | 4 | 14 |
| 78 | | 4 | 4 | 2 | 6 | 16 |
| 79 | | 4 | 4 | 4 | 2 | 14 |
| 80 | | 4 | 4 | 4 | 4 | 16 |
| 81 | | 4 | 4 | 4 | 6 | 18 |
| 82 | | 4 | 4 | 6 | 2 | 16 |
| 83 | | 4 | 4 | 6 | 4 | 18 |
| 84 | | 4 | 4 | 6 | 6 | 20 |
| 85 | | 4 | 6 | 2 | 2 | 14 |
| 86 | | 4 | 6 | 2 | 4 | 16 |
| 87 | | 4 | 6 | 2 | 6 | 18 |
| 88 | | 4 | 6 | 4 | 2 | 16 |
| 89 | | 4 | 6 | 4 | 4 | 18 |
| 90 | | 4 | 6 | 4 | 6 | 20 |
| 91 | | 4 | 6 | 6 | 2 | 18 |
| 92 | | 4 | 6 | 6 | 4 | 20 |
| 93 | | 4 | 6 | 6 | 6 | 22 |
| 94 | | 6 | 2 | 2 | 2 | 12 |
| 95 | | 6 | 2 | 2 | 4 | 14 |
| 96 | | 6 | 2 | 2 | 6 | 16 |
| 97 | | 6 | 2 | 4 | 2 | 14 |
| 98 | | 6 | 2 | 4 | 4 | 16 |
| 99 | | 6 | 2 | 4 | 6 | 18 |
| 100 | | 6 | 2 | 6 | 2 | 16 |
| 101 | | 6 | 2 | 6 | 4 | 18 |
| 102 | | 6 | 2 | 6 | 6 | 20 |
| 103 | | 6 | 4 | 2 | 2 | 14 |
| 104 | | 6 | 4 | 2 | 4 | 16 |
| 105 | | 6 | 4 | 2 | 6 | 18 |
| 106 | | 6 | 4 | 4 | 2 | 16 |
| 107 | | 6 | 4 | 4 | 4 | 18 |
| 108 | | 6 | 4 | 4 | 6 | 20 |
| 109 | | 6 | 4 | 6 | 2 | 18 |
| 110 | | 6 | 4 | 6 | 4 | 20 |
| 111 | | 6 | 4 | 6 | 6 | 22 |
| 112 | | 6 | 6 | 2 | 2 | 16 |
| 113 | | 6 | 6 | 2 | 4 | 18 |
| 114 | | 6 | 6 | 2 | 6 | 20 |
| 115 | | 6 | 6 | 4 | 2 | 18 |
| 116 | | 6 | 6 | 4 | 4 | 20 |
| 117 | | 6 | 6 | 4 | 6 | 22 |
| 118 | | 6 | 6 | 6 | 2 | 20 |
| 119 | | 6 | 6 | 6 | 4 | 22 |
| 120 | | 6 | 6 | 6 | 6 | 24 |

In one example, NW can configure the sub-table of Table 4 associated with $N \le N_{TRP}$ and selects/indicates/configures one index in the sub-table.

For example, when $N_{TRP}=4$ is configured by higher-layer signalling, the NW considers the whole table of Table 4 and selects/indicates/configures one index. In this case, an indicator with $\lceil \log_2 120 \rceil =7$ bits is needed to indicate $\{L_n\}$ values.

For example, when $N_{TRP}=3$ is configured by higher-layer signalling, the NW considers the sub-table of Table 4 having from index 1 to index 39 (those are associated with $N \le N_{TRP}=3$) and selects/indicates/configures one index. In this case, an indicator with $\lceil \log_2 39 \rceil = 6$ bits is needed to indicate $\{L_n\}$ values.

For example, when $N_{TRP}=2$ is configured by higher-layer signalling, the NW considers the sub-table of Table 4 having from index 1 to index 12 (those are associated with $N \leq N_{TRP}=2$) and selects/indicates/configures one index. In this case, an indicator with $\lceil \log_2 12 \rceil = 4$ bits is needed to indicate $\{L_n\}$ values.

For example, when $N_{TRP}=1$ is configured by higher-layer signalling, the NW considers the sub-table of Table 4 having from index 1 to index 3 (those are associated with $N \leq N_{TRP}=1$) and selects/indicates/configures one index. In this case, an indicator with $\lceil \log_2 3 \rceil = 2$ bit is needed to indicate $\{L_n\}$ values.

When $N < N_{TRP}$ is selected (via $N_{TRP}$-bit bitmap), the indexes of the selected TRPs (or CSI-RS resources) can be remapped to 1 to N, which will be corresponding to the indexes of indicated $\{L_n\}$. In one example, from the lowest index to highest index for the selected TRPs, their indexes are remapped to 1 to N. For example, when $N_{TRP}=4$ and the 4-bit bitmap indicator for TRP selection is '0101' (assuming LSB corresponds to TRP 1 . . . MSB corresponds to TRP 4), the selected TRP 1 and TRP 3 are associated with $L_1$ and $L_2$, respectively. In another example, from the highest index to lowest index for the selected TRPs, their indexes are remapped to 1 to N. For example, when $N_{TRP}=4$ and the 4-bit bitmap indicator for TRP selection is '0101' (assuming LSB corresponds to TRP 1 . . . MSB corresponds to TRP 4), the selected TRP 3 and TRP 1 are associated with $L_1$ and $L_2$, respectively. In another example, the selected TRP indexes are not remapped (i.e., the selected TRP 3 and TRP 1 are associated with $L_1$ and $L_3$, respectively).

In one embodiment, a NW considers a sub-table of Table 4 associated with $\{L_n\}$ such that $L_{n1} \geq L_{n2}$ (non-increasing order) when $n1 < n2$, and selects/indicates/configures one index in the sub table.

In one embodiment, a NW considers a sub-table of Table 4 associated with $\{L_n\}$ such that $L_{n1} < L_{n2}$ (non-decreasing order) when $n1 < n2$, and selects/indicates/configures one index in the sub table.

In one example, the ordering of the TRP can be configured by NW, via e.g., RRC, or MAC CE or, DCI.

In another example/embodiment, $L_n$ can allow 0 in addition to $\{2, 4, 6\}$. For example, Table 4 can be used for the above/below examples/embodiments or the examples/embodiments that are related to Table 5.

TABLE 5

| Index | $N_{TRP}$ (or N) | $L_1$ | $L_2$ | $L_3$ | $L_4$ | $L_{tot}$ (or $L_{max}$) |
|---|---|---|---|---|---|---|
| 1 | 1 | 2 | 0 | 0 | 0 | 2 |
| 2 | | 4 | 0 | 0 | 0 | 4 |
| 3 | | 6 | 0 | 0 | 0 | 6 |
| 4 | 2 | 2 | 2 | 0 | 0 | 4 |
| 5 | | 2 | 4 | 0 | 0 | 6 |
| 6 | | 2 | 6 | 0 | 0 | 8 |
| 7 | | 4 | 2 | 0 | 0 | 6 |
| 8 | | 4 | 4 | 0 | 0 | 8 |
| 9 | | 4 | 6 | 0 | 0 | 10 |
| 10 | | 6 | 2 | 0 | 0 | 8 |
| 11 | | 6 | 4 | 0 | 0 | 10 |
| 12 | | 6 | 6 | 0 | 0 | 12 |
| 13 | 3 | 2 | 2 | 2 | 0 | 6 |
| 14 | | 2 | 2 | 4 | 0 | 8 |
| 15 | | 2 | 2 | 6 | 0 | 10 |
| 16 | | 2 | 4 | 2 | 0 | 8 |
| 17 | | 2 | 4 | 4 | 0 | 10 |
| 18 | | 2 | 4 | 6 | 0 | 12 |

TABLE 5-continued

| Index | $N_{TRP}$ (or N) | $L_1$ | $L_2$ | $L_3$ | $L_4$ | $L_{tot}$ (or $L_{max}$) |
|---|---|---|---|---|---|---|
| 19 | | 2 | 6 | 2 | 0 | 10 |
| 20 | | 2 | 6 | 4 | 0 | 12 |
| 21 | | 2 | 6 | 6 | 0 | 14 |
| 22 | | 4 | 2 | 2 | 0 | 8 |
| 23 | | 4 | 2 | 4 | 0 | 10 |
| 24 | | 4 | 2 | 6 | 0 | 12 |
| 25 | | 4 | 4 | 2 | 0 | 10 |
| 26 | | 4 | 4 | 4 | 0 | 12 |
| 27 | | 4 | 4 | 6 | 0 | 14 |
| 28 | | 4 | 6 | 2 | 0 | 12 |
| 29 | | 4 | 6 | 4 | 0 | 14 |
| 30 | | 4 | 6 | 6 | 0 | 16 |
| 31 | | 6 | 2 | 2 | 0 | 10 |
| 32 | | 6 | 2 | 4 | 0 | 12 |
| 33 | | 6 | 2 | 6 | 0 | 14 |
| 34 | | 6 | 4 | 2 | 0 | 12 |
| 35 | | 6 | 4 | 4 | 0 | 14 |
| 36 | | 6 | 4 | 6 | 0 | 16 |
| 37 | | 6 | 6 | 2 | 0 | 14 |
| 38 | | 6 | 6 | 4 | 0 | 16 |
| 39 | | 6 | 6 | 6 | 0 | 18 |
| 40 | 4 | 2 | 2 | 2 | 2 | 8 |
| 41 | | 2 | 2 | 2 | 4 | 10 |
| 42 | | 2 | 2 | 2 | 6 | 12 |
| 43 | | 2 | 2 | 4 | 2 | 10 |
| 44 | | 2 | 2 | 4 | 4 | 12 |
| 45 | | 2 | 2 | 4 | 6 | 14 |
| 46 | | 2 | 2 | 6 | 2 | 12 |
| 47 | | 2 | 2 | 6 | 4 | 14 |
| 48 | | 2 | 2 | 6 | 6 | 16 |
| 49 | | 2 | 4 | 2 | 2 | 10 |
| 50 | | 2 | 4 | 2 | 4 | 12 |
| 51 | | 2 | 4 | 2 | 6 | 14 |
| 52 | | 2 | 4 | 4 | 2 | 12 |
| 53 | | 2 | 4 | 4 | 4 | 14 |
| 54 | | 2 | 4 | 4 | 6 | 16 |
| 55 | | 2 | 4 | 6 | 2 | 14 |
| 56 | | 2 | 4 | 6 | 4 | 16 |
| 57 | | 2 | 4 | 6 | 6 | 18 |
| 58 | | 2 | 6 | 2 | 2 | 12 |
| 59 | | 2 | 6 | 2 | 4 | 14 |
| 60 | | 2 | 6 | 2 | 6 | 16 |
| 61 | | 2 | 6 | 4 | 2 | 14 |
| 62 | | 2 | 6 | 4 | 4 | 16 |
| 63 | | 2 | 6 | 4 | 6 | 18 |
| 64 | | 2 | 6 | 6 | 2 | 16 |
| 65 | | 2 | 6 | 6 | 4 | 18 |
| 66 | | 2 | 6 | 6 | 6 | 20 |
| 67 | | 4 | 2 | 2 | 2 | 10 |
| 68 | | 4 | 2 | 2 | 4 | 12 |
| 69 | | 4 | 2 | 2 | 6 | 14 |
| 70 | | 4 | 2 | 4 | 2 | 12 |
| 71 | | 4 | 2 | 4 | 4 | 14 |
| 72 | | 4 | 2 | 4 | 6 | 16 |
| 73 | | 4 | 2 | 6 | 2 | 14 |
| 74 | | 4 | 2 | 6 | 4 | 16 |
| 75 | | 4 | 2 | 6 | 6 | 18 |
| 76 | | 4 | 4 | 2 | 2 | 12 |
| 77 | | 4 | 4 | 2 | 4 | 14 |
| 78 | | 4 | 4 | 2 | 6 | 16 |
| 79 | | 4 | 4 | 4 | 2 | 14 |
| 80 | | 4 | 4 | 4 | 4 | 16 |
| 81 | | 4 | 4 | 4 | 6 | 18 |
| 82 | | 4 | 4 | 6 | 2 | 16 |
| 83 | | 4 | 4 | 6 | 4 | 18 |
| 84 | | 4 | 4 | 6 | 6 | 20 |
| 85 | | 4 | 6 | 2 | 2 | 14 |
| 86 | | 4 | 6 | 2 | 4 | 16 |
| 87 | | 4 | 6 | 2 | 6 | 18 |
| 88 | | 4 | 6 | 4 | 2 | 16 |
| 89 | | 4 | 6 | 4 | 4 | 18 |
| 90 | | 4 | 6 | 4 | 6 | 20 |
| 91 | | 4 | 6 | 6 | 2 | 18 |
| 92 | | 4 | 6 | 6 | 4 | 20 |
| 93 | | 4 | 6 | 6 | 6 | 22 |
| 94 | | 6 | 2 | 2 | 2 | 12 |
| 95 | | 6 | 2 | 2 | 4 | 14 |

TABLE 5-continued

| Index | $N_{TRP}$ (or N) | $L_1$ | $L_2$ | $L_3$ | $L_4$ | $L_{tot}$ (or $L_{max}$) |
|---|---|---|---|---|---|---|
| 96 | 6 | 2 | 2 | 6 | 16 |
| 97 | 6 | 2 | 4 | 2 | 14 |
| 98 | 6 | 2 | 4 | 4 | 16 |
| 99 | 6 | 2 | 4 | 6 | 18 |
| 100 | 6 | 2 | 6 | 2 | 16 |
| 101 | 6 | 2 | 6 | 4 | 18 |
| 102 | 6 | 2 | 6 | 6 | 20 |
| 103 | 6 | 4 | 2 | 2 | 14 |
| 104 | 6 | 4 | 2 | 4 | 16 |
| 105 | 6 | 4 | 2 | 6 | 18 |
| 106 | 6 | 4 | 4 | 2 | 16 |
| 107 | 6 | 4 | 4 | 4 | 18 |
| 108 | 6 | 4 | 4 | 6 | 20 |
| 109 | 6 | 4 | 6 | 2 | 18 |
| 110 | 6 | 4 | 6 | 4 | 20 |
| 111 | 6 | 4 | 6 | 6 | 22 |
| 112 | 6 | 6 | 2 | 2 | 16 |
| 113 | 6 | 6 | 2 | 4 | 18 |
| 114 | 6 | 6 | 2 | 6 | 20 |
| 115 | 6 | 6 | 4 | 2 | 18 |
| 116 | 6 | 6 | 4 | 4 | 20 |
| 117 | 6 | 6 | 4 | 6 | 22 |
| 118 | 6 | 6 | 6 | 2 | 20 |
| 119 | 6 | 6 | 6 | 4 | 22 |
| 120 | 6 | 6 | 6 | 6 | 24 |

In one embodiment, a NW considers a sub-table including at least one of the rows in Table 4 or Table 5.

The above approach described for the cases of $L_n \in \{2, 4, 6\}$ can be extended to the case of any subset of $\{1, 2, 3, 4, 5, 6\}$ in the same manner. The tables provided in this disclosure can include different parameter names, e.g., N can be replaced by $N_{TRP}$ and/or $L_{tot}$ can be replaced by $L_{max}$. The parameter names can be used interchangeably. For the sake of space limitation, we omitted those in this disclosure, but it should be interpreted as those variations being included in the present disclosure.

In one embodiment, any combination or some of embodiments described herein can be configured by NW via higher-layer (RRC) signaling. In one example, any combination or some of examples in embodiments described herein can be configured by NW via higher-layer RRC signaling.

In one embodiment, one or more embodiments herein can be configured by NW via higher-layer (RRC) signaling.

In one embodiment, one or more embodiments herein can be used only when $N=N_{TRP}$ is configured, and one or more embodiments can be used otherwise.

In one embodiment, one or more embodiments can be used only when $N=N_{TRP}$ is configured, and one or more embodiments can be used otherwise.

In one embodiment, on the SD basis selection for (Rel-18) Type-II codebook refinement for CJT mTRP (Rel-17 port-selection codebook-based refinement), embodiments in this disclosure are also used for Rel-17 port selection codebook-based refinement. For example, $L_n$, $L_{tot}$, $L_{max}$ can be replaced by $\alpha_n$, $\alpha_{tot}$, $\alpha_{max}$ where $$\alpha_n = \frac{L_n}{N_1 N_2}, \alpha_{tot} = \frac{L_{tot}}{N_{TRP} N_1 N_2} \left( \text{or } \alpha_{tot} = \frac{L_{tot}}{NN_1 N_2} \right),$$

$$\text{and } \alpha_{max} = \frac{L_{max}}{N_{TRP} N_1 N_2} \left( \text{or } \alpha_{max} = \frac{L_{max}}{NN_1 N_2} \right).$$

Two Separate Parameter Combination Tables with Linkage (Parameter)

Figure 10:
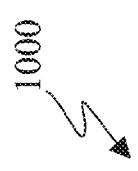
FIG. 10 illustrates an example of a table that can be constructed according to embodiments of the present disclosure.
Figure 10:
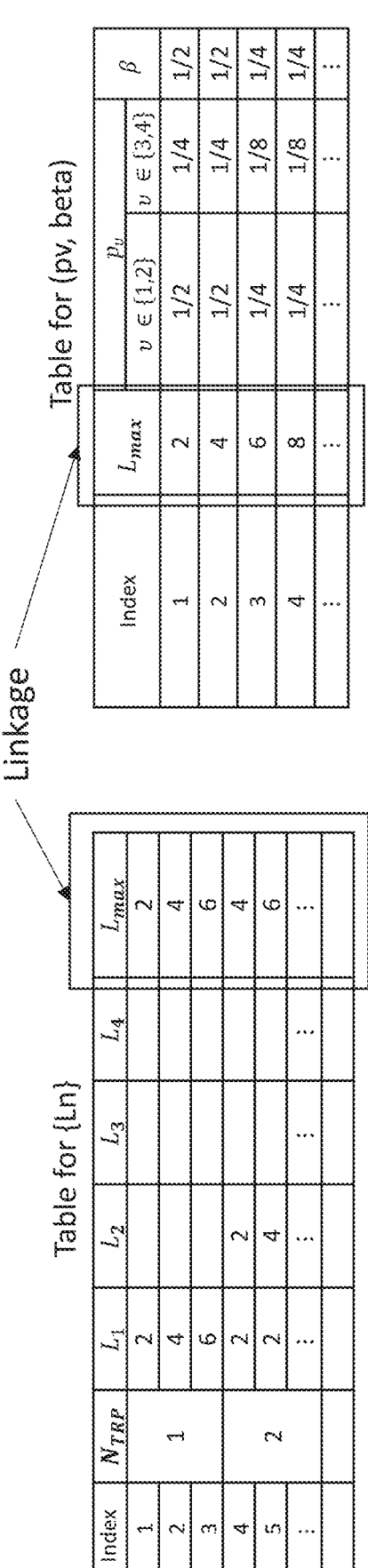

FIG. 10 illustrates an example of a table 1000 that can be constructed in accordance with embodiments of the present disclosure. The embodiment of the table 1000 illustrated in FIG. 10 is for illustration only. FIG. 10 does not limit the scope of this disclosure to any particular implementation of the table 1000.

In one embodiment, a UE is configured with an mTRP (or D-MIMO or C-JT) codebook, via e.g., higher layer parameter codebookType set to 'typeII-r18-cjt', wherein codebook parameters for the mTRP codebook are configured using two (parameter-combination) tables.

In one embodiment, a first table is one of the tables (or whole tables/sub-tables, or tables that can be constructed) in/under one or more embodiments herein, and a second table is one of the tables (or whole tables/sub-tables, or tables that can be constructed) in/under another embodiment herein (or vice versa). For example, a first table is used to configure a combination of $\{L_n\}$, and a second table is used to configure a combination of $(p_v, \beta)$ or vice versa.

In one embodiment, the two tables can be linked using a (overlapping) parameter that is a function of $\{L_n\}$.

In one example, $L_{max}$ can be the parameter to link two tables.

In one example, $L_{tot}$ can be the parameter to link two tables.

In one example, the average of $\{L_n\}$, called $\bar{L}$, can be the parameter to link two tables.

In one example, the maximum value of $\{L_n\}$ can be the parameter to link two tables.

In one example, the minimum value of $\{L_n\}$ can be the parameter to link two tables.

In one example, the NW can configure index X in a first table and index Y among indices associated with a value of the linked parameter in a second table. Here, the value of linked parameter is the value associated with index X of the first table.

As an example, by using the illustration shown in FIG. 10, the NW configures a combination of $\{L_n\}$ using the table for $\{L_n\}$ and, based on the linked parameter, $L_{max}$, the NW configures a combination of $(p_v, \beta)$ among the indices associated with the value of $L_{max}$. In this way, the size of parameter(s) required for the codebook parameter configuration can be efficiently reduced.

Two Separate Parameter Combination Tables without Linkage (Parameter)

FIGS. 11A-11D illustrate an example of tables 1110, 1120, 1130, and 1140 that can be constructed in accordance with embodiments of the present disclosure. The embodiments of the tables 1110, 1120, 1130, and 1140 illustrated in FIGS. 11A-11D are for illustration only. FIGS. 11A-11D do not limit the scope of this disclosure to any particular implementation of the tables 1110, 1120, 1130, and 1140.

In one embodiment, a UE is configured with an mTRP (or D-MIMO or C-JT) codebook, via e.g., higher layer parameter codebookType set to 'typeII-r18-cjt', wherein codebook parameters for the mTRP codebook are configured using two (parameter-combination) tables.

In one embodiment, a first table is one of the tables (or whole tables/sub-tables, or tables that can be constructed) in/under embodiments described herein, and a second table is one of the tables (or whole tables/sub-tables, or tables that can be constructed) in/under another embodiment described herein (or vice versa). For example, a first table is used to configure a combination of $\{L_n\}$, and a second table is used to configure a combination of $(p_v, \beta)$ (or vice versa).

In one example, a table for $(p_v, \beta)$ can be one of the tables (or whole tables/sub-tables, or tables that can be constructed) in/under embodiments described herein without the column of $L_{max}$ (or L) as shown in FIG. 11A, as an example. A table for $\{L_n\}$ can be one of the tables (or whole tables/sub-tables, or tables that can be constructed) in/under embodiment 3 with/without the column of $L_{max}$, as shown in FIG. 11A, as an example.

In one example, a table for $\{L_n\}$ can be in a form as illustrated in FIGS. 11B and 11C (without the $N_{TRP}$ column).

In another example, a table for $\{L_n\}$ can be in a form as illustrated in FIG. 11D (with the $N_{TRP}$ column).

In this embodiment, there can be no linkage between two tables. In other words, the NW can configure index X in a first table and index Y in a second table, without using linkage.

In one embodiment, there can be UE capability on $L_{max}$ or $L_{tot}$ or max $\{L_n\}$ or min $\{L_n\}$.

For example, the UE can report UE capability on $L_{max}$. Then, the NW (needs to follow and) can configure a combination of $\{L_n\}$ under the UE capability, e.g., a combination of $\{L_n\}$ such that $\Sigma_n\ L_n \leq L_{max}$.

For example, the UE can report UE capability on $L_{tot}$. Then, the NW (needs to follow and) can configure a combination of $\{L_n\}$ under the UE capability, e.g., a combination of $\{L_n\}$ such that $\Sigma_n\ L_n = L_{tot}$.

For example, the UE can report UE capability on L*=the maximum of $\{L_n\}$. Then, the NW (needs to follow and) can configure a combination of $\{L_n\}$ under the UE capability, e.g., a combination of $\{L_n\}$ such that $L_n < L*$ for all n.

For example, the UE can report UE capability on L*=the minimum of $\{L_n\}$. Then, the NW (needs to follow and) can configure a combination of $\{L_n\}$ under the UE capability, e.g., a combination of $\{L_n\}$ such that $L_n \geq L_*$ for all n.

For any embodiment described herein, there can be UE capability on $L_{max}$ or $L_{tot}$ or max $\{L_n\}$ or min $\{L_n\}$, as shown in this embodiment or one of the examples above.

In one embodiment, a table for $(p_v, \beta)$ (which can be one of the possible tables described in this disclosures) includes at least one of the $(p_v, \beta)$ combinations shown in the following table:

TABLE 6

| label | Index | $p_v$ | | $\beta$ |
| | | $v \in \{1, 2\}$ | $v \in \{3, 4\}$ | |
| --- | --- | --- | --- | --- |
| C1 | 1 | ⅛ | 1/16 | ⅛ |
| C2 | 2 | ⅛ | 1/16 | ¼ |
| C3 | 3 | ⅛ | 1/16 | ½ |
| C4 | 4 | ¼ | ⅛ | ¼ |
| C5 | 5 | ¼ | ⅛ | ½ |
| C6 | 6 | ½ | ¼ | ¼ |
| C7 | 7 | ½ | ¼ | ½ |
| C8 | 8 | ¼ | ¼ | ¾ |
| C9 | 9 | ½ | ½ | ½ |
| C10 | 10 | ¼ | ¼ | ¼ |
| C11 | 11 | ¼ | ¼ | a |
| C12 | 12 | ½ | ½ | b |

In one example, a in C11 is fixed, e.g., ½ or $(½+¾)/2=⅝$. In another example, a is ¼ or ⅛.

In one example, b in C12 is fixed, e.g., ¼ or $(½+¼)/2=⅜$. In another example, b is ⅛.

In one example, a supported number of combinations for the table of $(p_v, \beta)$ is at most S, e.g., S=8, and at least T of C2-C5 combinations, where $1 \leq T \leq 4$, or one of C2-C5 or all of C2-C5 combinations in Table 6 are included in the at most S combinations. In addition, among the remaining (12-T) combinations in Table 6 (i.e., C1, C7-C12), at least one combination is/are included the at most S combinations. In one example, all of C2-C5 combinations in Table 6 are included (i.e., T=4) in the at most S combinations.

In one example, one of the remaining $(p_v, \beta)$ combinations in Table 6 (i.e., C1, C7-C12) is included in the at most S combinations.

$$\left( \binom{7}{1} \text{ examples are omitted.} \right)$$

In one example, two of the remaining $(p_v, \beta)$ combinations in Table 6 (i.e., C1, C7-C12) are included in the at most S combinations.

$$\left( \binom{7}{2} \text{ examples are omitted.} \right)$$

In one example, three of the remaining $(p_v, \beta)$ combinations in Table 6 (i.e., C1, C7-C12) are included in the at most S combinations.

$$\left( \binom{7}{3} \text{ examples are omitted.} \right)$$

In one example, four of the remaining $(p_v, \beta)$ combinations in Table 6 (i.e., C1, C7-C12) are included in the at most S combinations.

$$\left( \binom{7}{4} \text{ examples are omitted.} \right)$$

In one example, five of the remaining $(p_v, \beta)$ combinations in Table 6 (i.e., C1, C7-C12) are included in the at most S combinations.

$$\left( \binom{7}{5} \text{ examples are omitted.} \right)$$

In one example, six of the remaining $(p_v, \beta)$ combinations in Table 6 (i.e., C1, C7-C12) are included in the at most S combinations.

$$\left( \binom{7}{6} \text{ examples are omitted.} \right)$$

In one example, all of the remaining $(p_v, \beta)$ combinations in Table 6 (i.e., C1, C7-C12) are included in the at most S combinations.

In one example (D1), there is restriction on configuring C7 in Table 6, where the restriction is associated with (related to/based on) $\{L_n\}$.

In one example, the UE is expected to be configured with C7 when $L_n \leq x$. For example, x can be only one of x=2, x=4, or x=6.

In one example, the UE is not expected to be configured with C7 when $L_n \leq x$. For example, x can be only one of x=2, x=4, or x=6.

In one example, the UE is expected to be configured with C7 when $L_n \geq x$. For example, x can be only one of x=2, x=4, or x=6.

In one example, the UE is not expected to be configured with C7 when $L_n \geq x$. For example, x can be only one of x=2, x=4, or x=6.

In one example, the UE is expected to be configured with C7 when $L_n = x$. For example, x can be only one of x=2, x=4, or x=6.

In one example, the UE is not expected to be configured with C7 when $L_n = x$. For example, x can be only one of x=2, x=4, or x=6.

In one example, the UE is expected to be configured with C7 when $L_n = x$. For example, x can be only one of x=2, x=4, or x=6.

In one example, the UE is not expected to be configured with C7 when $L_n = x$. For example, x can be only one of x=2, x=4, or x=6.

In one example, the UE is expected to be configured with C7 when $L_n < x$. For example, x can be only one of x=2, x=4, or x=6.

In one example, the UE is not expected to be configured with C7 when $L_n < x$. For example, x can be only one of x=2, x=4, or x=6.

In one example, the UE is expected to be configured with C7 when $L_n > x$. For example, x can be only one of x=2, x=4, or x=6.

In one example, the UE is not expected to be configured with C7 when $L_n > x$. For example, x can be only one of x=2, x=4, or x=6.

In one example, the UE is expected to be configured with C7 when $x \leq L_n \leq y$. For example, x can be only one of x=2, x=4, or x=6. For example, y can be only one of y=2, y=4, or y=6.

In one example, the UE is not expected to be configured with C7 when $x \leq L_n \leq y$. For example, x can be only one of x=2, x=4, or x=6. For example, y can be only one of y=2, y=4, or y=6.

In one example, the UE is expected to be configured with C7 when $x < L_n \leq y$. For example, x can be only one of x=2, x=4, or x=6. For example, y can be only one of y=2, y=4, or y=6.

In one example, the UE is not expected to be configured with C7 when $x < L_n \leq y$. For example, x can be only one of x=2, x=4, or x=6. For example, y can be only one of y=2, y=4, or y=6.

In one example, the UE is expected to be configured with C7 when $x \leq L_n < y$. For example, x can be only one of x=2, x=4, or x=6. For example, y can be only one of y=2, y=4, or y=6.

In one example, the UE is not expected to be configured with C7 when $x \leq L_n < y$. For example, x can be only one of x=2, x=4, or x=6. For example, y can be only one of y=2, y=4, or y=6.

In one example, the UE is expected to be configured with C7 when $x < L_n < y$. For example, x can be only one of x=2, x=4, or x=6. For example, y can be only one of y=2, y=4, or y=6.

In one example, the UE is not expected to be configured with C7 when $x < L_n < y$. For example, x can be only one of x=2, x=4, or x=6. For example, y can be only one of y=2, y=4, or y=6.

In one example, the UE is expected to be configured with C7 when $$\max_n L_n \leq x.$$

For example, x can be only one of x=2, x=4, or x=6.

In one example, the UE is not expected to be configured with C7 when $$\max_n L_n \leq x.$$

For example, x can be only one of x=2, x=4, or x=6.

In one example, the UE is expected to be configured with C7 when $$\max_n L_n \geq x.$$

For example, x can be only one of x=2, x=4, or x=6.

In one example, the UE is not expected to be configured with C7 when $$\max_n L_n \geq x.$$

For example, x can be only one of x=2, x=4, or x=6.

In one example, the UE is expected to be configured with C7 when $$\max_n L_n = x.$$

For example, x can be only one of x=2, x=4, or x=6.

In one example, the UE is not expected to be configured with C7 when $$\max_n L_n = x.$$

For example, x can be only one of x=2, x=4, or x=6.

In one example, the UE is expected to be configured with C7 when $$\max_n L_n = x.$$

For example, x can be only one of x=2, x=4, or x=6.

In one example, the UE is not expected to be configured with C7 when $$\max_n L_n = x.$$

For example, x can be only one of x=2, x=4, or x=6.

In one example, the UE is expected to be configured with C7 when $$\max_n L_n < x.$$

For example, x can be only one of x=2, x=4, or x=6.

In one example, the UE is not expected to be configured with C7 when $$\max_n L_n < x.$$

For example, x can be only one of x=2, x=4, or x=6. In one example, the UE is expected to be configured with C7 when $$\max_n L_n > x.$$

For example, x can be only one of x=2, x=4, or x=6. In one example, the UE is not expected to be configured with C7 when $$\max_n L_n > x.$$

For example, x can be only one of x=2, x=4, or x=6. In one example, the UE is expected to be configured with C7 when $$x \le \max_n L_n \le y.$$

For example, x can be only one of x=2, x=4, or x=6. For example, y can be only one of y=2, y=4, or y=6. In one example, the UE is not to be with C7 when $$x \le \max_n L_n \le y.$$

For example, x can be only one of x=2, x=4, or x=6. For example, y can be only one of y=2, y=4, or y=6. In one example, the UE is expected to be configured with C7 when $$x < \max_n L_n \le y.$$

For example, x can be only one of x=2, x=4, or x=6. For example, y can be only one of y=2, y=4, or y=6. In one example, the UE is not expected to be configured with C7 when $$x < \max_n L_n \le y.$$

For example, x can be only one of x=2, x=4, or x=6. For example, y can be only one of y=2, y=4, or y=6. In one example, the UE is expected to be configured with C7 when $$x \le \max_n L_n < y.$$

For example, x can be only one of x=2, x=4, or x=6. For example, y can be only one of y=2, y=4, or y=6.

In one example, the UE is not expected to be configured with C7 when $$x \le \max_n L_n < y.$$

For example, x can be only one of x=2, x=4, or x=6. For example, y can be only one of y=2, y=4, or y=6. In one example, the UE is expected to be configured with C7 when $$x < \max_n L_n < y.$$

For example, x can be only one of x=2, x=4, or x=6. For example, y can be only one of y=2, y=4, or y=6. In one example, the UE is not expected to be configured with C7 when $$x < \max_n L_n < y.$$

For example, x can be only one of x=2, x=4, or x=6. For example, y can be only one of y=2, y=4, or y=6. In one example, the UE is expected to be configured with C7 when $\sum_n L_n \le x \times t$ or $\sum_n L_n \le z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with C7 when $\sum_n L_n \le x \times t$ or $\sum_n L_n \le z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with C7 when $\sum_n L_n \ge x \times t$ or $\sum_n L_n \ge z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with C7 when $\sum_n L_n \ge x \times t$ or $\sum_n L_n \ge z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with C7 when $\sum_n L_n = x \times t$ or $\sum_n L_n = z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with C7 when $\sum_n L_n = x \times t$ or $\sum_n L_n = z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with C7 when $\sum_n L_n < x \times t$ or $\sum_n L_n < z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with C7 when $\sum_n L_n < x \times t$ or $\sum_n L_n < z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with C7 when $\Sigma_n L_n > x \times t$ or $\Sigma_n L_n > z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with C7 when $\Sigma_n L_n > x \times t$ or $\Sigma_n L_n > z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with C7 when $x \times t < \Sigma_n L_n \leq y \times t$ or $z_1 \leq \Sigma_n L_n \leq z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with C7 when $x \times t \leq \Sigma_n L_n \leq y \times t$ or $z_1 \leq \Sigma_n L_n \leq z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with C7 when $x \times t < \Sigma_n L_n \leq y \times t$ or $z_1 \leq \Sigma_n L_n \leq z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with C7 when $x \times t < \Sigma_n L_n \leq y \times t$ or $z_1 < \Sigma_n L_n \leq z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with C7 when $x \times t \leq \Sigma_n L_n < y \times t$ or $z_1 < \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with C7 when $x \times t \leq \Sigma_n L_n < y \times t$ or $z_1 < \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with C7 when $x \times t < \Sigma_n L_n < y \times t$ or $z_1 \ G \ \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with C7 when $x \times t < \Sigma_n L_n < y \times t$ or $z_1 < \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example (D1-L), the UE is expected to be configured with C7 when $s \in S_0$ is configured, where $S_0$ is an index or a set of multiple indices, each index indicates, or corresponds to a combination of $\{L_n\}$ from a table of $\{L_n\}$.

In one example, the UE is not expected to be configured with C7 when $s \in S_0$ is configured, where $S_0$ is an index or a set of multiple indices, each index indicates, or corresponds to a combination of $\{L_n\}$ from a table of $\{L_n\}$.

In one example, regarding example D1-L, $S_0$ can be per $(p_v, \beta)$ combination, i.e., above case it is for C7 (or any other $(p_v, \beta)$ combination). For example, linkage between a list/table of $\{L_n\}$ combinations (which can be one of the possible tables described in this disclosures) and a list/table of $(p_v, \beta)$ combinations (which can be one of the possible tables described in this disclosures) can be via pairing each combination for $(p_v, \beta)$ with at least one combination for $\{L_n\}$. For example, $S_0, \ldots, S_{S-1}$ index sets can be used for linking each combination for $(p_v, \beta)$ with at least one combination for $\{L_n\}$.

In one example (D1-a), there is restriction on configuring C7 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D1), the restriction is UE-optional or UE-capability. (omitted to describe each example in (D1).)

In one example (D1-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D2), there is restriction on configuring C7 in Table 6, where the restriction is associated with (related to/based on) $N_L$.

In one example, the UE is expected to be configured with C7 when $N_L \leq x$. For example, x can be only one of x=1, x=2, or x=4.

In one example, the UE is not expected to be configured with C7 when $N_L \leq x$. For example, x can be only one of x=1, x=2, or x=4.

In one example, the UE is expected to be configured with C7 when $N_L \geq x$. For example, x can be only one of x=1, x=2, or x=4.

In one example, the UE is not expected to be configured with C7 when $N_L \geq x$. For example, x can be only one of x=1, x=2, or x=4.

In one example, the UE is expected to be configured with C7 when $N_L = x$. For example, x can be only one of x=1, x=2, or x=4.

In one example, the UE is not expected to be configured with C7 when $N_L = x$. For example, x can be only one of x=1, x=2, or x=4.

In one example, the UE is expected to be configured with C7 when $N_L < x$. For example, x can be only one of x=1, x=2, or x=4.

In one example, the UE is not expected to be configured with C7 when $N_L < x$. For example, x can be only one of x=1, x=2, or x=4.

In one example, the UE is expected to be configured with C7 when $N_L > x$. For example, x can be only one of x=1, x=2, or x=4.

In one example, the UE is not expected to be configured with C7 when $N_L>x$. For example, x can be only one of x=1, x=2, or x=4.

In one example, the UE is expected to be configured with C7 when $x \leq N_L \leq y$. For example, x can be only one of x=1, x=2, or x=4. For example, y can be only one of y=1, y=2, or y=4.

In one example, the UE is not expected to be configured with C7 when $x \leq N_L \leq y$. For example, x can be only one of x=1, x=2, or x=4. For example, y can be only one of y=1, y=2, or y=4.

In one example, the UE is expected to be configured with C7 when $x < N_L \leq y$. For example, x can be only one of x=1, x=2, or x=4. For example, y can be only one of y=1, y=2, or y=4.

In one example, the UE is not expected to be configured with C7 when $x < N_L \leq y$. For example, x can be only one of x=1, x=2, or x=4. For example, y can be only one of y=1, y=2, or y=4.

In one example, the UE is expected to be configured with C7 when $x \leq N_L < y$. For example, x can be only one of x=1, x=2, or x=4. For example, y can be only one of y=1, y=2, or y=4.

In one example, the UE is not expected to be configured with C7 when $x \leq N_L < y$. For example, x can be only one of x=1, x=2, or x=4. For example, y can be only one of y=1, y=2, or y=4.

In one example, the UE is expected to be configured with C7 when $x < N_L < y$. For example, x can be only one of x=1, x=2, or x=4. For example, y can be only one of y=1, y=2, or y=4.

In one example, the UE is not expected to be configured with C7 when $x < N_L < y$. For example, x can be only one of x=1, x=2, or x=4. For example, y can be only one of y=1, y=2, or y=4.

In one example (D2-a), there is restriction on configuring C7 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D2), the restriction is UE-optional or UE-capability. (omitted to describe each example in (D2).)

In one example (D2-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D3), there is restriction on configuring C7 in Table 6, where the restriction is associated with (related to/based on) $P_{CSI-RS}$. In one example, $P_{CSI-RS}$ is a number of CSI-RS ports per CSI-RS-resource (per TRP).

In one example, the UE is expected to be configured with C7 when $P_{CSI-RS} \leq x$. For example, x can be only one of x=4, x=8, x=12, x=16, x=24, or x=32.

In one example, the UE is not expected to be configured with C7 when $P_{CSI-RS} \leq x$. For example, x can be only one of x=4, x=8, x=12, x=16, x=24, or x=32.

In one example, the UE is expected to be configured with C7 when $P_{CSI-RS} \geq x$. For example, x can be only one of x=4, x=8, x=12, x=16, x=24, or x=32.

In one example, the UE is not expected to be configured with C7 when $P_{CSI-RS} \geq x$. For example, x can be only one of x=4, x=8, x=12, x=16, x=24, or x=32.

In one example, the UE is expected to be configured with C7 when $P_{CSI-RS}=x$. For example, x can be only one of x=4, x=8, x=12, x=16, x=24, or x=32.

In one example, the UE is not expected to be configured with C7 when $P_{CSI-RS}=x$. For example, x can be only one of x=4, x=8, x=12, x=16, x=24, or x=32.

In one example, the UE is expected to be configured with C7 when $P_{CSI-RS}<x$. For example, x can be only one of x=4, x=8, x=12, x=16, x=24, or x=32.

In one example, the UE is not expected to be configured with C7 when $P_{CSI-RS}<x$. For example, x can be only one of x=4, x=8, x=12, x=16, x=24, or x=32.

In one example, the UE is expected to be configured with C7 when $P_{CSI-RS}>x$. For example, x can be only one of x=4, x=8, x=12, x=16, x=24, or x=32.

In one example, the UE is not expected to be configured with C7 when $P_{CSI-RS}>x$. For example, x can be only one of x=4, x=8, x=12, x=16, x=24, or x=32.

In one example, the UE is expected to be configured with C7 when $x \leq P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with C7 when $x \leq P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with C7 when $x < P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with C7 when $x < P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with C7 when $x \leq P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with C7 when $x \leq P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is expected to be configured with C7 when $x < P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with C7 when $x < P_{CSI-RS} < y$. For example, x can be only one of x=4, x=8, x=12, x=16, x=24, or x=32. For example, y can be only one of y=4, y=8, y=12, y=16, y=24, or y=32.

In one example (D3-a), there is restriction on configuring C7 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D3), the restriction is UE-optional or UE-capability. (omitted to describe each example in (D3).)

In one example (D3-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D4), there is restriction on configuring C7 in Table 6, where the restriction is associated with (related to/based on) v, where v is a number of layers, i.e., rank.

In one example, the UE is expected to be configured with C7 when v≤x. For example, x can be only one of x=1, x=2, x=3, or x=4.

In one example, the UE is not expected to be configured with C7 when v≤x. For example, x can be only one of x=1, x=2, x=3, or x=4.

In one example, the UE is expected to be configured with C7 when v≥x. For example, x can be only one of x=1, x=2, x=3, or x=4.

In one example, the UE is not expected to be configured with C7 when v≥x. For example, x can be only one of x=1, x=2, x=3, or x=4.

In one example, the UE is expected to be configured with C7 when v=x. For example, x can be only one of x=1, x=2, x=3, or x=4.

In one example, the UE is not expected to be configured with C7 when v=x. For example, x can be only one of x=1, x=2, x=3, or x=4.

In one example, the UE is expected to be configured with C7 when v<x. For example, x can be only one of x=1, x=2, x=3, or x=4.

In one example, the UE is not expected to be configured with C7 when v<x. For example, x can be only one of x=1, x=2, x=3, or x=4.

In one example, the UE is expected to be configured with C7 when v>x. For example, x can be only one of x=1, x=2, x=3, or x=4.

In one example, the UE is not expected to be configured with C7 when v>x. For example, x can be only one of x=1, x=2, x=3, or x=4.

In one example, the UE is expected to be configured with C7 when x≤v≤y. For example, x can be only one of x=1, x=2, x=3, or x=4. For example, y can be only one of y=1, y=2, y=3, or y=4.

In one example, the UE is not expected to be configured with C7 when x≤v≤y. For example, x can be only one of x=1, x=2, x=3, or x=4. For example, y can be only one of y=1, y=2, y=3, or y=4.

In one example, the UE is expected to be configured with C7 when x<v≤y. For example, x can be only one of x=1, x=2, x=3, or x=4. For example, y can be only one of y=1, y=2, y=3, or y=4.

In one example, the UE is not expected to be configured with C7 when x<v≤y. For example, x can be only one of x=1, x=2, x=3, or x=4. For example, y can be only one of y=1, y=2, y=3, or y=4.

In one example, the UE is expected to be configured with C7 when x≤v<y. For example, x can be only one of x=1, x=2, x=3, or x=4. For example, y can be only one of y=1, y=2, y=3, or y=4.

In one example, the UE is not expected to be configured with C7 when x≤v<y. For example, x can be only one of x=1, x=2, x=3, or x=4. For example, y can be only one of y=1, y=2, y=3, or y=4.

In one example, the UE is expected to be configured with C7 when x<v<y. For example, x can be only one of x=1, x=2, x=3, or x=4. For example, y can be only one of y=1, y=2, y=3, or y=4.

In one example, the UE is not expected to be configured with C7 when x<v<y. For example, x can be only one of x=1, x=2, x=3, or x=4. For example, y can be only one of y=1, y=2, y=3, or y=4.

In one example (D4-a), there is restriction on configuring C7 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D4), the restriction is UE-optional or UE-capability. (omitted to describe each example in (D4).)

In one example (D4-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D5), there is restriction on configuring C7 in Table 6, where the restriction is associated with (related to/based on) R, where R is a number of precoders per subband.

In one example, the UE is expected to be configured with C7 when R=1.

In one example, the UE is not expected to be configured with C7 when R=2.

In one example, the UE is expected to be configured with C7 when R≤x or R<x. Here x can be fixed or configured or can be subject to UE capability.

In one example, the UE is not expected to be configured with C7 when R>x R≥x. Here x can be fixed or configured or can be subject to UE capability.

In one example (D5-a), there is restriction on configuring C7 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D5), the restriction is UE-optional or UE-capability. (omitted to describe each example in (D5).)

In one example (D5-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D6), there is restriction on configuring C7 in Table 6, where the restriction is associated with (related to/based on) $N_{TRP}$, where $N_{TRP}$ is a number of TRPs, i.e., a number of CSI-RS resources.

In one example, the UE is expected to be configured with C7 when $N_{TRP}$≤x. For example, x can be only one of x=1, x=2, x=3, or x=4.

In one example, the UE is not expected to be configured with C7 when $N_{TRP}$≤x. For example, x can be only one of x=1, x=2, x=3, or x=4.

In one example, the UE is expected to be configured with C7 when $N_{TRP}$≥x. For example, x can be only one of x=1, x=2, x=3, or x=4.

In one example, the UE is not expected to be configured with C7 when $N_{TRP} \geq x$. For example, x can be only one of x=1, x=2, x=3, or x=4.

In one example, the UE is expected to be configured with C7 when $N_{TRP} = x$. For example, x can be only one of x=1, x=2, x=3, or x=4.

In one example, the UE is not expected to be configured with C7 when $N_{TRP} = x$. For example, x can be only one of x=1, x=2, x=3, or x=4.

In one example, the UE is expected to be configured with C7 when $N_{TRP} < x$. For example, x can be only one of x=1, x=2, x=3, or x=4.

In one example, the UE is not expected to be configured with C7 when $N_{TRP} < x$. For example, x can be only one of x=1, x=2, x=3, or x=4.

In one example, the UE is expected to be configured with C7 when $N_{TRP} > x$. For example, x can be only one of x=1, x=2, x=3, or x=4.

In one example, the UE is not expected to be configured with C7 when $N_{TRP} > x$. For example, x can be only one of x=1, x=2, x=3, or x=4.

In one example, the UE is expected to be configured with C7 when $x \leq N_{TRP} \leq y$. For example, x can be only one of x=1, x=2, x=3, or x=4. For example, y can be only one of y=1, y=2, y=3, or y=4.

In one example, the UE is not expected to be configured with C7 when $x \leq N_{TRP} \leq y$. For example, x can be only one of x=1, x=2, x=3, or x=4. For example, y can be only one of y=1, y=2, y=3, or y=4.

In one example, the UE is expected to be configured with C7 when $x < N_{TRP} \leq y$. For example, x can be only one of x=1, x=2, x=3, or x=4. For example, y can be only one of y=1, y=2, y=3, or y=4.

In one example, the UE is not expected to be configured with C7 when $x < N_{TRP} \leq y$. For example, x can be only one of x=1, x=2, x=3, or x=4. For example, y can be only one of y=1, y=2, y=3, or y=4.

In one example, the UE is expected to be configured with C7 when $x \leq N_{TRP} < y$. For example, x can be only one of x=1, x=2, x=3, or x=4. For example, y can be only one of y=1, y=2, y=3, or y=4.

In one example, the UE is not expected to be configured with C7 when $x \leq N_{TRP} < y$. For example, x can be only one of x=1, x=2, x=3, or x=4. For example, y can be only one of y=1, y=2, y=3, or y=4.

In one example, the UE is expected to be configured with C7 when $x < N_{TRP} < y$. For example, x can be only one of x=1, x=2, x=3, or x=4. For example, y can be only one of y=1, y=2, y=3, or y=4.

In one example, the UE is not expected to be configured with C7 when $x < N_{TRP} < y$. For example, x can be only one of x=1, x=2, x=3, or x=4. For example, y can be only one of y=1, y=2, y=3, or y=4.

In one example (D6-a), there is restriction on configuring according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D6), the restriction is UE-optional or UE-capability. (omitted to describe each example in (D6).)

In one example (D6-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (D7), there is restriction on configuring C7 in Table 6, where the restriction is associated with (related to/based on) K, where K is a number of subbands.

In one example, the UE is expected to be configured with C7 when $K \leq x$. For example, x can be only one of x=1, . . . or x=19.

In one example, the UE is not expected to be configured with C7 when $K \leq x$. For example, x can be only one of x=1, . . . or x=19

In one example, the UE is expected to be configured with C7 when $K \geq x$. For example, x can be only one of x=1, . . . or x=19.

In one example, the UE is not expected to be configured with C7 when $K \geq x$. For example, x can be only one of x=1, . . . or x=19.

In one example, the UE is expected to be configured with C7 when $K = x$. For example, x can be only one of x=1, . . . or x=19.

In one example, the UE is not expected to be configured with C7 when $K = x$. For example, x can be only one of x=1, . . . or x=19.

In one example, the UE is expected to be configured with C7 when $K < x$. For example, x can be only one of x=1, . . . or x=19.

In one example, the UE is not expected to be configured with C7 when $K < x$. For example, x can be only one of x=1, . . . or x=19.

In one example, the UE is expected to be configured with C7 when $K > x$. For example, x can be only one of x=1, . . . or x=19.

In one example, the UE is not expected to be configured with C7 when $K > x$. For example, x can be only one of x=1, . . . or x=19.

In one example, the UE is expected to be configured with C7 when $x \leq K \leq y$. For example, x can be only one of x=1, . . . or x=19. For example, y can be only one of y=1, . . . or y=19.

In one example, the UE is not expected to be configured with C7 when $x \leq K \leq y$. For example, x can be only one of x=1, . . . or x=19. For example, y can be only one of y=1, . . . or y=19.

In one example, the UE is expected to be configured with C7 when $x < K \leq y$. For example, x can be only one of x=1, . . . or x=19. For example, y can be only one of y=1, . . . or y=19.

In one example, the UE is not expected to be configured with C7 when $x < K \leq y$. For example, x can be only one of x=1, . . . or x=19. For example, y can be only one of y=1, . . . or y=19.

In one example, the UE is expected to be configured with C7 when $x \leq K < y$. For example, x can be only one of x=1, . . . or x=19. For example, y can be only one of y=1, . . . or y=19.

In one example, the UE is not expected to be configured with C7 when $x \leq K < y$. For example, x can be only one of x=1, . . . or x=19. For example, y can be only one of y=1, . . . or y=19.

In one example, the UE is expected to be configured with C7 when $x < K < y$. For example, x can be only one of x=1, . . . or x=19. For example, y can be only one of y=1, . . . or y=19.

In one example, the UE is not expected to be configured with C7 when x<K<y. For example, x can be only one of x=1, . . . or x=19. For example, y can be only one of y=1, . . . or y=19.

In one example (D7-a), there is restriction on configuring according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (D7), the restriction is UE-optional or UE-capability. (omitted to describe each example in (D7).)

In one example (D7-b), there is restriction on configuring C7 according to one of the examples above. In addition, the C7 is UE-optional, i.e., C7 can be configured depending on UE capability. The UE reports its capability on the support of C7, and then only the NW can configure C7. This UE-optional feature can correspond to a separate UE capability.

In one example (any combination of D1-D7 (D1-a-D7-a, D1-b-D7-b), there are multiple restrictions on configuring C7 in Table 6, where the multiple restrictions include at least one of the restrictions D1-D7 (D1-a to D7-a, D1-b-D7-b), described above. The multiple restrictions are associated with (related to/based on) $\{L_n\}$, $N_L$, $P_{CSI-RS}$, v, R, $N_{TRP}$, and/or K.

In one example, there are 2 restrictions ($r_1$, $r_2$) on configuring C7, the restrictions are associated with parameters or parameter combinations, where $r_i$ is one of $\{L_n\}$, $N_L$, $P_{CSI-RS}$, v, R, $N_{TRP}$ and K.

In one example, ($r_1$, $r_2$)=($N_L$, $\{L_n\}$).

In one example, ($r_1$, $r_2$)=($N_L$, $P_{CSI-RS}$).

In one example, ($r_1$, $r_2$)=($P_{CSI-RS}$, $\{L_n\}$).

In one example, ($r_1$, $r_2$)=($N_L$, $N_{TRP}$).

In one example, ($r_1$, $r_2$)=($\{L_n\}$, $N_{TRP}$).

In one example, ($r_1$, $r_2$)=($P_{CSI-RS}$, $N_{TRP}$).

In one example, there are 3 restrictions ($r_1$, $r_2$, $r_3$) on configuring C7, the restrictions are associated with parameters or parameter combinations, where $r_i$ is one of $\{L_n\}$, $N_L$, $P_{CSI-RS}$, v, R, $N_{TRP}$ and K.

In one example, ($r_1$, $r_2$, $r_3$)=($N_L$, $\{L_n\}$, $P_{CSI-RS}$).

In one example, ($r_1$, $r_2$, $r_3$)=($N_L$, $\{L_n\}$, $N_{TRP}$).

In one example, ($r_1$, $r_2$, $r_3$)=($N_L$, $\{L_n\}$, $P_{CSI-RS}$).

In one example, ($r_1$, $r_2$, $r_3$)=($N_{TRP}$, $\{L_n\}$, $P_{CSI-RS}$).

In one example, there are 4 restrictions ($r_1$, . . . , $r_4$) on configuring C7, the restrictions are associated with parameters or parameter combinations, where $r_r$ is one of $\{L_n\}$, $N_L$, $P_{CSI-RS}$, v, R, $N_{TRP}$ and K.

In one example, ($r_1$, . . . , $r_4$)=($N_L$, $\{L_n\}$, $P_{CSI-RS}$, $N_{TRP}$).

In one example, there are q restrictions ($r_1$, . . . , $r_q$) on configuring C7, the restrictions are associated with parameters or parameter combinations, where $r_i$ is one of $\{L_n\}$, $N_L$, $P_{CSI-RS}$, v, R, $N_{TRP}$ and K, and q∈{2, . . . , 7].

In one example, in addition to the multiple restrictions, as described above, the combination C7 can only be configured when the UE reports via UE a separate UE capability that it can support C7.

In one example (similar to each of the above examples), there is restriction on configuring C8 in Table 6, where the restriction is associated with (related to/based on) $\{L_n\}$, $N_L$, $P_{CSI-RS}$, v, R, $N_{TRP}$, and/or K.

In one example (similar to each of the above examples), there is restriction on configuring C9 in Table 6, where the restriction is associated with (related to/based on) $\{L_n\}$, $N_L$, $P_{CSI-RS}$, v, R, $N_{TRP}$, and/or K In one example (similar to each of the above examples), there is restriction on configuring C10 in Table 6, where the restriction is associated with (related to/based on) $\{L_n\}$, $N_L$, $P_{CSI-RS}$, v, R, $N_{TRP}$, and/or K.

In one example (similar to each of the above examples), there is restriction on configuring C11 in Table 6, where the restriction is associated with (related to/based on) $\{L_n\}$, $N_L$, $P_{CSI-RS}$, v, R, $N_{TRP}$, and/or K.

In one example (similar to each of the above examples), there is restriction on configuring C12 in Table 6, where the restriction is associated with (related to/based on) $\{L_n\}$, $N_L$, $P_{CSI-RS}$, v, R, $N_{TRP}$, and/or K In one example (similar to each of the above examples), there is restriction on configuring C6 in Table 6, where the restriction is associated with (related to/based on) $\{L_n\}$, $N_L$, $P_{CSI-RS}$, v, R, $N_{TRP}$, and/or K.

In one example (similar to each of the above examples), there is restriction on configuring C5 in Table 6, where the restriction is associated with (related to/based on) $\{L_n\}$, $N_L$, $P_{CSI-RS}$, v, R, $N_{TRP}$, and/or K.

In one embodiment, a table for $\{L_n\}$ (which can be one of the possible tables described in this disclosures) does not include at least one of the following combinations $\{L_n\}$=(4, 4, 2) and its permutations (e.g., (4, 2, 4), (2,4,4)) for $N_{TRP}$=3 and $\{L_n\}$=(4, 4, 4, 2) and its permutations (e.g., (4, 2, 4, 4), (4, 4, 2, 4), (2, 4, 4, 4)) for $N_{TRP}$=4.

TABLE 7

| Label | Index | $N_{TRP}$ | $\{L_n\}$ combinations |
|---|---|---|---|
| E1 | 1 | 1 | {2} |
| E2 | 2 | | {4} |
| E3 | 3 | | {6} |
| E4 | 4 | 2 | {2, 2} |
| E5 | 5 | | {2, 4} (and its permutation, {4, 2}) |
| E6 | 6 | | {4, 4} |
| E7 | 7 | | {2, 6} (and its permutation, {6, 2}) |
| E8 | 8 | | {4, 6} (and its permutation, {6, 4}) |
| E9 | 9 | 3 | {2, 2, 2} |
| E10 | 10 | | {2, 2, 4} (and its permutations) |
| E11 | 11 | | {4, 4, 4} |
| E12 | 12 | | {2, 2, 6} (and its permutations) |
| E13 | 13 | | {2, 4, 6} (and its permutations) |
| E14 | 14 | | {4, 4, 6} (and its permutations) |
| E15 | 15 | 4 | {2, 2, 2, 2} |
| E16 | 16 | | {2, 2, 2, 4} (and its permutations) |
| E17 | 17 | | {2, 2, 4, 4} (and its permutations) |
| E18 | 18 | | {4, 4, 4, 4} |
| E19 | 19 | | {2, 2, 2, 6} (and its permutations) |
| E20 | 20 | | {2, 2, 4, 6} (and its permutations) |
| E21 | 21 | | {2, 4, 4, 6} (and its permutations) |
| E22 | 22 | | {4, 4, 4, 6} (and its permutations) |

In one example, a supported number of combinations for the table of $\{L_n\}$ is at most Q, e.g., Q=34 or, Q=16 or Q=120, and at least U of {E1-E6 and E9-E11 and E15-E18} combinations, where 1≤U≤13, or one of {E1-E6 and E9-E11 and E15-E18} or all of {E1-E6 and E9-E11 and E15-E18} combinations in Table 7 are included in the at most Q combinations. In one example, all of {E1-E6 and E9-E11 and E15-E18} combinations in Table 7 are included (i.e., U=13) in the at most Q combinations.

Note that in Table 7, there are rows having one $\{L_n\}$ combination and its permutation(s) in Table 7. In one example, for such a row, one combination (among the permutations) can be written as shown in Table 7. In another example, each permutation can be written in another row. In another example, all permutations can be written in one row.

In one example, for only some of rows having one $\{L_n\}$ combination and its permutation(s) (e.g., E5 and E10), each permutation can be written in another row.

In another example, a subset (some) of permutations can be written in one row. In another example, for each combination in a subset (some) of permutations can be written in another row of the table.

In one example, in addition to the U combinations, among the remaining (22-13) combinations in Table 7 (i.e., E7, E8, E12-E14, E19-E22), at least one combination is/are included the at most Q combinations.

In one example, one of the remaining $\{L_n\}$ combinations in Table 7 (i.e., E7, E8, E12-E14, E19-E22) is included in the at most Q combinations.

$$\left(\binom{9}{1} \text{ examples are omitted.}\right)$$

examples are omitted.)

In one example, two of the remaining $\{L_n\}$ combinations in Table 7 (i.e., E7, E8, E12-E14, E19-E22) are included in the at most Q combinations.

$$\left(\binom{9}{2} \text{ examples are omitted.}\right)$$

examples are omitted.)

In one example, three of the remaining $\{L_n\}$ combinations in Table 7 (i.e., E7, E8, E12-E14, E19-E22) are included in the at most Q combinations.

$$\left(\binom{9}{3} \text{ examples are omitted.}\right)$$

examples are omitted.)

In one example, four of the remaining $\{L_n\}$ combinations in Table 7 (i.e., E7, E8, E12-E14, E19-E22) are included in the at most Q combinations.

$$\left(\binom{9}{4} \text{ examples are omitted.}\right)$$

In one example, five of the remaining $\{L_n\}$ combinations in Table 7 (i.e., E7, E8, E12-E14, E19-E22) are included in the at most Q combinations.

$$\left(\binom{9}{5} \text{ examples are omitted.}\right)$$

In one example, six of the remaining $\{L_n\}$ combinations in Table 7 (i.e., E7, E8, E12-E14, E19-E22) are included in the at most combinations.

$$\left(\binom{9}{6}\right)$$

In one example, seven of the remaining $\{L_n\}$ combinations in Table 7 (i.e., E7, E8, E12-E14, E19-E22) are included in the at most Q combinations.

$$\left(\binom{9}{7} \text{ examples are omitted.}\right)$$

In one example, eight of the remaining $\{L_n\}$ combinations in Table 7 (i.e., E7, E8, E12-E14, E19-E22) are included in the at most Q combinations.

$$\left(\binom{9}{8} \text{ examples are omitted.}\right)$$

In one example, all of the remaining $\{L_n\}$ combinations in Table 7 (i.e., E7, E8, E12-E14, E19-E22) are included in the at most Q combinations.

In one example, in addition to the U combinations, among the remaining (22-13) combinations in Table 7 (i.e., E7, E8, E12-E14, E19-E22), at least one combination is/are included the at most Q combinations.

In one example (A1), all of the $\{L_n\}$ combinations associated with $N_{TRP}=2$ (i.e., E7 and E8) are included in the at most Q combinations.

In one example (A2), all of the $\{L_n\}$ combinations associated with $N_{TRP}=2$, 3 (i.e., E7 and E8, E12-E14) are included in the at most Q combinations.

In one example (A3), all of the $\{L_n\}$ combinations associated with $N_{TRP}=2$, 3, 4 (i.e., E7 and E8, E12-E14, E19-E22) are included in the at most Q combinations.

In one example (A4), one of the $\{L_n\}$ combinations associated with $N_{TRP}=2$ (i.e., E7 and E8) is included in the at most Q combinations.

In one example (A5), one of the $\{L_n\}$ combinations associated with $N_{TRP}=3$ (i.e., E12-E14) is included in the at most Q combinations.

In one example (A6), one of the $\{L_n\}$ combinations associated with $N_{TRP}=4$ (i.e., E19-E22) is included in the at most Q combinations.

In one example (A7), two of the $\{L_n\}$ combinations associated with $N_{TRP}=2$ (i.e., E7 and E8) are included in the at most Q combinations.

In one example (A8), two of the $\{L_n\}$ combinations associated with $N_{TRP}=3$ (i.e., E12-E14) are included in the at most Q combinations.

In one example (A9), two of the $\{L_n\}$ combinations associated with $N_{TRP}=4$ (i.e., E19-E22) are included in the at most Q combinations.

In one example, any combination of the above examples can be an example, e.g., (A1)+(A5)+(A6), i.e., E7 and E8, and one of E12-E14, and one of E10-E22 are included in the at most Q combinations.

In one example, a table for $\{L_n\}$ includes at least one of the $\{L_n\}$ combinations of $\{E1-E6$ and $E9-E11$ and $E15-E18\}$. For example, a table for $\{L_n\}$ including $\{E1-E6$ and $E9-E11$ and $E15-E18\}$ can be written as in the following Tables 8-10:

TABLE 8

| Index | $N_{TRP}$ | $L_1$ | $L_2$ | $L_3$ | $L_4$ |
|---|---|---|---|---|---|
| 1 | 1 | 2 | | | |
| 2 | | 4 | | | |
| 3 | | 6 | | | |
| 4 | 2 | 2 | 2 | | |
| 5 | | 2 | 4 | | |
| 6 | | 4 | 2 | | |
| 7 | | 4 | 4 | | |

TABLE 8-continued

| Index | $N_{TRP}$ | $L_1$ | $L_2$ | $L_3$ | $L_4$ |
|---|---|---|---|---|---|
| 8 | 3 | 2 | 2 | 2 | |
| 9 | | 2 | 2 | 4 | |
| 10 | | 2 | 4 | 2 | |
| 11 | | 4 | 2 | 2 | |
| 12 | | 4 | 4 | 4 | |
| 13 | 4 | 2 | 2 | 2 | 2 |
| 14 | | 2 | 2 | 2 | 4 |
| 15 | | 2 | 2 | 4 | 4 |
| 16 | | 4 | 4 | 4 | 4 |

Ex1) including permutations for some $\{L_n\}$ combinations, i.e., $\{2, 4\}$ and $\{2, 2, 4\}$

TABLE 9

| Index | $N_{TRP}$ | $L_1$ | $L_2$ | $L_3$ | $L_4$ |
|---|---|---|---|---|---|
| 1 | 1 | 2 | | | |
| 2 | | 4 | | | |
| 3 | | 6 | | | |
| 4 | 2 | 2 | 2 | | |
| 5 | | 4 | 2 | | |
| 6 | | 2 | 4 | | |
| 7 | | 4 | 4 | | |
| 8 | 3 | 2 | 2 | 2 | |
| 9 | | 4 | 2 | 2 | |
| 10 | | 2 | 4 | 2 | |
| 11 | | 2 | 2 | 4 | |
| 12 | | 4 | 4 | 4 | |
| 13 | 4 | 2 | 2 | 2 | 2 |
| 14 | | 4 | 2 | 2 | 2 |
| 15 | | 4 | 4 | 2 | 2 |
| 16 | | 4 | 4 | 4 | 4 |

Ex2) including permutations for some $\{L_n\}$ combinations, i.e., $\{2, 4\}$ and $\{2, 2, 4\}$

TABLE 10

| Index | $N_{TRP}$ | $\{L_n\}$ combinations |
|---|---|---|
| 1 | 1 | $\{2\}$ |
| 2 | | $\{4\}$ |
| 3 | | $\{6\}$ |
| 4 | 2 | $\{2, 2\}$ |
| 5 | | $\{2, 4\}, \{4, 2\}$ |
| 6 | | $\{4, 4\}$ |
| 7 | 3 | $\{2, 2, 2\}$ |
| 8 | | $\{2, 2, 4\}, \{2, 4, 2\}, \{4, 2, 2\}$ |
| 9 | | $\{4, 4, 4\}$ |
| 10 | 4 | $\{2, 2, 2, 2\}$ |
| 11 | | $\{2, 2, 2, 4\}$ |
| 12 | | $\{2, 2, 4, 4\}$ |
| 13 | | $\{4, 4, 4, 4\}$ |

Ex3) including permutations for some $\{L_n\}$ combinations, i.e., $\{2, 4\}$ and $\{2, 2, 4\}$ In one example, a table for $\{L_n\}$ includes 0 in blank. For example, in the tables of Ex1) and Ex2) above, the blanks are filled with 0s.

In another example, the order of $\{L_n\}$ combinations can be different from above. For example, from top to bottom, $\{L_n\}$ combinations can be ordered in the order of $N_{TRP}=4$ to $N_{TRP}=1$. The tables above are in the order of $N_{TRP}=1$ to $N_{TRP}=4$ from top to bottom for example.

In one example (H1), there is restriction on configuring E22 in Table 7, where the restriction is associated with (related to/based on) $(p_v, \beta)$.

In one example (H1-L), UE is expected to be configured with E22 when $p \in Q_0$ is configured, where $Q_0$ is an index or a set of multiple indices, each index indicates, or corresponds to a combination of $(p_v, \beta)$ from a table of $(p_v, \beta)$.

In one example, the UE is not expected to be configured with E22 when $p \in Q_0$ is configured, where $Q_0$ is an index or a set of multiple indices, each index indicates, or corresponds to a combination of $(p_v, \beta)$ from a table of $(p_v, \beta)$.

In one example, regarding example H1-L, $Q_0$ can be per $\{L_n\}$ combination, i.e., above case it is for E22 (or any other $\{L_n\}$ combination). For example, linkage between a list/table of $(p_v, \beta)$ combinations (which can be one of the possible tables described in this disclosures) and a list/table of $\{L_n\}$ combinations (which can be one of the possible tables described in this disclosures) can be via pairing each combination for $\{L_n\}$ with at least one combination for $(p_v, \beta)$. For example, $Q_0, \ldots, Q_{Q-1}$ index sets can be used for linking each combination for $\{L_n\}$ with at least one combination for $(p_v, \beta)$.

In one example (H1-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H1-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (H2), there is restriction on configuring E22 in Table 7, where the restriction is associated with (related to/based on) $N_L$.

In one example, the UE is expected to be configured with E22 when $N_L \leq x$. For example, x can be only one of x=1, x=2, or x=4.

In one example, the UE is not expected to be configured with E22 when $N_L \leq x$. For example, x can be only one of x=1, x=2, or x=4.

In one example, the UE is expected to be configured with E22 when $N_L \geq x$. For example, x can be only one of x=1, x=2, or x=4.

In one example, the UE is not expected to be configured with E22 when $N_L \geq x$. For example, x can be only one of x=1, x=2, or x=4.

In one example, the UE is expected to be configured with E22 when $N_L = x$. For example, x can be only one of x=1, x=2, or x=4.

In one example, the UE is not expected to be configured with E22 when $N_L = x$. For example, x can be only one of x=1, x=2, or x=4.

In one example, the UE is expected to be configured with E22 when $N_L < x$. For example, x can be only one of x=1, x=2, or x=4.

In one example, the UE is not expected to be configured with E22 when $N_L < x$. For example, x can be only one of x=1, x=2, or x=4.

In one example, the UE is expected to be configured with E22 when $N_L > x$. For example, x can be only one of x=1, x=2, or x=4.

In one example, the UE is not expected to be configured with E22 when $N_L > x$. For example, x can be only one of x=1, x=2, or x=4.

In one example, the UE is expected to be configured with E22 when $x \leq N_L \leq y$. For example, x can be only one of x=1, x=2, or x=4. For example, y can be only one of y=1, y=2, or y=4.

In one example, the UE is not expected to be configured with E22 when $x \leq N_L \leq y$. For example, x can be only one of x=1, x=2, or x=4. For example, y can be only one of y=1, y=2, or y=4.

In one example, the UE is expected to be configured with E22 when $x < N_L \leq y$. For example, x can be only one of x=1, x=2, or x=4. For example, y can be only one of y=1, y=2, or y=4.

In one example, the UE is not expected to be configured with E22 when $x < N_L \leq y$. For example, x can be only one of x=1, x=2, or x=4. For example, y can be only one of y=1, y=2, or y=4.

In one example, the UE is expected to be configured with E22 when $x \leq N_L < y$. For example, x can be only one of x=1, x=2, or x=4. For example, y can be only one of y=1, y=2, or y=4.

In one example, the UE is not expected to be configured with E22 when $x \leq N_L < y$. For example, x can be only one of x=1, x=2, or x=4. For example, y can be only one of y=1, y=2, or y=4.

In one example, the UE is expected to be configured with E22 when $x < N_L < y$. For example, x can be only one of x=1, x=2, or x=4. For example, y can be only one of y=1, y=2, or y=4.

In one example, the UE is not expected to be configured with E22 when $x < N_L < y$. For example, x can be only one of x=1, x=2, or x=4. For example, y can be only one of y=1, y=2, or y=4.

In one example (H2-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H2-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (H3), there is restriction on configuring E22 in Table 7, where the restriction is associated with (related to/based on) $P_{CSI-RS}$. In one example, $P_{CSI-RS}$ is a number of CSI-RS ports per CSI-RS-resource (per TRP).

In one example, the UE is expected to be configured with E22 when $P_{CSI-RS} \leq x$. For example, x can be only one of x=4, x=8, x=12, x=16, x=24, or x=32.

In one example, the UE is not expected to be configured with E22 when $P_{CSI-RS} \leq x$. For example, x can be only one of x=4, x=8, x=12, x=16, x=24, or x=32.

In one example, the UE is expected to be configured with E22 when $P_{CSI-RS} \geq x$. For example, x can be only one of x=4, x=8, x=12, x=16, x=24, or x=32.

In one example, the UE is not expected to be configured with E22 when $P_{CSI-RS} \geq x$. For example, x can be only one of x=4, x=8, x=12, x=16, x=24, or x=32.

In one example, the UE is expected to be configured with E22 when $P_{CSI-RS} = x$. For example, x can be only one of x=4, x=8, x=12, x=16, x=24, or x=32.

In one example, the UE is not expected to be configured with E22 when $P_{CSI-RS} = x$. For example, x can be only one of x=4, x=8, x=12, x=16, x=24, or x=32.

In one example, the UE is expected to be configured with E22 when $P_{CSI-RS} < x$. For example, x can be only one of x=4, x=8, x=12, x=16, x=24, or x=32.

In one example, the UE is not expected to be configured with E22 when $P_{CSI-RS} < x$. For example, x can be only one of x=4, x=8, x=12, x=16, x=24, or x=32.

In one example, the UE is expected to be configured with E22 when $P_{CSI-RS} > x$. For example, x can be only one of x=4, x=8, x=12, x=16, x=24, or x=32.

In one example, the UE is not expected to be configured with E22 when $P_{CSI-RS} > x$. For example, x can be only one of x=4, x=8, x=12, x=16, x=24, or x=32.

In one example, the UE is expected to be configured with E22 when $x \leq P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with E22 when $x \leq P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with E22 when $x < P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with E22 when $x < P_{CSI-RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with E22 when $x \leq P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with E22 when $x \leq P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is expected to be configured with E22 when $x < P_{CSI-RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with E22 when $x < P_{CSI-RS} < y$. For example, x can be only one of x=4, x=8, x=12, x=16, x=24, or x=32. For example, y can be only one of y=4, y=8, y=12, y=16, y=24, or y=32.

In one example (H3-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H3-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (H4), there is restriction on configuring E22 in Table 7, where the restriction is associated with (related to/based on) v, where v is a number of layers, i.e., rank.

In one example, the UE is expected to be configured with E22 when $v \leq x$. For example, x can be only one of x=1, x=2, x=3, or x=4.

In one example, the UE is not expected to be configured with E22 when $v \leq x$. For example, x can be only one of x=1, x=2, x=3, or x=4.

In one example, the UE is expected to be configured with E22 when $v \geq x$. For example, x can be only one of x=1, x=2, x=3, or x=4.

In one example, the UE is not expected to be configured with E22 when $v \geq x$. For example, x can be only one of x=1, x=2, x=3, or x=4.

In one example, the UE is expected to be configured with E22 when v=x. For example, x can be only one of x=1, x=2, x=3, or x=4.

In one example, the UE is not expected to be configured with E22 when v=x. For example, x can be only one of x=1, x=2, x=3, or x=4.

In one example, the UE is expected to be configured with E22 when v<x. For example, x can be only one of x=1, x=2, x=3, or x=4.

In one example, the UE is not expected to be configured with E22 when v<x. For example, x can be only one of x=1, x=2, x=3, or x=4.

In one example, the UE is expected to be configured with E22 when v>x. For example, x can be only one of x=1, x=2, x=3, or x=4.

In one example, the UE is not expected to be configured with E22 when v>x. For example, x can be only one of x=1, x=2, x=3, or x=4.

In one example, the UE is expected to be configured with E22 when $x \leq v \leq y$. For example, x can be only one of x=1, x=2, x=3, or x=4. For example, y can be only one of y=1, y=2, y=3, or y=4.

In one example, the UE is not expected to be configured with E22 when $x \leq v \leq y$. For example, x can be only one of x=1, x=2, x=3, or x=4. For example, y can be only one of y=1, y=2, y=3, or y=4.

In one example, the UE is expected to be configured with E22 when $x < v \leq y$. For example, x can be only one of x=1, x=2, x=3, or x=4. For example, y can be only one of y=1, y=2, y=3, or y=4.

In one example, the UE is not expected to be configured with E22 when $x < v \leq y$. For example, x can be only one of x=1, x=2, x=3, or x=4. For example, y can be only one of y=1, y=2, y=3, or y=4.

In one example, the UE is expected to be configured with E22 when $x \leq v < y$. For example, x can be only one of x=1, x=2, x=3, or x=4. For example, y can be only one of y=1, y=2, y=3, or y=4.

In one example, the UE is not expected to be configured with E22 when $x \leq v < y$. For example, x can be only one of x=1, x=2, x=3, or x=4. For example, y can be only one of y=1, y=2, y=3, or y=4.

In one example, the UE is expected to be configured with E22 when x<v<y. For example, x can be only one of x=1, x=2, x=3, or x=4. For example, y can be only one of y=1, y=2, y=3, or y=4.

In one example, the UE is not expected to be configured with E22 when x<v<y. For example, x can be only one of x=1, x=2, x=3, or x=4. For example, y can be only one of y=1, y=2, y=3, or y=4.

In one example (H4-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H4-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (H5), there is restriction on configuring E22 in Table 7, where the restriction is associated with (related to/based on) R, where R is a number of precoders per subband.

In one example, the UE is expected to be configured with E22 when R=1.

In one example, the UE is not expected to be configured with E22 when R=2.

In one example, the UE is expected to be configured with E22 when $R \leq x$ or R<x. Here x can be fixed or configured or can be subject to UE capability.

In one example, the UE is not expected to be configured with E22 when R>x $R \geq x$. Here x can be fixed or configured or can be subject to UE capability.

In one example (H5-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H5-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (H6), there is restriction on configuring E22 in Table 7, where the restriction is associated with (related to/based on) K, where K is a number of subbands.

In one example, the UE is expected to be configured with E22 when $K \leq x$. For example, x can be only one of x=1, . . . or x=19.

In one example, the UE is not expected to be configured with E22 when $K \leq x$. For example, x can be only one of x=1, . . . or x=19

In one example, the UE is expected to be configured with E22 when $K \geq x$. For example, x can be only one of x=1, . . . or x=19.

In one example, the UE is not expected to be configured with E22 when $K \geq x$. For example, x can be only one of x=1, . . . or x=19.

In one example, the UE is expected to be configured with E22 when K=x. For example, x can be only one of x=1, . . . or x=19.

In one example, the UE is not expected to be configured with E22 when K=x. For example, x can be only one of x=1, . . . or x=19.

In one example, the UE is expected to be configured with E22 when K<x. For example, x can be only one of x=1, . . . or x=19.

In one example, the UE is not expected to be configured with E22 when K<x. For example, x can be only one of x=1, . . . or x=19.

In one example, the UE is expected to be configured with E22 when K>x. For example, x can be only one of x=1, . . . or x=19.

In one example, the UE is not expected to be configured with E22 when K>x. For example, x can be only one of x=1, . . . or x=19.

In one example, the UE is expected to be configured with E22 when $x \leq K \leq y$. For example, x can be only one of x=1, . . . or x=19. For example, y can be only one of y=1, . . . or y=19.

In one example, the UE is not expected to be configured with E22 when $x \leq K \leq y$. For example, x can be only one of x=1, . . . or x=19. For example, y can be only one of y=1, . . . or y=19.

In one example, the UE is expected to be configured with E22 when $x < K \leq y$. For example, x can be only one of x=1, . . . or x=19. For example, y can be only one of y=1, . . . or y=19.

In one example, the UE is not expected to be configured with E22 when $x < K \leq y$. For example, x can be only one of x=1, . . . or x=19. For example, y can be only one of y=1, . . . or y=19.

In one example, the UE is expected to be configured with E22 when $x \leq K < y$. For example, x can be only one of x=1, . . . or x=19. For example, y can be only one of y=1, . . . or y=19.

In one example, the UE is not expected to be configured with E22 when $x \leq K < y$. For example, x can be only one of x=1, . . . or x=19. For example, y can be only one of y=1, . . . or y=19.

In one example, the UE is expected to be configured with E22 when $x < K < y$. For example, x can be only one of x=1, . . . or x=19. For example, y can be only one of y=1, . . . or y=19.

In one example, the UE is not expected to be configured with E22 when $x < K < y$. For example, x can be only one of x=1, . . . or x=19. For example, y can be only one of y=1, . . . or y=19.

In one example (H6-a), there is restriction on configuring E22 according to one of the examples above. In addition, the restriction is UE-optional, i.e., the restriction is on/off depending on UE capability. The UE reports its capability on the restriction, whether it is needed or not, and the NW then follows the reported UE capability.

For the restriction in each example of (E22), the restriction is UE-optional or UE-capability. (omitted to describe each example in (E22).)

In one example (H6-b), there is restriction on configuring E22 according to one of the examples above. In addition, the E22 is UE-optional, i.e., E22 can be configured depending on UE capability. The UE reports its capability on the support of E22, and then only the NW can configure E22. This UE-optional feature can correspond to a separate UE capability.

In one example (any combination of H1-H6 (H1-a-H6-a, H6-b-H6-b), there are multiple restrictions on configuring E22 in Table 7, where the multiple restrictions include at least one of the restrictions H1-H6 (H1-a to H6-a, H1-b-H6-b), described above. The multiple restrictions are associated with (related to/based on) $(p_v, \beta)$, $N_L$, $P_{CSI-RS}$, v, R, and/or K.

In one example, there are 2 restrictions $(r_1, r_2)$ on configuring E22, the restrictions are associated with parameters or parameter combinations, where $r_i$ is one of $(p_v, \beta)$, $N_L$, $P_{CSI-RS}$, v, R, and K.

In one example, $(r_1, r_2) = (N_L, R)$.

In one example, $(r_1, r_2) = (N_L, P_{CSI-RS})$.

In one example, $(r_1, r_2) = (P_{CSI-RS}, R)$.

In one example, $(r_1, r_2) = (N_L, (p_v, \beta))$.

In one example, $(r_1, r_2) = (R, (p_v, \beta))$.

In one example, $(r_1, r_2) = (P_{CSI-RS}, (p_v, \beta))$.

In one example, there are 3 restrictions $(r_1, r_2, r_3)$ on configuring E22, the restrictions are associated with parameters or parameter combinations, where $r_i$ is one of $(p_v, \beta)$, $N_L$, $P_{CSI-RS}$, v, R, and K.

In one example, $(r_1, r_2, r_3) = (N_L, R, P_{CSI-RS})$.

In one example, $(r_1, r_2, r_3) = (N_L, R, (p_v, \beta))$.

In one example, $(r_1, r_2, r_3) = (N_L, (p_v, \beta), P_{CSI-RS})$.

In one example, $(r_1, r_2, r_3) = ((p_V, \beta), R, P_{CSI-RS})$.

In one example, there are 4 restrictions $(r_1, \ldots, r_4)$ on configuring E22, the restrictions are associated with parameters or parameter combinations, where $r_i$ is one of $(p_v, \beta)$, $N_L$, $P_{CSI-RS}$, v, R, and K.

In one example, $(r_1, \ldots, r_4) = (N_L, R, P_{CSI-RS}, (p_v, \beta))$

In one example, there are q restrictions $(r_1, \ldots, r_q)$ on configuring E22, the restrictions are associated with parameters or parameter combinations, where $r_i$ is one of $(p_v, \beta)$ $N_L$, $P_{CSI-RS}$, v, R, and K, and $q \in \{2, \ldots, 6\}$.

In one example, in addition to the multiple restrictions, as described above, the combination E22 can only be configured when the UE reports via UE a separate UE capability that it can support E22.

In one example (similar to each of the above examples), there is restriction on configuring E21 in Table 7, where the restriction is associated with (related to/based on) $(p_v, \beta)$, $N_L$, $P_{CSI-RS}$, v, R, and/or K.

In one example (similar to each of the above examples), there is restriction on configuring E20 in Table 7, where the restriction is associated with (related to/based on) $(p_v, \beta)$, $N_L$, $P_{CSI-RS}$, v, R, and/or K.

In one example (similar to each of the above examples), there is restriction on configuring E19 in Table 7, where the restriction is associated with (related to/based on) $(p_v, \beta)$, $N_L$, $P_{CSI-RS}$, v, R, and/or K.

In one example (similar to each of the above examples), there is restriction on configuring E14 in Table 7, where the restriction is associated with (related to/based on) $(p_v, \beta)$, $N_L$, $P_{CSI-RS}$, v, R, and/or K.

In one example (similar to each of the above examples), there is restriction on configuring E13 in Table 7, where the restriction is associated with (related to/based on) $(p_v, \beta)$, $N_L$, $P_{CSI-RS}$, v, R, and/or K.

In one example (similar to each of the above examples), there is restriction on configuring E12 in Table 7, where the restriction is associated with (related to/based on) $(p_v, \beta)$, $N_L$, $P_{CSI-RS}$, v, R, and/or K.

In one example (similar to each of the above examples), there is restriction on configuring E8 in Table 7, where the restriction is associated with (related to/based on) $(p_v, \beta)$, $N_L$, $P_{CSI\text{-}RS}$, v, R, and/or K.

In one example (similar to each of the above examples), there is restriction on configuring E7 in Table 7, where the restriction is associated with (related to/based on) $(p_v, \beta)$, $N_L$, $P_{CSI\text{-}RS}$, v, R, and/or K.

In one example (similar to each of the above examples), there is restriction on configuring E3 in Table 7, where the restriction is associated with (related to/based on) $(p_v, \beta)$, $N_L$, $P_{CSI\text{-}RS}$, v, R, and/or K.

In one example, to find a table for $(p_v, \beta)$ and a table for $\{L_n\}$, the following methodology can be used.

Metric: according to the agreed EVM, i.e., UPT vs overhead trade-off (just like Rel. 16/17)

Criterion: similar to Rel. 16 (R1-1908499)

The overhead regime of interest <=max overhead of Rel.16/17 (~1000 bits)

$(p_v, \beta)$ values and $\{L_n\}$ combinations performing worse or incurring very high overhead excluded.

Candidate Values $(p_v, \beta)$: max 8 combinations (similar to legacy)

Candidate $p_v$ values: ⅛, ¼, ½

Candidate $\beta$ values: ⅛, ¼, ½, ¾

$\{L_n\}$: minimize the number of combinations as much as possible

Candidate $L_n$ values: {2, 4, 6}

$L_n$=6:

Optional in Rel. 16 due to complexity (e.g., large size SVD)

For >1 TRPs, the complexity is even more $L_n$=6 can incur very high overhead

Therefore, $L_n$=6 can be excluded from the candidate list

To Reduce Simulation Efforts, Two-Step Approach

Step 1: for each $\{L_n\}$ combination, select up to best 8 pairs $(p_v, \beta)$ based on the criterion Step 2:

For each candidate $(p_v, \beta)$, count the number of $\{L_n\}$ combinations that include $(p_v, \beta)$ as one of the 8 pairs from Step 1

Select 8 pairs $(p_v, \beta)$ that have the largest counts from the previous step From the selected 8 pairs $(p_v, \beta)$, prune out (exclude) redundant $\{L_n\}$ combinations based on the criterion Simulation Results SLS simulations were performed to compare Mode 2 performance for all possible pairs of $(p_v, \beta)$ for each $\{L_n, n=1, \ldots, N_{TRP}\}$ combination for each case of $N_{TRP}=2, 3, 4$, where $L_n \in \{2, 4\}$ and $$p_v \in \left\{\frac{1}{8}, \frac{1}{4}, \frac{1}{2}\right\} \text{ and } \beta \in \left\{\frac{1}{8}, \frac{1}{4}, \frac{1}{2}, \frac{3}{4}\right\}.$$

Here, $p_v$=x implies $p_v$=x for v∈{1, 2} and $$p_v = \frac{x}{2}$$

for v∈{3, 4}. Scenarios were considered where the UE is allowed to select dynamic rank up to 2 and up to 4.

For $N_{TRP}$=2, 3, intra-site inter-cell scenarios were considered.

For $N_{TRP}$=4, intra-site intra-cell scenarios were considered.

Figure 12:
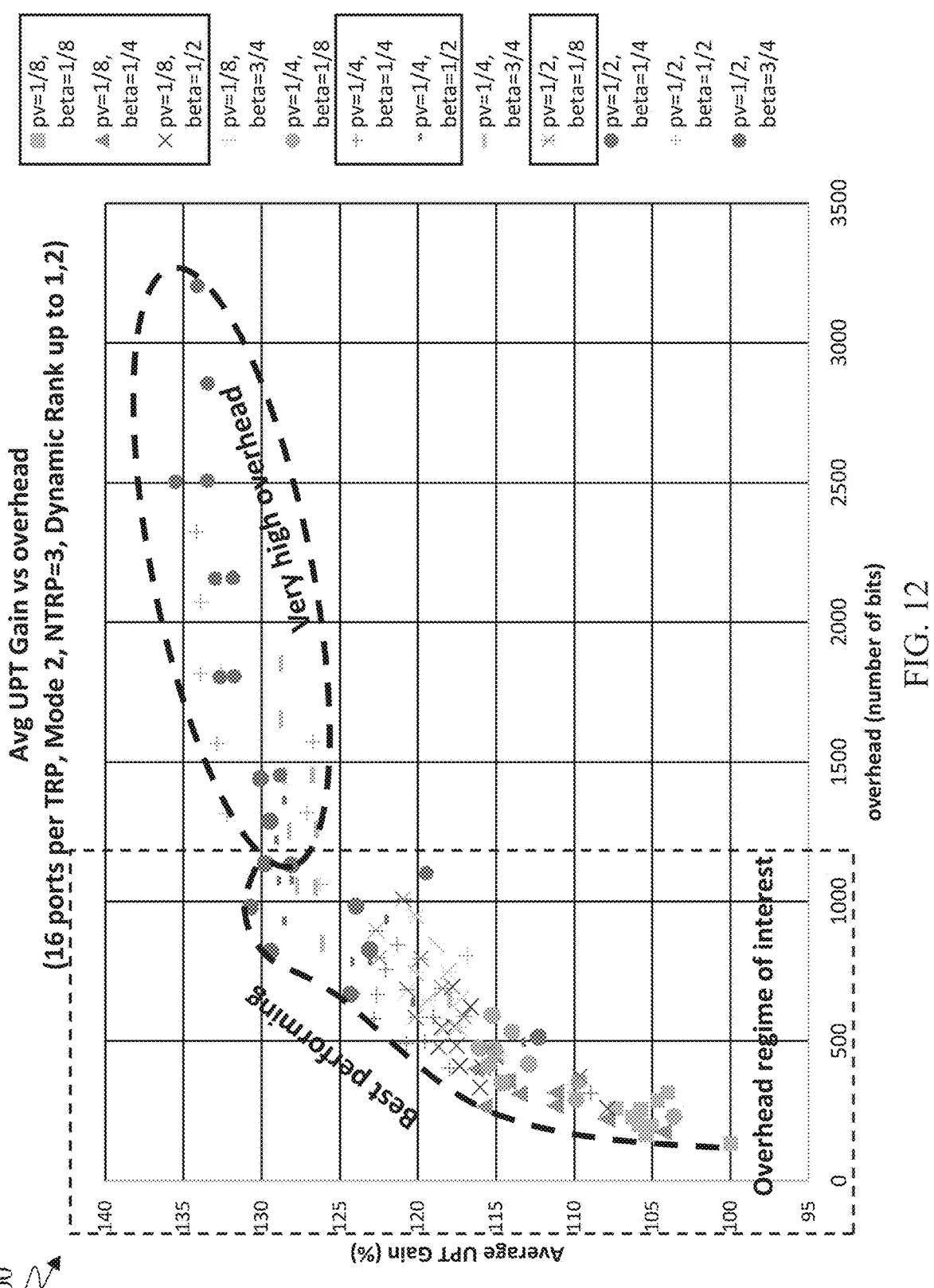
FIG. 12 illustrates an example that shows the average UPT gain vs overhead with respect to combinations of $\{L_n\}$ and $(p_v, \beta)$ for $N_{TRP}=3$ for dynamic rank up to 2 according to embodiments of the present disclosure.

FIG. 12 illustrates an example 1200 that shows the average UPT gain vs overhead with respect to combinations of $\{L_n\}$ and $(p_v, \beta)$ for $N_{TRP}$=3 for dynamic rank up to 2 according to embodiments of the present disclosure. The embodiment of the example 1200 that shows the average UPT gain vs overhead with respect to combinations of $\{L_n\}$ and $(p_v, \beta)$ for $N_{TRP}$=3 for dynamic rank up to 2 illustrated in FIG. 12 is for illustration only. FIG. 12 does not limit the scope of this disclosure to any particular implementation of the average UPT gain vs overhead with respect to combinations of $\{L_n\}$ and $(p_v, \beta)$ for $N_{TRP}$=3 for dynamic rank up to 2.

Figure 13:
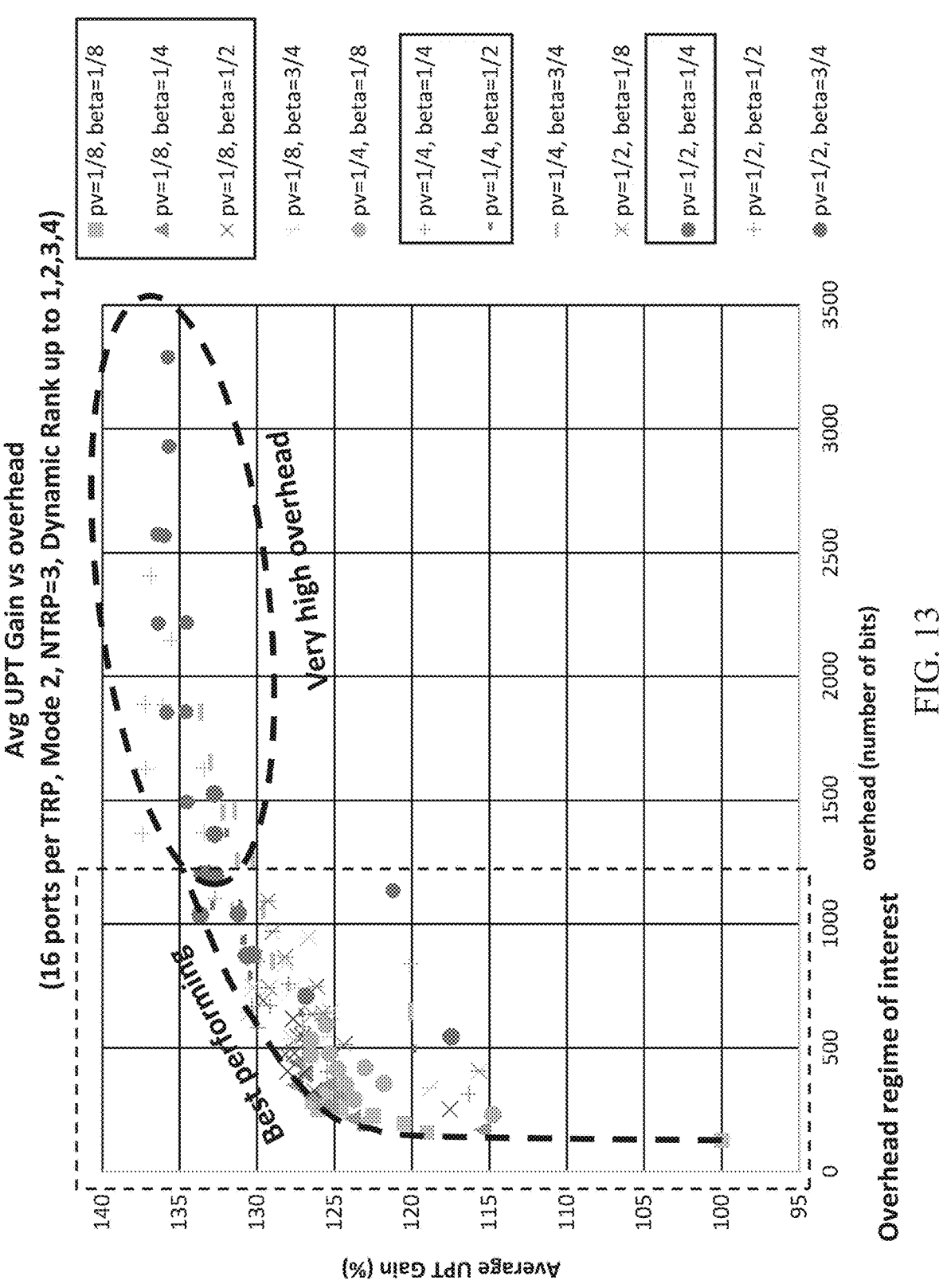
FIG. 13 illustrates an example that shows the average UPT gain vs overhead with respect to combinations of $\{L_n\}$ and $(p_v, \beta)$ for $N_{TRP}=3$ for dynamic rank up to 4 according to embodiments of the present disclosure.

FIG. 13 illustrates an example 1300 that shows the average UPT gain vs overhead with respect to combinations of $\{L_n\}$ and $(p_v, \beta)$ for $N_{TRP}$=3 for dynamic rank up to 4 according to embodiments of the present disclosure. The embodiment of the example 1300 that shows the average UPT gain vs overhead with respect to combinations of $\{L_n\}$ and $(p_v, \beta)$ for $N_{TRP}$=3 for dynamic rank up to 4 illustrated in FIG. 13 is for illustration only. FIG. 13 does not limit the scope of this disclosure to any particular implementation of the average UPT gain vs overhead with respect to combinations of $\{L_n\}$ and $(p_v, \beta)$ for $N_{TRP}$=3 for dynamic rank up to 4.

As seen in FIG. 12 and FIG. 13, the overhead regime of interest (<=1000 bits) may be considered and the best performing points within the overhead regime may be found.

Finding Best Pairs of $(p_v, \beta)$:

To find the best pairs of $(p_v, \beta)$, the following approach based on the criterion described in this disclosure was considered.

Step a: For each given $N_{TRP}$ and for each combination of $\{L_n\}$, find the (<8) best pairs of $(p_v, \beta)$ that yield the best UPT vs overhead trade-off (most left and upper points)

Step b: For each candidate $(p_v, \beta)$, count how many times are selected as a best pair (determined in Step a) by checking every case of $N_{TRP}$ and $\{L_n\}$ combination.

Step c: Sort the best pairs of $(p_v, \beta)$ using the counts found in Step b.

Figure 14:
FIG. 14 illustrates a chart showing statistics for finding the best pairs of $(p_v, \beta)$ using the approach described above according to embodiments of the present disclosure.

FIG. 14 illustrates a chart 1400 showing statistics for finding the best pairs of $(p_v, \beta)$ using the approach described above according to embodiments of the present disclosure. The embodiment of the chart 1400 that shows statistics for finding the best pairs of $(p_v, \beta)$ illustrated in FIG. 14 is for illustration only. FIG. 14 does not limit the scope of this disclosure to any particular implementation of the chart 1400 showing statistics for finding the best pairs of $(p_v, \beta)$.

As seen in FIG. 14, for example, $$(p_v, \beta) = \left(\frac{1}{8}, \frac{1}{8}\right) \text{ and } \left(\frac{1}{8}, \frac{1}{4}\right)$$

are selected as a best pair for all cases of $(N_{TRP}, \{L_n\})$ and $$(p_v, \beta) = \left(\frac{1}{4}, \frac{1}{4}\right) \text{ and } \left(\frac{1}{2}, \frac{1}{4}\right)$$

are selected as a best pair for more than or equal to a half of all cases of $(N_{TRP}, \{L_n\})$. Here, we considered one case of $\{L_n\}$ among its possible permutations.

Based on the above approach, the following 6 best pairs of $(p_v, \beta)$ were found.

| Index | $p_v$ | | $\beta$ |
|---|---|---|---|
| | $v \in \{1, 2\}$ | $v \in \{3, 4\}$ | |
| 1 | $\frac{1}{8}$ | $\frac{1}{16}$ | $\frac{1}{8}$ |
| 2 | $\frac{1}{8}$ | $\frac{1}{16}$ | $\frac{1}{4}$ |
| 3 | $\frac{1}{8}$ | $\frac{1}{16}$ | $\frac{1}{2}$ |
| 4 | $\frac{1}{4}$ | $\frac{1}{8}$ | $\frac{1}{4}$ |
| 5 | $\frac{1}{4}$ | $\frac{1}{8}$ | $\frac{1}{2}$ |
| 6 | $\frac{1}{2}$ | $\frac{1}{4}$ | $\frac{1}{4}$ |

Observation:

$$(p_v, \beta) = \left(\frac{1}{8}, \frac{1}{8}\right), \left(\frac{1}{8}, \frac{1}{4}\right), \left(\frac{1}{8}, \frac{1}{2}\right), \left(\frac{1}{4}, \frac{1}{4}\right), \left(\frac{1}{4}, \frac{1}{2}\right), \left(\frac{1}{2}, \frac{1}{4}\right)$$

are good candidates to yield better UPT vs overhead trade-off performance than other combinations of $(p_v, \beta)$.

Pruning $\{L_n\}$ Combinations Performing Worse, Based on the Best Pairs of $(p_v, \beta)$ Once the best pairs of $(p_v, \beta)$ were found, a comparison of the performance of $\{L_n\}$ using the best pairs of $(p_v, \beta)$ can be performed.

Figure 15:
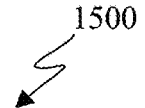
FIG. 15 illustrates examples to compare the performance of two $\{Ln\}$ combinations using $(p_v, \beta)$ pairs for $N_{TRP}=3$ according to embodiments of the present disclosure.
Figure 15:
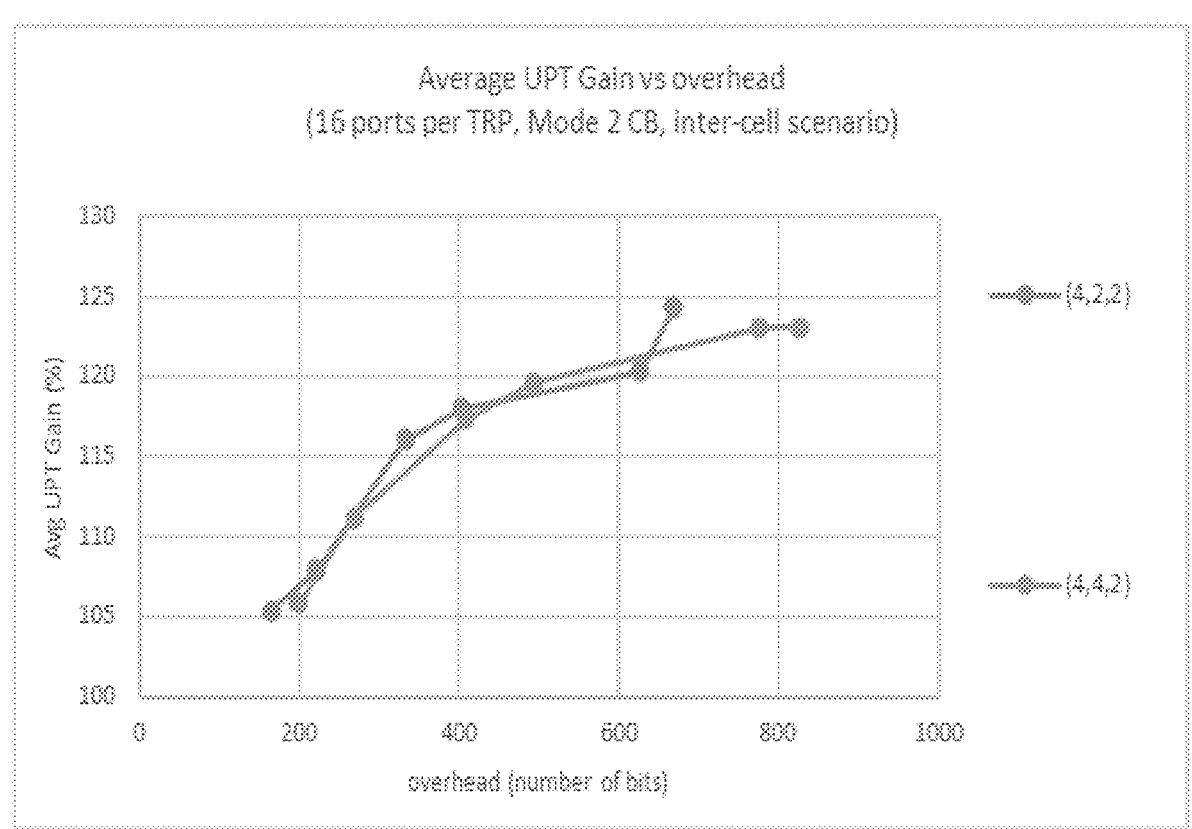

FIG. 15 illustrates examples to compare the performance of two $\{L_n\}$ combinations using $(p_v, \beta)$ pairs for $N_{TRP}=3$ 1500 according to embodiments of the present disclosure. The embodiment of the examples to compare the performance of two $\{L_n\}$ combinations using $(p_v, \beta)$ pairs for $N_{TRP}=3$ 1500 illustrated in FIG. 15 is for illustration only. FIG. 15 does not limit the scope of this disclosure to any particular implementation of the examples to compare the performance of two $\{L_n\}$ combinations using $(p_v, \beta)$ pairs for $N_{TRP}=3$ 1500.

Figure 16:
FIG. 16 illustrates examples to compare the performance of two $\{Ln\}$ combinations using $(p_v, \beta)$ pairs for $N_{TRP}=4$ according to embodiments of the present disclosure.
Figure 16:
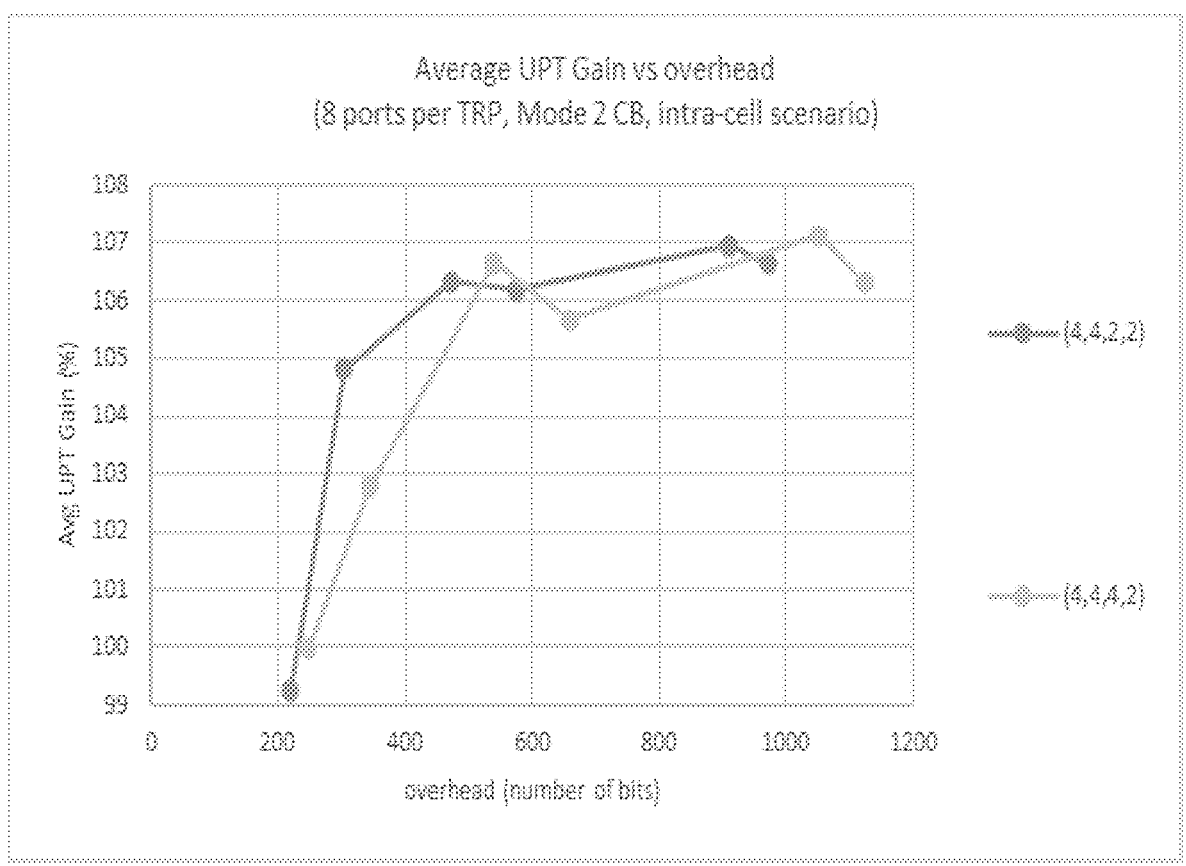

FIG. 16 illustrates examples to compare the performance of two $\{L_n\}$ combinations using $(p_v, \beta)$ pairs for $N_{TRP}=4$ 1600 according to embodiments of the present disclosure. The embodiment of the examples to compare the performance of two $\{L_n\}$ combinations using $(p_v, \beta)$ pairs for $N_{TRP}=4$ 1600 illustrated in FIG. 16 is for illustration only. FIG. 16 does not limit the scope of this disclosure to any particular implementation of the examples to compare the performance of two $\{L_n\}$ combinations using $(p_v, \beta)$ pairs for $N_{TRP}=4$ 1600.

In one embodiment, for a table of $\{L_n\}$ that can be one of the tables or the whole tables/sub-tables, or tables that can be constructed in/under one or more embodiments described herein with/without the column of $L_{max}$ and other embodiments in this disclosure, $N_L \geq 1$ combinations of $\{L_n\}$ can be configured to a UE using the table of $\{L_n\}$.

In one embodiment, configurable/possible/supported values of $N_L$ depend on $N_{TRP}$, and $N_L=1$ is a supported value for all $N_{TRP}=1, 2, 3, 4$.

In one example, the configurable values of $N_L$ include at least one of the elements in $\{2, 4\}$ for a given $N_{TRP}$.

In one example, $N_L=1$ for $N_{TRP}=1$, $N_L \in \{1, 2, 4\}$ for $N_{TRP}=2$, $N_L \in \{1, 2\}$ or $\{1, 4\}$ or $\{1,2,4\}$ for $N_{TRP}=3$, $N_L \in \{1, 4\}$ for $N_{TRP}=4$, Other examples are omitted.

In one example, a UE may support none, any, or some or all of $N_L>1$ configurable values based on its capability (UE capability) and report its capability. For example, when $N_L$ $E \{1,2,4\}$ is configurable, UE may report its capability whether to support $N_L=2$ only or $N_L=4$ only or both $N_L=2$ and 4. The NW then follows the reported UE capability on $N_L$.

In one example, the configurable values of $N_L$ include at least one of the elements in X for a given $N_{TRP}$. In one example, $X=\{2, 4, 8, 16\}$. In one example, X can be any subset of $\{1, 2, \ldots, 32\}$.

In one embodiment, configuring $N_L \geq 1$ combination(s) of $\{L_n\}$ can be restricted with one or more indices from the table for $\{L_n\}$.

In one example, there are two indices sets $S_0$ and $S_1$ for the table of $\{L_n\}$, where the $\{L_n\}$ combinations associated with the indices in $S_0$ are considered as basic configuration and the $\{L_n\}$ combinations associated with the indices in $S_1$ are considered as optional configuration. For example, for the optional configuration, it requires UE capability reporting, whether the associated $\{L_n\}$ combination(s) is/are supported by the UE. In another example, for the basic configuration, the UE needs to support hence it doesn't require UE capability reporting.

In one example, there are multiple ($\geq 2$) indices sets for the table of $\{L_n\}$, where $N_L>1$ $\{L_n\}$ combinations can be configured within a (single) set. For example, if one $\{L_n\}$ combination associated with a certain set is configured, other $N_L-1$ configured combinations of $\{L_n\}$ should also be associated with the same set.

In one example, there are multiple ($\geq 2$) indices sets for the table of $\{L_n\}$, where $N_L>1$ $\{L_n\}$ combinations can be configured across $N_L$ different sets, i.e., the sets are non-overlapping.

In one embodiment, configuring $N_L>1$ combination(s) of $\{L_n\}$ can be restricted with one or more indices from the table for $\{L_n\}$ and/or with other parameters that include at least one of the followings: $P_{CSI-RS}$, R, $N_{TRP}$, v, $L_n$, $(p_v, \beta)$.

In one example (F1), there is restriction on configuring $N_L>1$ combinations of $\{L_n\}$, where the restriction is associated with (related to/based on) $\{L_n\}$.

In one example, the UE is expected to be configured with $N_L>1$ combinations of $\{L_n\}$, when $$\max_n L_n \leq x.$$

For example, x can be only one of $x=2$, $x=4$, or $x=6$.
In one example, the UE is not expected to be configured with $N_L>1$ combinations of $\{L_n\}$, when $$\max_n L_n \leq x.$$

For example, x can be only one of $x=2$, $x=4$, or $x=6$.
In one example, the UE is expected to be configured with $N_L>1$ combinations of $\{L_n\}$, when $$\max_n L_n \leq x.$$

For example, x can be only one of $x=2$, $x=4$, or $x=6$.
In one example, the UE is not expected to be configured with $N_L>1$ combinations of $\{L_n\}$, when $$\max_n L_n \leq x.$$

For example, x can be only one of x=2, x=4, or x=6.

In one example, the UE is expected to be configured with $N_L>1$ combinations of $\{L_n\}$, when $$\max_n L_n \leq x.$$

For example, x can be only one of x=2, x=4, or x=6.

In one example, the UE is not expected to be configured with $N_L>1$ combinations of $\{L_n\}$, when $$\max_n L_n \leq x.$$

For example, x can be only one of x=2, x=4, or x=6.

In one example, the UE is expected to be configured with $N_L>1$ combinations of $\{L_n\}$, when $$\max_n L_n \leq x.$$

For example, x can be only one of x=2, x=4, or x=6.

In one example, the UE is not expected to be configured with $N_L>1$ combinations of $\{L_n\}$, when $$\max_n L_n = x.$$

For example, x can be only one of x=2, x=4, or x=6.

In one example, the UE is expected to be configured with $N_L>1$ combinations of $\{L_n\}$, when $$\max_n L_n = x.$$

For example, x can be only one of x=2, x=4, or x=6.

In one example, the UE is not expected to be configured with $N_L>1$ combinations of $\{L_n\}$, when $$\max_n L_n = x.$$

For example, x can be only one of x=2, x=4, or x=6.

In one example, the UE is expected to be configured with $N_L>1$ combinations of $\{L_n\}$, when $$\max_n L_n = x.$$

For example, x can be only one of x=2, x=4, or x=6.

In one example, the UE is not expected to be configured with $N_L>1$ combinations of $\{L_n\}$, when $$\max_n L_n = x.$$

For example, x can be only one of x=2, x=4, or x=6.

In one example, the UE is expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is not expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is not expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is not expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is not expected to be configured with $N_L>1$ combinations of $\{L_n\}$, when $$x \leq \max_n L_n \leq y.$$

For example, x can be only one of x=2, x=4, or x=6. For example, y can be only one of y=2, y=4, or y=6.

In one example, the UE is expected to be configured with $N_L>1$ combinations of $\{L_n\}$, when $\Sigma_n L_n \le x \times t$ or $\Sigma_n L_n \le z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with $N_L>1$ combinations of $\{L_n\}$, when $\Sigma_n L_n \le x \times t$ or $\Sigma_n L_n \le z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with $N_L>1$ combinations of $\{L_n\}$, when $\Sigma_n L_n \ge x \times t$ or $\Sigma_n L_n \ge z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with $N_L>1$ combinations of $\{L_n\}$, when $\Sigma_n L_n \ge x \times t$ or $\Sigma_n L_n \ge z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with $N_L>1$ combinations of $\{L_n\}$, when $\Sigma_n L_n = x \times t$ or $\Sigma_n L_n = z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with $N_L>1$ combinations of $\{L_n\}$, when $\Sigma_n L_n = x \times t$ or $\Sigma_n L_n = z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with $N_L>1$ combinations of $\{L_n\}$, when $\Sigma_n L_n < x \times t$ or $\Sigma_n L_n < z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with $N_L>1$ combinations of $\{L_n\}$, when $\Sigma_n L_n < x \times t$ or $\Sigma_n L_n < z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with $N_L>1$ combinations of $\{L_n\}$, when $\Sigma_n L_n > x \times t$ or $\Sigma_n L_n > z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is not expected to be configured with $N_L>1$ combinations of $\{L_n\}$, when $\Sigma_n L_n > x \times t$ or $\Sigma_n L_n > z$. For example, x can be only one of x=2, x=4, or x=6. Here, t can be fixed, e.g., $t=N_{TRP}$ or 3. For example, z can be only one of z=2, z=4, . . . , or z=24.

In one example, the UE is expected to be configured with $N_L>1$ combinations of $\{L_n\}$, when $x \times t \le \Sigma_n L_n \le y \times t$ or $z_1 \le \Sigma_n L_n \le z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with $N_L>1$ combinations of $\{L_n\}$, when $x \times t \le \Sigma_n L_n < y \times t$ or $z_1 \le \Sigma_n L_n \le z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with $N_L>1$ combinations of $\{L_n\}$, when $x \times t < \Sigma_n L_n \le y \times t$ or $z_1 < \Sigma_n L_n \le z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with $N_L>1$ combinations of $\{L_n\}$, when $x \times t < \Sigma_n L_n \le y \times t$ or $z_1 < \Sigma_n L_n \le z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with $N_L>1$ combinations of $\{L_n\}$, when $x \times t \le \Sigma_n L_n < y \times t$ or $z_1 \le \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with $N_L>1$ combinations of $\{L_n\}$, when $x \times t \le \Sigma_n L_n < y \times t$ or $z_1 \le \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is expected to be configured with $N_L>1$ combinations of $\{L_n\}$, when $x \times t < \Sigma_n L_n < y \times t$ or $z_1 < \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example, the UE is not expected to be configured with $N_L>1$ combinations of $\{L_n\}$, when $x \times t < \Sigma_n L_n < y \times t$ or $z_1 < \Sigma_n L_n < z_2$. For example, x can be only one of x=2, x=4, or x=6. For example, y can be only one of y=2, y=4, or y=6. Here, t can be fixed, e.g., $t=N_{TRP}$ or 3. For example, $z_1$ can be only one of z=2, z=4, . . . , or z=24. For example, $z_2$ can be only one of z=2, z=4, . . . , or z=24.

In one example (F2), there is restriction on configuring $N_L>1$ combinations of $\{L_n\}$, where the restriction is associated with (related to/based on) $P_{CSI-RS}$. In one example, $P_{CSI-RS}$ is a number of CSI-RS ports per CSI-RS-resource (per TRP)

In one example, the UE is expected to be configured with $N_L>1$ combinations of $\{L_n\}$, when $P_{CSI-RS} \le x$. For example, x can be only one of x=4, x=8, x=12, x=16, x=24, or x=32.

In one example, the UE is not expected to be configured with $N_L>1$ combinations of $\{L_n\}$, when $P_{CSI-RS} \le x$. For example, x can be only one of x=4, x=8, x=12, x=16, x=24, or x=32.

In one example, the UE is expected to be configured with $N_L>1$ combinations of $\{L_n\}$, when $P_{CSI\text{-}RS} \geq x$. For example, x can be only one of x=4, x=8, x=12, x=16, x=24, or x=32.

In one example, the UE is not expected to be configured with $N_L>1$ combinations of $\{L_n\}$, when $P_{CSI\text{-}RS} \geq x$. For example, x can be only one of x=4, x=8, x=12, x=16, x=24, or x=32.

In one example, the UE is expected to be configured with $N_L>1$ combinations of $\{L_n\}$, when $P_{CSI\text{-}RS} = x$. For example, x can be only one of x=4, x=8, x=12, x=16, x=24, or x=32.

In one example, the UE is not expected to be configured with $N_L>1$ combinations of $\{L_n\}$, when $P_{CSI\text{-}RS} = x$. For example, x can be only one of x=4, x=8, x=12, x=16, x=24, or x=32.

In one example, the UE is expected to be configured with $N_L>1$ combinations of $\{L_n\}$, when $P_{CSI\text{-}RS} < x$. For example, x can be only one of x=4, x=8, x=12, x=16, x=24, or x=32.

In one example, the UE is not expected to be configured with $N_L>1$ combinations of $\{L_n\}$, when $P_{CSI\text{-}RS} < x$. For example, x can be only one of x=4, x=8, x=12, x=16, x=24, or x=32.

In one example, the UE is expected to be configured with $N_L>1$ combinations of $\{L_n\}$, when $P_{CSI\text{-}RS} > x$. For example, x can be only one of x=4, x=8, x=12, x=16, x=24, or x=32.

In one example, the UE is not expected to be configured with $N_L>1$ combinations of $\{L_n\}$, when $P_{CSI\text{-}RS} > x$. For example, x can be only one of x=4, x=8, x=12, x=16, x=24, or x=32.

In one example, the UE is expected to be configured with $N_L>1$ combinations of $\{L_n\}$, when $x \leq P_{CSI\text{-}RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with $N_L>1$ combinations of $\{L_n\}$, when $x \leq P_{CSI\text{-}RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with $N_L>1$ combinations of $\{L_n\}$, when $x < P_{CSI\text{-}RS} \leq y$. For example, x can be only one of x=4, x=8, x=12, x=16, x=24, or x=32. For example, y can be only one of y=4, y=8, y=12, y=16, y=24, or y=32.

In one example, the UE is not expected to be configured with $N_L>1$ combinations of $\{L_n\}$, when $x < P_{CSI\text{-}RS} \leq y$. For example, x can be only one of x=4, x=8, x=12, x=16, x=24, or x=32. For example, y can be only one of y=4, y=8, y=12, y=16, y=24, or y=32.

In one example, the UE is expected to be configured with $N_L>1$ combinations of $\{L_n\}$, when $x \leq P_{CSI\text{-}RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with $N_L>1$ combinations of $\{L_n\}$, when $x \leq P_{CSI\text{-}RS} < y$. For example, x can be only one of x=4, x=8, x=12, x=16, x=24, or x=32. For example, y can be only one of y=4, y=8, y=12, y=16, y=24, or y=32.

In one example, the UE is expected to be configured with $N_L>1$ combinations of $\{L_n\}$, when $x < P_{CSI\text{-}RS} < y$. For example, x can be only one of x=4, x=8, x=12, x=16, x=24, or x=32. For example, y can be only one of y=4, y=8, y=12, y=16, y=24, or y=32.

In one example, the UE is not expected to be configured with $N_L>1$ combinations of $\{L_n\}$, when $x < P_{CSI\text{-}RS} < y$. For example, x can be only one of x=4, x=8, x=12, x=16, x=24, or x=32. For example, y can be only one of y=4, y=8, y=12, y=16, y=24, or y=32.

In one example (F3), there is restriction on configuring $N_L>1$ combinations of $\{L_n\}$, where the restriction is associated with (related to/based on) v, where v is a number of layers, i.e., rank.

In one example, the UE is expected to be configured with $N_L>1$ combinations of $\{L_n\}$, when $v \leq x$. For example, x can be only one of x=1, x=2, x=3, or x=4.

In one example, the UE is not expected to be configured with $N_L>1$ combinations of $\{L_n\}$, when $v \leq x$. For example, x can be only one of x=1, x=2, x=3, or x=4.

In one example, the UE is expected to be configured with $N_L>1$ combinations of $\{L_n\}$, when $v \geq x$. For example, x can be only one of x=1, x=2, x=3, or x=4.

In one example, the UE is not expected to be configured with $N_L>1$ combinations of $\{L_n\}$, when $v \geq x$. For example, x can be only one of x=1, x=2, x=3, or x=4.

In one example, the UE is expected to be configured with $N_L>1$ combinations of $\{L_n\}$, when $v = x$. For example, x can be only one of x=1, x=2, x=3, or x=4.

In one example, the UE is not expected to be configured with $N_L>1$ combinations of $\{L_n\}$, when $v = x$. For example, x can be only one of x=1, x=2, x=3, or x=4.

In one example, the UE is expected to be configured with $N_L>1$ combinations of $\{L_n\}$, when $v < x$. For example, x can be only one of x=1, x=2, x=3, or x=4.

In one example, the UE is not expected to be configured with $N_L>1$ combinations of $\{L_n\}$, when $v < x$. For example, x can be only one of x=1, x=2, x=3, or x=4.

In one example, the UE is expected to be configured with $N_L>1$ combinations of $\{L_n\}$, when $v > x$. For example, x can be only one of x=1, x=2, x=3, or x=4.

In one example, the UE is not expected to be configured with $N_L>1$ combinations of $\{L_n\}$, when $v > x$. For example, x can be only one of x=1, x=2, x=3, or x=4.

In one example, the UE is expected to be configured with $N_L>1$ combinations of $\{L_n\}$, when $x \leq v \leq y$. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when $x \leq v \leq y$. For example, x can be only one of x=1, x=2, x=3, or x=4. For example, y can be only one of y=1, y=2, y=3, or y=4

In one example, the UE is expected to be configured with $N_L>1$ combinations of $\{L_n\}$, when $x < v \leq y$. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when $x < v \leq y$. For example, x can be only one of x=1, x=2, x=3, or x=4. For example, y can be only one of y=1, y=2, y=3, or y=4.

In one example, the UE is expected to be configured with $N_L>1$ combinations of $\{L_n\}$, when $x \leq v < y$. For example, x can be only one of x=1, x=2, x=3, or x=4. For example, y can be only one of y=1, y=2, y=3, or y=4

In one example, the UE is not expected to be configured with $N_L>1$ combinations of $\{L_n\}$, when $x \leq v < y$. For example, x can be only one of x=1, x=2, x=3, or x=4. For example, y can be only one of y=1, y=2, y=3, or y=4.

In one example, the UE is expected to be configured with $N_L>1$ combinations of $\{L_n\}$, when x<v<y. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when x<v<y. For example, x can be only one of x=1, x=2, x=3, or x=4. For example, y can be only one of y=1, y=2, y=3, or y=4.

In one example (F4), there is restriction on configuring $N_L>1$ combinations of $\{L_n\}$, where the restriction is associated with (related to/based on) R, where R is a number of precoders per subband.

In one example, the UE is expected to be configured with $N_L>1$ combinations of $\{L_n\}$, when R=1.

In one example, the UE is not expected to be configured with $N_L>1$ combinations of $\{L_n\}$, when R=2.

In one example, the UE is expected to be configured with $N_L>1$ combinations of $\{L_n\}$, when R≤x or R<x. Here x can be fixed or configured or can be subject to UE capability.

In one example, the UE is not expected to be configured with $N_L>1$ combinations of $\{L_n\}$, when R>x R≥x. Here x can be fixed or configured or can be subject to UE capability.

In one example (F5), there is restriction on configuring $N_L>1$ combinations of $\{L_n\}$, where the restriction is associated with (related to/based on) $N_{TRP}$, where $N_{TRP}$ is a number of TRPs, i.e., a number of CSI-RS resources.

In one example, the UE is expected to be configured with $N_L>1$ combinations of $\{L_n\}$, when $N_{TRP}$≤x. For example, x can be only one of x=1, x=2, x=3, or x=4.

In one example, the UE is not expected to be configured with $N_L>1$ combinations of $\{L_n\}$, when $N_{TRP}$≤x. For example, x can be only one of x=1, x=2, x=3, or x=4.

In one example, the UE is expected to be configured with $N_L>1$ combinations of $\{L_n\}$, when $N_{TRP}$≥x. For example, x can be only one of x=1, x=2, x=3, or x=4.

In one example, the UE is not expected to be configured with $N_L>1$ combinations of $\{L_n\}$, when $N_{TRP}$≥x. For example, x can be only one of x=1, x=2, x=3, or x=4.

In one example, the UE is expected to be configured with $N_L>1$ combinations of $\{L_n\}$, when $N_{TRP}$=x. For example, x can be only one of x=1, x=2, x=3, or x=4.

In one example, the UE is not expected to be configured with $N_L>1$ combinations of $\{L_n\}$, when $N_{TRP}$=x. For example, x can be only one of x=1, x=2, x=3, or x=4.

In one example, the UE is expected to be configured with $N_L>1$ combinations of $\{L_n\}$, when $N_{TRP}$<x. For example, x can be only one of x=1, x=2, x=3, or x=4.

In one example, the UE is not expected to be configured with $N_L>1$ combinations of $\{L_n\}$, when $N_{TRP}$<x. For example, x can be only one of x=1, x=2, x=3, or x=4.

In one example, the UE is expected to be configured with $N_L>1$ combinations of $\{L_n\}$, when $N_{TRP}$>x. For example, x can be only one of x=1, x=2, x=3, or x=4.

In one example, the UE is not expected to be configured with $N_L>1$ combinations of $\{L_n\}$, when $N_{TRP}$>x. For example, x can be only one of x=1, x=2, x=3, or x=4.

In one example, the UE is expected to be configured with $N_L>1$ combinations of $\{L_n\}$, when x≤$N_{TRP}$≤y. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when x≤$N_{TRP}$≤y. For example, x can be only one of x=1, x=2, x=3, or x=4. For example, y can be only one of y=1, y=2, y=3, or y=4.

In one example, the UE is expected to be configured with $N_L>1$ combinations of $\{L_n\}$, when x<$N_{TRP}$≤y. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when x<$N_{TRP}$≤y. For example, x can be only one of x=1, x=2, x=3, or x=4. For example, y can be only one of y=1, y=2, y=3, or y=4.

In one example, the UE is expected to be configured with $N_L>1$ combinations of $\{L_n\}$, when x≤$N_{TRP}$<y. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when x≤$N_{TRP}$<y. For example, x can be only one of x=1, x=2, x=3, or x=4. For example, y can be only one of y=1, y=2, y=3, or y=4.

In one example, the UE is expected to be configured with $N_L>1$ combinations of $\{L_n\}$, when x<$N_{TRP}$<y. For example, x can be only one of x=1, x=2, x=3, or x=4. For example, y can be only one of y=1, y=2, y=3, or y=4.

In one example, the UE is not expected to be configured with $N_L>1$ combinations of $\{L_n\}$, when x<$N_{TRP}$<y. For example, x can be only one of x=1, x=2, x=3, or x=4. For example, y can be only one of y=1, y=2, y=3, or y=4.

In one example (F6), there is restriction on configuring $N_L>1$ combinations of $\{L_n\}$, where the restriction is associated with (related to/based on) $(p_v, \beta)$.

In one example, the UE is expected to be configured with $N_L>1$ combinations of $\{L_n\}$, when $p\in Q_0$ is configured, where $Q_0$ is an index or a set of multiple indices, each index indicates, or corresponds to a combination of $(p_v, \beta)$ from a table of $(p_v, \beta)$.

In one example, the UE is not expected to be configured with $N_L>1$ combinations of $\{L_n\}$, when $p\in Q_0$ is configured, where $Q_0$ is an index or a set of multiple indices, each index indicates, or corresponds to a combination of $(p_v, \beta)$ from a table of $(p_v, \beta)$.

In one example (any combination of F1-F6, there are multiple restrictions on configuring $N_L>1$ combinations of $\{L_n\}$, where the multiple restrictions include at least one of the restrictions F1-F6, described above. The multiple restrictions are associated with (related to/based on) $(p_v, \beta)$, $N_{TRP}$, $P_{CSI-RS}$, v, R, and/or $\{L_n\}$.

In one example, there are 2 restrictions $(r_1, r_2)$ on configuring $N_L>1$ combinations of $\{L_n\}$, the restrictions are associated with parameters or parameter combinations, where $r_i$ is one of $(p_v, \beta)$, $N_{TRP}$, $P_{CSI-RS}$, v, R, and $\{L_n\}$.

In one example, $(r_1, r_2)=(\{L_n\}, R)$.

In one example, $(r_1, r_2)=(\{L_n\}, P_{CSI-RS})$.

In one example, $(r_1, r_2)=(P_{CSI-RS}, R)$.

In one example, $(r_1, r_2)=(\{L_n\}, (p_v, \beta))$.

In one example, $(r_1, r_2)=(R, (p_v, \beta))$.

In one example, $(r_1, r_2)=(P_{CSI-RS}, (p_v, \beta))$.

In one example, there are 3 restrictions $(r_1, r_2, r_3)$ on configuring $N_L>1$ combinations of $\{L_n\}$, the restrictions are associated with parameters or parameter combinations, where $r_i$ is one of $(p_v, \beta)$, $N_{TRP}$, $P_{CSI-RS}$, v, R, and $\{L_n\}$.

In one example, $(r_1, r_2, r_3)=(\{L_n\}, R, P_{CSI-RS})$.

In one example, $(r_1, r_2, r_3)=(\{L_n\}, R, (p_v, \beta))$.

In one example, $(r_1, r_2, r_3)=(\{L_n\}, (p_v, \beta), P_{CSI-RS})$.

In one example, $(r_1, r_2, r_3)=((p_V, \beta), R, P_{CSI-RS})$

In one example, there are 4 restrictions $(r_1, \ldots, r_4)$ on configuring $N_L>1$ combinations of $\{L_n\}$, the restrictions are associated with parameters or parameter combinations, where $r_i$ is one of $(p_v, \beta)$, $N_{TRP}$, $P_{CSI-RS}$, v, R, and $\{L_n\}$.

In one example, $(r_1, \ldots, r_4)=(\{L_n\}, R, P_{CSI-RS}, (p_v, \beta))$.

In one example, there are q restrictions $(r_1, \ldots, r_q)$ on configuring $N_L>1$ combinations of $\{L_n\}$, the restrictions are associated with parameters or parameter combinations, where $r_i$ is one of $(p_v, \beta)$, $N_{TRP}$, $P_{CSI-RS}$, v, R, and $\{L_n\}$, and $q\in\{2, \ldots, 6\}$.

In one example, in addition to the multiple restrictions, as described above, $N_L>1$ combinations of $\{L_n\}$ can only be configured when the UE reports via UE a separate UE capability that it can support $N_L>1$ combinations of $\{L_n\}$.
More Details on D1-L and/or H1-L For illustration purpose, assume that a supported number of $(p_v, \beta)$ combinations is S and a supported number of $\{L_n\}$ combinations is Q, e.g., S=6, Q=16.

In one example, one linkage matrix with size of S×Q (or Q×S) is used to indicate/refer linking pairs between $(p_v, \beta)$ and $\{L_n\}$ combinations. For example, each entry (s, q) of the linkage matrix has either 0 or 1, where 0 refers to "not supported" for the linkage between s-th $(p_v, \beta)$ combination and q-th $\{L_n\}$ combination, or 1 refers to "supported" for the linkage between s-th $(p_v, \beta)$ combination and q-th $\{L_n\}$ combination.

In one example, the linkage matrix looks as follows.

Linkage matrix = [          ].

In one example, the UE is not expected to configure the combination pair of $(p_v, \beta)$ and $\{L_n\}$ corresponding to any of the "not supported" entries of the linkage matrix.

In one example, the UE is expected to configure the combination pair of $(p_v, \beta)$ and $\{L_n\}$ corresponding to one (any) of the "supported" entries of the linkage matrix.

In one example, the linkage matrix is pre-determined/fixed.

In one example, the linkage matrix is configured via higher-layer signaling (e.g., RRC).

In one example, $N_{TRP}$ linkage matrices each with size of S×$Q_r$ ($Q_r$×S) are used to indicate/refer linking pairs between $(p_v, \beta)$ and $\{L_n\}$ combinations, where each linkage matrix r corresponds to the linkage matrix for $N_{TRP}$=r, and r=1, . . . , 4. For example, each entry (s, q) of each linkage matrix r has either 0 or 1, where 0 refers to "not supported" for the linkage between s-th $(p_v, \beta)$ combination and q-th $\{L_n\}$ combination for $N_{TRP}$=r, or 1 refers to "supported" for the linkage between s-th $(p_v, \beta)$ combination and q-th $\{L_n\}$ combination for $N_{TRP}$=r.

In one example, $Q_r$ is the number of supported $\{L_n\}$ combinations for $N_{TRP}$=r.

In one example, the UE is not expected to configure the combination pair of $(p_v, \beta)$ and $\{L_n\}$ corresponding to any of the "not supported" entries of the linkage matrix.

In one example, the UE is expected to configure the combination pair of $(p_v, \beta)$ and $\{L_n\}$ corresponding to one (any) of the "supported" entries of the linkage matrix.

In one example, the linkage matrix is pre-determined/fixed.

In one example, the linkage matrix is configured via higher-layer signaling (e.g., RRC).

The term linkage matrix is being used for the sake of convenience, but it can be under a different name, e.g., linkage pair, linkage combination, (linkage/supported) pair/combination between $\{L_n\}$ and (pv, beta) etc.

In one example, a supported number of linkages/pairs between $\{L_n\}$ and $(p_v, \beta)$ for each $N_{TRP}$ is at most J, e.g., J=8 (as shown in the following table 11). In another example, J=12 or J=16, or J=9.

TABLE 11

| $N_{TRP}$ | SD combo | FD combo $\{p_v\}$, $\beta$ | | | | | |
|---|---|---|---|---|---|---|---|
| | | $\{\frac{1}{8}, \frac{1}{8}, \frac{1}{16}, \frac{1}{16}\}$, $\frac{1}{4}$ | $\{\frac{1}{8}, \frac{1}{8}, \frac{1}{16}, \frac{1}{16}\}$, $\frac{1}{2}$ | $\{\frac{1}{4}, \frac{1}{4}, \frac{1}{8}, \frac{1}{8}\}$, $\frac{1}{4}$ | $\{\frac{1}{4}, \frac{1}{4}, \frac{1}{8}, \frac{1}{8}\}$, $\frac{1}{2}$ | $\{\frac{1}{4}, \frac{1}{4}, \frac{1}{4}, \frac{1}{4}\}$, $\frac{3}{4}$ | $\{\frac{1}{2}, \frac{1}{2}, \frac{1}{2}, \frac{1}{2}\}$, $\frac{1}{2}$ |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | {2, 2} | Linked | Linked | | | | |
| | {2, 4} | | Linked | Linked | | | |
| | {4, 2} | | | Linked | Linked | Linked | |
| | {4, 4} | | | | | | Linked |
| | $N_L$ | 1 | 1, 2 | 1, 2 | 1 | 1 | 1 |
| 3 | {2, 2, 2} | Linked | Linked | | | | |
| | {2, 2, 4}, | | Linked | Linked | | | |
| | {2, 4, 2} | | | Linked | Linked | | |
| | {4, 2, 2} | | | | Linked | Linked | |
| | {4, 4, 4} | | | | | | Linked |
| | $N_L$ | 1 | 1, 2 | 1, 2 | 1, 2 | 1 | 1 |

TABLE 11-continued

| | | FD combo {p_v}, β | | | | | |
|---|---|---|---|---|---|---|---|
| $N_{TRP}$ | SD combo | {1/8, 1/8, 1/16, 1/16}, 1/4 | {1/8, 1/8, 1/16, 1/16}, 1/2 | {1/4, 1/4, 1/8, 1/8}, 1/4 | {1/4, 1/4, 1/8, 1/8}, 1/2 | {1/4, 1/4, 1/4, 1/4}, 3/4 | {1/2, 1/2, 1/2, 1/2}, 1/2 |
| 4 | {2, 2, 2, 2} | Linked | Linked | | | | N/A |
| | {2, 2, 2, 4} | | Linked | Linked | | | N/A |
| | {2, 2, 4, 4} | | | Linked | Linked | | N/A |
| | {4, 4, 4, 4} | | | | Linked | Linked | N/A |
| | $N_L$ | 1 | 1, 2 | 1, 2 | 1, 2 | 1 | N/A |

For example, in Table 11 above, the ones with 'linked' are supported linkages/pairs between {L_n} and (p_v, β) for each N_{TRP}, wherein the number of supported linkages/pairs for each N_{TRP} is 8.

In one example, possible values of N_L are determined/restricted by the linkages for a given (p_v, β) and for each N_{TRP}. For example, using the table above as an example, for the case of (p_v, β) corresponding to ({1/8, 1/8, 1/16, 1/16}, 1/2) for N_{TRP}=2, the possible {L_n} combinations are {2, 2} and {2, 4}. In this case, the possible values of N_L are 1 and/or 2. That is, the number of rows with 'linked' for each column determines the possible {L_n} combinations and the possible values of N_L. We denote possible values of N_L in the last row for each N_{TRP} in the table above.

In one example, N_L=4 can be supported only for N_{TRP}=3. For example, using the following table as an example, for the case of (p_v, β) corresponding to ({1/8, 1/8, 1/16, 1/16}, 1/2) for N_{TRP}=3, the possible {L_n} combinations are {2, 2, 2}, {2, 2, 4}, {2, 4, 2}, and {4, 2, 2}. In this case, the possible values of N_L are 1, 2 and/or 4.

In one example, for all N_{TRP}=1, 2, 3, 4, the possible values of N_L are 1 and 2 only. In one example, the table above is an example of this case.

In one example, the possible values of N_L are 1, 2, and 4, but N_L=4 is only for N_{TRP}=2. In one example, N_L=4 {L_n} combinations for N_{TRP}=2 include the two permutations {2, 4} and {4, 2}. In one example, the following Table 12 is one example of this case.

TABLE 12

| | | FD combo {p_v}, β | | | | | |
|---|---|---|---|---|---|---|---|
| $N_{TRP}$ | SD combo | {1/8, 1/8, 1/16, 1/16}, 1/4 | {1/8, 1/8, 1/16, 1/16}, 1/2 | {1/4, 1/4, 1/8, 1/8}, 1/4 | {1/4, 1/4, 1/8, 1/8}, 1/2 | {1/4, 1/4, 1/4, 1/4}, 3/4 | {1/2, 1/2, 1/2, 1/2}, 1/2 |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | {2, 2} | Linked | Linked | | | | |
| | {2, 4} | | Linked | Linked | | | |
| | {4, 2} | | Linked | Linked | Linked | Linked | |
| | {4, 4} | | Linked | | | | Linked |
| | $N_L$ | 1 | 1, 2, 4 | 1, 2 | 1 | 1 | 1 |
| 3 | {2, 2, 2} | Linked | Linked | | | | |
| | {2, 2, 4}, | | Linked | Linked | | | |
| | {2, 4, 2} | | | Linked | Linked | | |
| | {4, 2, 2} | | | | Linked | Linked | |
| | {4, 4, 4} | | | | | | Linked |
| | $N_L$ | 1 | 1, 2 | 1, 2 | 1, 2 | 1 | 1 |
| 4 | {2, 2, 2, 2} | Linked | Linked | | | | N/A |
| | {2, 2, 2, 4} | | Linked | Linked | | | N/A |
| | {2, 2, 4, 4} | | | Linked | Linked | | N/A |
| | {4, 4, 4, 4} | | | | Linked | Linked | N/A |
| | $N_L$ | 1 | 1, 2 | 1, 2 | 1, 2 | 1 | N/A |

In one example, the possible values of $N_L$ are 1, 2, and 4, but $N_L=4$ is only for $N_{TRP}=3$. In one example, $N_L=4$ $\{L_n\}$ combinations for $N_{TRP}=3$ include the three permutations $\{2, 2, 4\}$ and $\{2, 4, 2\}$ and $\{4, 2, 2\}$. In one example, the following Table 13 is one example of this case.

TABLE 13

| $N_{TRP}$ | SD combo | FD combo $\{p_v\}$, $\beta$ | | | | | |
|---|---|---|---|---|---|---|---|
| | | $\{\frac{1}{8}, \frac{1}{8}, \frac{1}{16}, \frac{1}{16}\}$, $\frac{1}{4}$ | $\{\frac{1}{8}, \frac{1}{8}, \frac{1}{16}, \frac{1}{16}\}$, $\frac{1}{2}$ | $[\frac{1}{4}, \frac{1}{4}, \frac{1}{8}, \frac{1}{8}]$, $\frac{1}{4}$ | $[\frac{1}{4}, \frac{1}{4}, \frac{1}{8}, \frac{1}{8}]$, $\frac{1}{2}$ | $\{\frac{1}{4}, \frac{1}{4}, \frac{1}{4}, \frac{1}{4}\}$, $\frac{3}{4}$ | $\{\frac{1}{2}, \frac{1}{2}, \frac{1}{2}, \frac{1}{2}\}$, $\frac{1}{2}$ |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | $\{2, 2\}$ | Linked | Linked | | | | |
| | $\{2, 4\}$ | | Linked | Linked | | | |
| | $\{4, 2\}$ | | | Linked | Linked | Linked | |
| | $\{4, 4\}$ | | | | | | Linked |
| | $N_L$ | 1 | 1, 2 | 1, 2 | 1 | 1 | 1 |
| 3 | $\{2, 2, 2\}$ | Linked | Linked | | | | |
| | $\{2, 2, 4\}$, | | Linked | Linked | | | |
| | $\{2, 4, 2\}$ | | | Linked | Linked | | |
| | $\{4, 2, 2\}$ | | | Linked | Linked | Linked | |
| | $\{4, 4, 4\}$ | | | | | | Linked |
| | $N_L$ | 1 | 1, 2 | 1, 2, 4 | 1, 2 | 1 | 1 |
| 4 | $\{2, 2, 2, 2\}$ | Linked | Linked | | | | N/A |
| | $\{2, 2, 2, 4\}$ | | Linked | Linked | | | N/A |
| | $\{2, 2, 4, 4\}$ | | | Linked | Linked | | N/A |
| | $\{4, 4, 4, 4\}$ | | | | Linked | Linked | N/A |
| | $N_L$ | 1 | 1, 2 | 1, 2 | 1, 2 | 1 | N/A |

In one example, the possible values of $N_L$ are 1, 2, and 4, but $N_L=4$ is only for $N_{TRP}=4$. In one example, the following Table 14 is one example of this case.

TABLE 14

| $N_{TRP}$ | SD combo | FD combo $\{p_v\}$, $\beta$ | | | | | |
|---|---|---|---|---|---|---|---|
| | | $\{\frac{1}{8}, \frac{1}{8}, \frac{1}{16}, \frac{1}{16}\}$, $\frac{1}{4}$ | $\{\frac{1}{8}, \frac{1}{8}, \frac{1}{16}, \frac{1}{16}\}$, $\frac{1}{2}$ | $\{\frac{1}{4}, \frac{1}{4}, \frac{1}{8}, \frac{1}{8}\}$, $\frac{1}{4}$ | $\{\frac{1}{4}, \frac{1}{4}, \frac{1}{8}, \frac{1}{8}\}$, $\frac{1}{2}$ | $\{\frac{1}{4}, \frac{1}{4}, \frac{1}{4}, \frac{1}{4}\}$, $\frac{3}{4}$ | $\{\frac{1}{2}, \frac{1}{2}, \frac{1}{2}, \frac{1}{2}\}$, $\frac{1}{2}$ |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | $\{2, 2\}$ | Linked | Linked | | | | |
| | $\{2, 4\}$ | | Linked | Linked | | | |
| | $\{4, 2\}$ | | | Linked | Linked | Linked | |
| | $\{4, 4\}$ | | | | | | Linked |
| | $N_L$ | 1 | 1, 2 | 1, 2 | 1 | 1 | 1 |
| 3 | $\{2, 2, 2\}$ | Linked | Linked | | | | |
| | $\{2, 2, 4\}$, | | Linked | Linked | | | |
| | $\{2, 4, 2\}$ | | | Linked | Linked | | |
| | $\{4, 2, 2\}$ | | | | Linked | Linked | |
| | $\{4, 4, 4\}$ | | | | | | Linked |
| | $N_L$ | 1 | 1, 2 | 1, 2 | 1, 2 | 1 | 1 |
| 4 | $\{2, 2, 2, 2\}$ | Linked | Linked | Linked | | | N/A |
| | $\{2, 2, 2, 4\}$ | | Linked | Linked | | | N/A |
| | $\{2, 2, 4, 4\}$ | | | Linked | Linked | | N/A |
| | $\{4, 4, 4, 4\}$ | | | Linked | Linked | Linked | N/A |
| | $N_L$ | 1 | 1, 2 | 1, 2, 4 | 1, 2 | 1 | N/A |

In one example, the possible values of $N_L$ are 1, 2, and 4, but $N_L=4$ is only for $N_{TRP}=2$, 3. In one example, $N_L=4$ $\{L_n\}$ combinations for $N_{TRP}=2$ include the two permutations $\{2, 4\}$ and $\{4, 2\}$. In one example, $N_L=4$ $\{L_n\}$ combinations for $N_{TRP}=3$ include the three permutations $\{2, 2, 4\}$ and $\{2, 4, 2\}$ and $\{4, 2, 2\}$. In one example, the following Table 15 is one example of this case.

TABLE 15

| $N_{TRP}$ | SD combo | FD combo {$p_v$}, β | | | | | |
|---|---|---|---|---|---|---|---|
| | | {1/8, 1/8, 1/16, 1/16}, 1/4 | {1/8, 1/8, 1/16, 1/16}, 1/2 | {1/4, 1/4, 1/8, 1/8}, 1/4 | {1/4, 1/4, 1/8, 1/8}, 1/2 | {1/4, 1/4, 1/4, 1/4}, 3/4 | {1/2, 1/2, 1/2, 1/2}, 1/2 |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | {2, 2} | Linked | Linked | | | | |
| | {2, 4} | | Linked | Linked | | | |
| | {4, 2} | | Linked | Linked | Linked | Linked | |
| | {4, 4} | | Linked | | | | Linked |
| | $N_L$ | 1 | 1, 2, 4 | 1, 2 | 1 | 1 | 1 |
| 3 | {2, 2, 2} | Linked | Linked | | | | |
| | {2, 2, 4}, | | Linked | Linked | | | |
| | {2, 4, 2} | | | Linked | Linked | | |
| | {4, 2, 2} | | | Linked | Linked | Linked | |
| | {4, 4, 4} | | Linked | | | | Linked |
| | $N_L$ | 1 | 1, 2 | 1, 2, 4 | 1, 2 | 1 | 1 |
| 4 | {2, 2, 2, 2} | Linked | Linked | | | | N/A |
| | {2, 2, 2, 4} | | Linked | Linked | | | N/A |
| | {2, 2, 4, 4} | | | Linked | Linked | | N/A |
| | {4, 4, 4, 4} | | | | Linked | Linked | N/A |
| | $N_L$ | 1 | 1, 2 | 1, 2 | 1, 2 | 1 | N/A |

In one example, the possible values of $N_L$ are 1, 2, and 4, but $N_L=4$ is only for $N_{TRP}=2, 3, 4$. In one example, $N_L=4$ {$L_n$} combinations for $N_{TRP}=2$ include the two permutations {2, 4} and {4, 2}. In one example, $N_L=4$ {$L_n$} combinations for $N_{TRP}=3$ include the three permutations {2, 2, 4} and {2, 4, 2} and {4, 2, 2}. In one example, the following Table 16 is one example of this case.

for $N_{TRP}=2$ and for the pair of {$L_n$}={2, 4} and {$L_n$}={4, 2}, there are two ($p_v$, β) (second and third columns) linked to both the {$L_n$}={2, 4} and {$L_n$}={4, 2}.

In one example, for $N_L=4$ for a given quadruple of {$L_n$} combinations, the supported number of the linked ($p_v$, β) combinations is at most 1. For example, in the above table, for $N_{TRP}=3$ and for the quadruple of {$L_n$}={2, 2, 4},

TABLE 16

| $N_{TRP}$ | SD combo | FD combo {$p_v$}, β | | | | | |
|---|---|---|---|---|---|---|---|
| | | {1/8, 1/8, 1/16, 1/16}, 1/4 | {1/8, 1/8, 1/16, 1/16}, 1/2 | {1/4, 1/4, 1/8, 1/8}, 1/2 | {1/4, 1/4, 1/8, 1/8}, 1/2 | {1/4, 1/4, 1/4, 1/4}, 3/4 | {1/2, 1/2, 1/2, 1/2}, 1/2 |
| 1 | 2 | Linked | Linked | | | | |
| | 4 | | Linked | Linked | Linked | Linked | |
| | 6 w/ restriction | | | | | Linked | Linked |
| | $N_L$ | 1 | 1, 2 | 1 | 1 | 1, 2 | 1 |
| 2 | {2, 2} | Linked | Linked | | | | |
| | {2, 4} | | Linked | Linked | | | |
| | {4, 2} | | Linked | Linked | Linked | Linked | |
| | {4, 4} | | Linked | | | | Linked |
| | $N_L$ | 1 | 1, 2, 4 | 1, 2 | 1 | 1 | 1 |
| 3 | {2, 2, 2} | Linked | Linked | | | | |
| | {2, 2, 4}, | | Linked | Linked | | | |
| | {2, 4, 2} | | | Linked | Linked | | |
| | {4, 2, 2} | | | Linked | Linked | Linked | |
| | {4, 4, 4} | | Linked | | | | Linked |
| | $N_L$ | 1 | 1, 2 | 1, 2, 4 | 1, 2 | 1 | 1 |
| 4 | {2, 2, 2, 2} | Linked | Linked | Linked | Linked | | N/A |
| | {2, 2, 2, 4} | | Linked | Linked | Linked | | N/A |
| | {2, 2, 4, 4} | | | Linked | Linked | | N/A |
| | {4, 4, 4, 4} | | | Linked | Linked | Linked | N/A |
| | $N_L$ | 1 | 1, 2 | 1, 2, 4 | 1, 2, 4 | 1 | N/A |

In one example, for $N_L=2$ for a given pair of {$L_n$} combinations, the supported number of the linked ($p_v$, β) combinations is at most 1. For example, in the above Table 16, for $N_{TRP}=1$ and for the pair of L=2 and L=4, there is only one ($p_v$, β) (second column) linked to both the L=2 and L=4.

In one example, for $N_L=2$ for a given pair of {$L_n$} combinations, the supported number of the linked ($p_v$, β) combinations is at most 2. For example, in the above table, {$L_n$}={2, 4, 2}, {$L_n$}={4, 2, 2}, {$L_n$}={4, 4, 4}, there is only one ($p_v$, β) (third column) linked to all the {$L_n$}={2, 2, 4}, {$L_n$}={2, 4, 2}, {$L_n$}={4, 2, 2}, {$L_n$}={4, 4, 4}.

In one example, for $N_L=4$ for a given quadruple of {$L_n$} combinations, the supported number of the linked ($p_v$, β) combinations is at most 2. For example, in the above table, for $N_{TRP}=3$ and for the quadruple of {$L_n$}={2, 2, 2, 2}, {$L_n$}={2, 2, 4, 2}, {$L_n$}={2, 2, 4, 4}, {$L_n$}={4, 4, 4, 4}, there are two ($p_v$, $\beta$) (third and fourth columns) linked to all the $\{L_n\}=\{2, 2, 2, 2\}$, $\{L_n\}=\{2, 2, 4, 2\}$, $\{L_n\}=\{2, 2, 4, 4\}$, $\{L_n\}=\{4, 4, 4, 4\}$.

In one example, the supported linkages/pairs between $\{L_n\}$ and ($p_v$, $\beta$) include all of the 'linked' ones described in one of the linkage tables that can be constructed or are described in this disclosure.

In one example, the supported linkages/pairs between $\{L_n\}$ and ($p_v$, $\beta$) include a subset of the 'linked' ones described in one of the linkage tables that can be constructed or are described in this disclosure.

In one example, the supported linkages/pairs between $\{L_n\}$ and ($p_v$, $\beta$) include at least one of the 'linked' ones described in one of the linkage tables that can be constructed or are described in this disclosure.

In one example, for a given ($p_v$, $\beta$) and for each $N_{TRP}$, the linkages for $\{L_n\}$ combinations that are in permutation relationship (e.g., $\{2, 2, 4\}$, $\{2, 4, 2\}$, $\{4, 2, 2\}$ for $N_{TRP}=3$) are either 'all linked or 'all not linked'.

In one example, for $P_{CSI-RS}=4$, the UE is not expected to configure with $\{L_n\}$ combination including 4 or 6.

In one example, for $P_{CSI-RS}=4$, the UE is expected to configure with $\{L_n\}$ combination including 2 only.

In one example, for $P_{CSI-RS}=8$, the UE is not expected to configure with L=6 for $N_{TRP}=1$.

In one example, for $P_{CSI-RS}=8$, the UE is not expected to configure with $\{L_n\}$ combination including 2 or 4.

In one example, for $P_{CSI-RS}=4$, the supported linkages/pairs are all possible combinations of ($p_v$, $\beta$), i.e., 6 ($p_v$, $\beta$) combinations, for the combinations of $\{L_n\}=\{2\}$, $\{L_n\}=\{2, 2\}$, $\{L_n\}=\{2, 2, 2\}$, and $\{L_n\}=\{2, 2, 2, 2\}$. In other words, in this case, the supported linkages/pairs are separated from a supported linkage table.

In one example, for $P_{CSI-RS}=4$, the supported linkages follow a same linkage table shown in one of the linkage tables, that can be constructed or are described in this disclosure, for the combinations of $\{L_n\}=\{2\}$, $\{L_n\}=\{2, 2\}$, $\{L_n\}=\{2, 2, 2\}$, and $\{L_n\}=\{2, 2, 2, 2\}$.

In one example, for each $N_{TRP}$, the supported linkages/pairs between $\{L_n\}$ and ($p_v$, $\beta$) include at least one of the highlighted ones described in the following Table 17.

For example, for $N_{TRP}=1$, the supported linkages/pairs between $\{L_n\}$ and ($p_v$, $\beta$) include at least one of the highlighted ones labelled from W1 to W8. For example, $J_1$ linkages selected from W1-W8 are supported linkages, where $1 \leq J_1 \leq J$, and $J_2$ linkages selected from the ones other than W1-W8 (for $N_{TRP}=1$) are supported linkages, where $0 \leq J_2 \leq J-J_1$.

For example, for $N_{TRP}=2$, the supported linkages/pairs between $\{L_n\}$ and ($p_v$, $\beta$) include at least one of the highlighted ones labelled from W9 to W15. For example, $J_1$ linkages selected from W9-W15 are supported linkages, where $1 \leq J_1 \leq J$, and $J_z$ linkages selected from the ones other than W9-W15 (for $N_{TRP}=2$) are supported linkages, where $0 \leq J_2 \leq J-J_1$.

For example, for $N_{TRP}=3$, the supported linkages/pairs between $\{L_n\}$ and ($p_v$, $\beta$) include at least one of the highlighted ones labelled from W16 to W24. For example, $J_1$ linkages selected from W16-W24 are supported linkages, where $1 \leq J_1 \leq J$, and $J_2$ linkages selected from the ones other than W16-W24 (for $N_{TRP}=3$) are supported linkages, where $0 \leq J_2 \leq J-J_1$.

For example, for $N_{TRP}=4$, the supported linkages/pairs between $\{L_n\}$ and ($p_v$, $\beta$) include at least one of the highlighted ones labelled from W25 to W32. For example, $J_1$ linkages selected from W25-W32 are supported linkages, where $1 \leq J_1 \leq J$, and $J_2$ linkages selected from the ones other than W25-W32 (for $N_{TRP}=4$) are supported linkages, where $0 \leq J_2 \leq J-J_1$.

Figure 17:
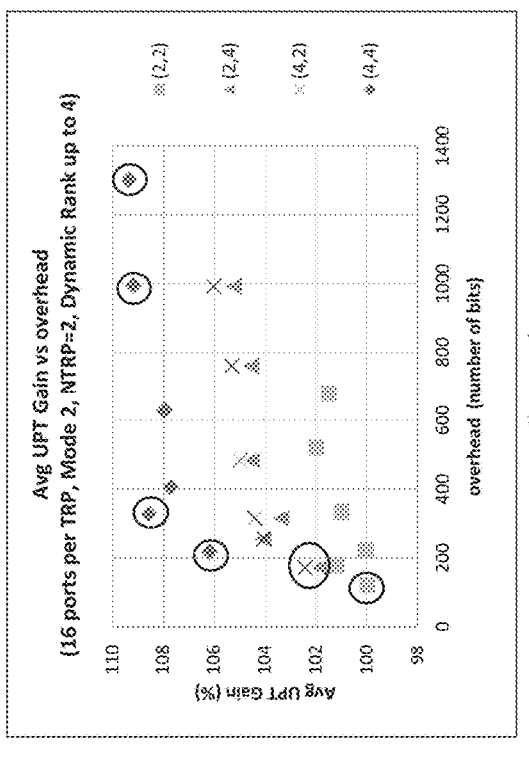
FIG. 17 illustrates example simulation results to find best linkages between $\{L_n\}$ and $(p_v, \beta)$ for each $N_{TRP}$ according to embodiments of the present disclosure.
Figure 17:
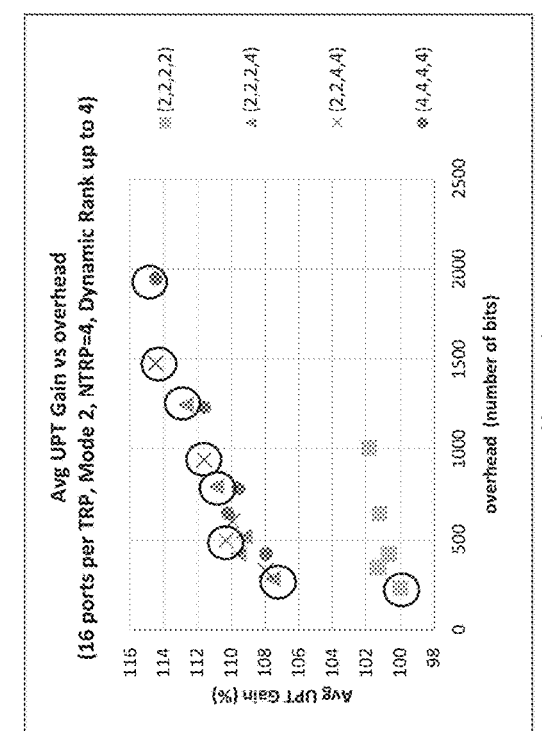
Figure 17:
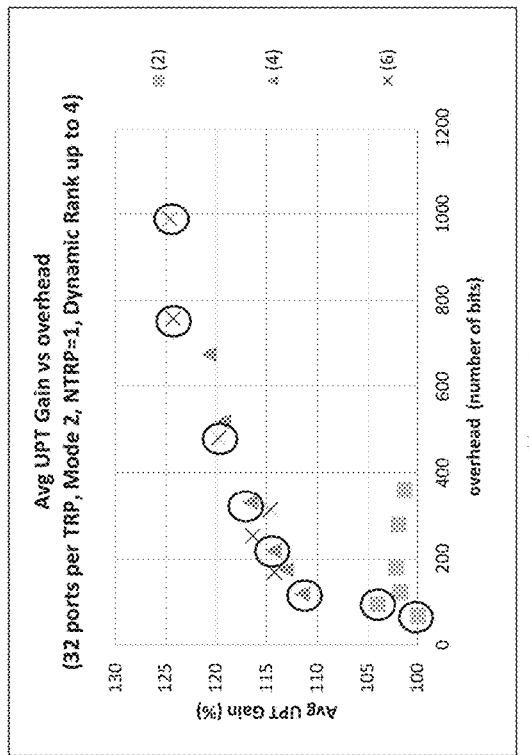
Figure 17:
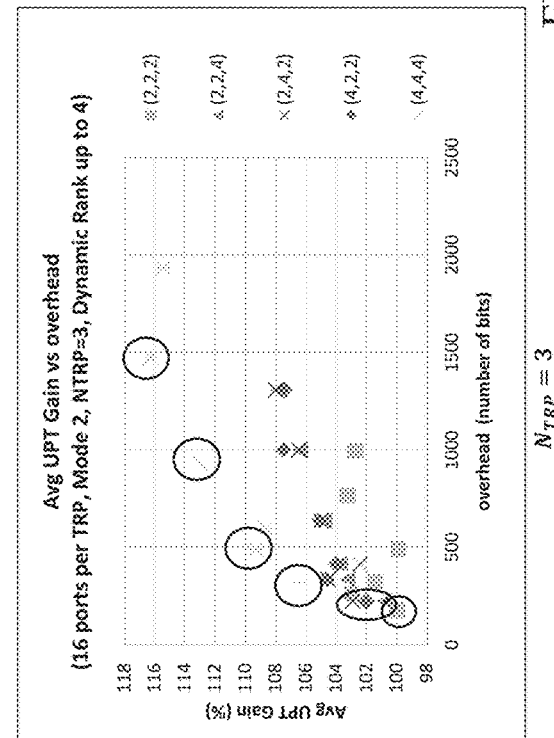

FIG. 17 illustrates example simulation results 1700 to find best linkages between $\{L_n\}$ and ($p_v$, $\beta$) for each $N_{TRP}$ according to embodiments of the present disclosure. The embodiment of the example simulation results 1700 to find best linkages between $\{L_n\}$ and ($p_v$, $\beta$) for each $N_{TRP}$ illustrated in FIG. 17 is for illustration only. FIG. 17 does not limit the scope of this disclosure to any particular implementation of the example simulation results 1700 to find best linkages between $\{L_n\}$ and ($p_v$, $\beta$) for each $N_{TRP}$.

In one example, for each $N_{TRP}$, the supported linkages/pairs between $\{L_n\}$ and ($p_v$, $\beta$) include at least one of the highlighted ones described in the following Table 18.

TABLE 17

| | | FD combo $\{p_v\}$, $\beta$ | | | | | |
|---|---|---|---|---|---|---|---|
| $N_{TRP}$ | SD combo | $\{\frac{1}{8}, \frac{1}{8}, \frac{1}{16}, \frac{1}{16}\}$, $\frac{1}{4}$ | $\{\frac{1}{8}, \frac{1}{8}, \frac{1}{16}, \frac{1}{16}\}$, $\frac{1}{2}$ | $\{\frac{1}{4}, \frac{1}{4}, \frac{1}{8}, \frac{1}{8}\}$, $\frac{1}{4}$ | $\{\frac{1}{4}, \frac{1}{4}, \frac{1}{8}, \frac{1}{8}\}$, $\frac{1}{2}$ | $\{\frac{1}{4}, \frac{1}{4}, \frac{1}{4}, \frac{1}{4}\}$, $\frac{3}{4}$ | $\{\frac{1}{2}, \frac{1}{2}, \frac{1}{2}, \frac{1}{2}\}$, $\frac{1}{2}$ |
|---|---|---|---|---|---|---|---|
| 1 | 2 | W1 | W2 | | | | |
| | 4 | W3 | | W4 | W5 | | |
| | 6 w/ restriction | | | | W6 | W7 | W8 |
| 2 | $\{2, 2\}$ | W9 | | | | | |
| | $\{2, 4\}$ | W10 | | | | | |
| | $\{4, 2\}$ | W11 | | | | | |
| | $\{4, 4\}$ | W12 | W13 | | | W14 | W15 |
| 3 | $\{2, 2, 2\}$ | W16 | | | | | |
| | $\{2, 2, 4\}$, | W17 | | | | | |
| | $\{2, 4, 2\}$ | W18 | | | | | |
| | $\{4, 2, 2\}$ | W19 | | | | | |
| | $\{4, 4, 4\}$ | W20 | W21 | | W22 | W23 | W24 |
| 4 | $\{2, 2, 2, 2\}$ | W25 | | | | | N/A |
| | $\{2, 2, 2, 4\}$ | W26 | | | W27 | W28 | N/A |
| | $\{2, 2, 4, 4\}$ | | W29 | | W30 | W31 | N/A |
| | $\{4, 4, 4, 4\}$ | | | | W32 | N/A | |

TABLE 18

| $N_{TRP}$ | SD combo | FD combo $\{p_v\}$, $\beta$ | | | | | |
|---|---|---|---|---|---|---|---|
| | | $\{1/8, 1/8, 1/16, 1/16\}$, $1/4$ | $\{1/8, 1/8, 1/16, 1/16\}$, $1/2$ | $\{1/4, 1/4, 1/8, 1/8\}$, $1/4$ | $\{1/4, 1/4, 1/8, 1/8\}$, $1/2$ | $\{1/4, 1/4, 1/4, 1/4\}$, $3/4$ | $\{1/2, 1/2, 1/2, 1/2\}$, $1/2$ |
| 1 | 2 | | | Legacy1 | Legacy2 | | |
| | 4 | | | Legacy3 | Legacy4 | Legacy5 | |
| | 6 w/ restriction | | | | Legacy6 | Legacy7 | |
| 2 | $\{2, 2\}$ | R1 | T1 | | T2 | | |
| | $\{2, 4\}$ | R2 | T3 | | | T4 | |
| | $\{4, 2\}$ | R3 | T5 | | | T6 | |
| | $\{4, 4\}$ | T7 | S1 | | S2 | T8 | S3 |
| 3 | $\{2, 2, 2\}$ | R4 | T9 | | T10 | T11 | |
| | $\{2, 2, 4\}$, | R5 | R8 | | T12 | T15 | |
| | $\{2, 4, 2\}$ | R6 | R9 | | T13 | T16 | |
| | $\{4, 2, 2\}$ | R7 | R10 | | T14 | T17 | |
| | $\{4, 4, 4\}$ | T18 | S4 | | S5 | R11 | R12 |
| 4 | $\{2, 2, 2, 2\}$ | S6 | T19 | | T20 | | N/A |
| | $\{2, 2, 2, 4\}$ | R13 | T21 | | T22 | T23 | N/A |
| | $\{2, 2, 4, 4\}$ | | T24 | T25 | R15 | R17 | N/A |
| | $\{4, 4, 4, 4\}$ | | R14 | | R16 | R18 | N/A |

For example, for $N_{TRP}=1$, the supported linkages/pairs between $\{L_n\}$ and $(p_v, \beta)$ include at least one of the highlighted ones labelled from Legacy1 to Legacy7. For example, for $N_{TRP}=1$, the supported linkages/pairs between $\{L_n\}$ and $(p_v, \beta)$ include all of the highlighted ones labelled from Legacy 1 to Legacy7.

For example, for $N_{TRP}=2$, the supported linkages/pairs between $\{L_n\}$ and $(p_v, \beta)$ include at least one of the highlighted ones labelled R1 to R3 and T1 to T8 and S1 to S3.

In one example, for $N_{TRP}=2$, the supported linkages/pairs between $\{L_n\}$ and $(p_v, \beta)$ include all of the highlighted ones labelled R1 to R3 and T1 to T8 and S1 to S3.

In one example, for $N_{TRP}=2$, the supported linkages/pairs between $\{L_n\}$ and $(p_v, \beta)$ include the highlighted ones labelled R1 to R3 and S1 to S3.

In one example, for $N_{TRP}=2$, the supported linkages/pairs between $\{L_n\}$ and $(p_v, \beta)$ include the highlighted ones labelled R1 to R3 and S1 to S3 and at least one of the highlighted ones labelled T1 to T8.

In one example, for $N_{TRP}=2$, the supported linkages/pairs between $\{L_n\}$ and $(p_v, \beta)$ include the highlighted ones labelled S1 to S3.

In one example, for $N_{TRP}=2$, the supported linkages/pairs between $\{L_n\}$ and $(p_v, \beta)$ include the highlighted ones labelled S1 to S3 and at least one of the highlighted ones labelled R1 to R3.

In one example, for $N_{TRP}=2$, the supported linkages/pairs between $\{L_n\}$ and $(p_v, \beta)$ include the highlighted ones labelled S1 to S3 and at least one of the highlighted ones labelled T1 to T8.

In one example, for $N_{TRP}=2$, the supported linkages/pairs between $\{L_n\}$ and $(p_v, \beta)$ include the highlighted ones labelled S1 to S3 and at least one of the highlighted ones labelled T1 to T8 and at least one of the highlighted ones labelled R1 to R3.

In one example, for $N_{TRP}=2$, the supported linkages/pairs between $\{L_n\}$ and $(p_v, \beta)$ include the highlighted ones labelled S1 to S3 and based on J, they further include $J_1$ linkages from the ones labelled R1 to R3 and T1 to T8, where $0 \leq J_1 \leq J-3$.

In one example, for $N_{TRP}=2$, the supported linkages/pairs between $\{L_n\}$ and $(p_v, \beta)$ include the highlighted ones labelled S1 to S3 and R1 to R3, and based on J, they further include $J_1$ linkages from the ones labelled T1 to T8, where $0 \leq J_1 \leq J-6$.

For example, for $N_{TRP}=3$, the supported linkages/pairs between $\{L_n\}$ and $(p_v, \beta)$ include at least one of the highlighted ones labelled R4 to R12 and T9 to T18 and S4 to S5.

In one example, for $N_{TRP}=3$, the supported linkages/pairs between $\{L_n\}$ and $(p_v, \beta)$ include all of the highlighted ones labelled R4 to R12 and T9 to T18 and S4 to S5.

In one example, for $N_{TRP}=3$, the supported linkages/pairs between $\{L_n\}$ and $(p_v, \beta)$ include the highlighted ones labelled R4 to R12 and S4 to S5.

In one example, for $N_{TRP}=3$, the supported linkages/pairs between $\{L_n\}$ and $(p_v, \beta)$ include the highlighted ones labelled R4 to R12 and S4 to S5 and at least one of the highlighted ones labelled T9 to T18.

In one example, for $N_{TRP}=3$, the supported linkages/pairs between $\{L_n\}$ and $(p_v, \beta)$ include the highlighted ones labelled S4 to S5.

In one example, for $N_{TRP}=3$, the supported linkages/pairs between $\{L_n\}$ and $(p_v, \beta)$ include the highlighted ones labelled S4 to S5 and at least one of the highlighted ones labelled R4 to R12.

In one example, for $N_{TRP}=3$, the supported linkages/pairs between $\{L_n\}$ and $(p_v, \beta)$ include the highlighted ones labelled S4 to S5 and at least one of the highlighted ones labelled T9 to T18.

In one example, for $N_{TRP}=3$, the supported linkages/pairs between $\{L_n\}$ and $(p_v, \beta)$ include the highlighted ones labelled S4 to S5 and at least one of the highlighted ones labelled T9 to T18 and at least one of the highlighted ones labelled R4 to R12.

In one example, for $N_{TRP}=3$, the supported linkages/pairs between $\{L_n\}$ and $(p_v, \beta)$ include the highlighted ones labelled S4 to S5 and based on J, they further include $J_1$ linkages from the ones labelled R4 to R12 and T9 to T18, where $0 \leq J_1 \leq J-2$.

In one example, for $N_{TRP}=3$, the supported linkages/pairs between $\{L_n\}$ and $(p_v, \beta)$ include the highlighted ones labelled S4 to S5 and R4 to R12, and based on J, they further include $J_1$ linkages from the ones labelled T9 to T18, where $0 \leq J_1 \leq J-11$.

For example, for $N_{TRP}=4$, the supported linkages/pairs between $\{L_n\}$ and $(p_v, \beta)$ include at least one of the highlighted ones labelled R13 to R18 and T19 to T25 and S6.

In one example, for $N_{TRP}=4$, the supported linkages/pairs between $\{L_n\}$ and $(p_v, \beta)$ include all of the highlighted ones labelled R13 to R18 and T19 to T25 and S6.

In one example, for $N_{TRP}=4$, the supported linkages/pairs between $\{L_n\}$ and $(p_v, \beta)$ include the highlighted ones labelled R13 to R18 and S6.

In one example, for $N_{TRP}=4$, the supported linkages/pairs between $\{L_n\}$ and $(p_v, \beta)$ include the highlighted ones labelled R13 to R18 and S6 and at least one of the highlighted ones labelled T19 to T25.

In one example, for $N_{TRP}=4$, the supported linkages/pairs between $\{L_n\}$ and $(p_v, \beta)$ include the highlighted one labelled S6.

In one example, for $N_{TRP}=4$, the supported linkages/pairs between $\{L_n\}$ and $(p_v, \beta)$ include the highlighted one labelled S6 and at least one of the highlighted ones labelled R13 to R18.

In one example, for $N_{TRP}=4$, the supported linkages/pairs between $\{L_n\}$ and $(p_v, \beta)$ include the highlighted one labelled S6 and at least one of the highlighted ones labelled T19 to T25.

In one example, for $N_{TRP}=4$, the supported linkages/pairs between $\{L_n\}$ and $(p_v, \beta)$ include the highlighted one labelled S6 and at least one of the highlighted ones labelled T19 to T25 and at least one of the highlighted ones labelled R13 to R18.

In one example, for $N_{TRP}=4$, the supported linkages/pairs between $\{L_n\}$ and $(p_v, \beta)$ include the highlighted one labelled S6 and based on J, they further include $J_1$ linkages from the ones labelled R13 to R18 and T19 to T25, where $0 \leq J_1 \leq J-1$.

In one example, for $N_{TRP}=4$, the supported linkages/pairs between $\{L_n\}$ and $(p_v, \beta)$ include the highlighted one labelled S6 and R13 to R18, and based on J, they further include $J_1$ linkages from the ones labelled T19 to T25, where $0 \leq J_1 \leq J-7$.

In one example, the UE can report UE capability on $L_{tot}$. Then, the NW (needs to follow and) can configure a combination of $\{L_n\}$ under the UE capability, e.g., a combination of $\{L_n\}$ such that $\Sigma_n L_n = L_{tot}$.

For example, $L_{tot} \leq t$ is a basic feature and $L_{tot} > t$ is UE-optional. In one example, $t=8$. In one example, $t=10$. In one example, $t=12$. For $L_{tot} > t$, the UE reports its capability to support it or not and the NW can configure one of the parameter combinations in the table only associated with the $\{L_n\}$ that the UE supports (based on the UE capability and the basic feature).

For example, $L_{tot} < t$ is a basic feature and $L_{tot} \geq t$ is UE-optional. In one example, $t=8$. In one example, $t=10$. In one example, $t=12$. In one example, $t=14$. For $L_{tot} \geq t$, the UE reports its capability to support it or not and the NW can configure one of the parameter combinations in the table only associated with the $\{L_n\}$ that the UE supports (based on the UE capability and the basic feature).

For example, $L_{tot} \in A$ is a basic feature and $L_{tot} \in B$ is UE-optional. In one example, $A=\{4, 6, 8\}$ and $B=\{10, 12, 16\}$. In one example, $A=\{4, 6, 8, 10\}$ and $B=\{12, 16\}$. In one example, $A=\{4, 6, 8, 10, 12\}$ and $B=\{16\}$. For $L_{tot} \in B$, the UE reports its capability to support it or not and the NW can configure one of the parameter combinations in the table only associated with the $\{L_n\}$ that the UE supports (based on the UE capability and the basic feature).

In one example, the UE capability on $L_{tot}$ in each example above can be a separate capability.

In one example, the UE capability on $L_{tot}$ in each example above can be one component of a capability.

The following figures are the SLS simulation results in additional scenarios to find best linkages between $\{L_n\}$ and $(p_v, \beta)$ for each $N_{TRP}$.

Figure 18A:
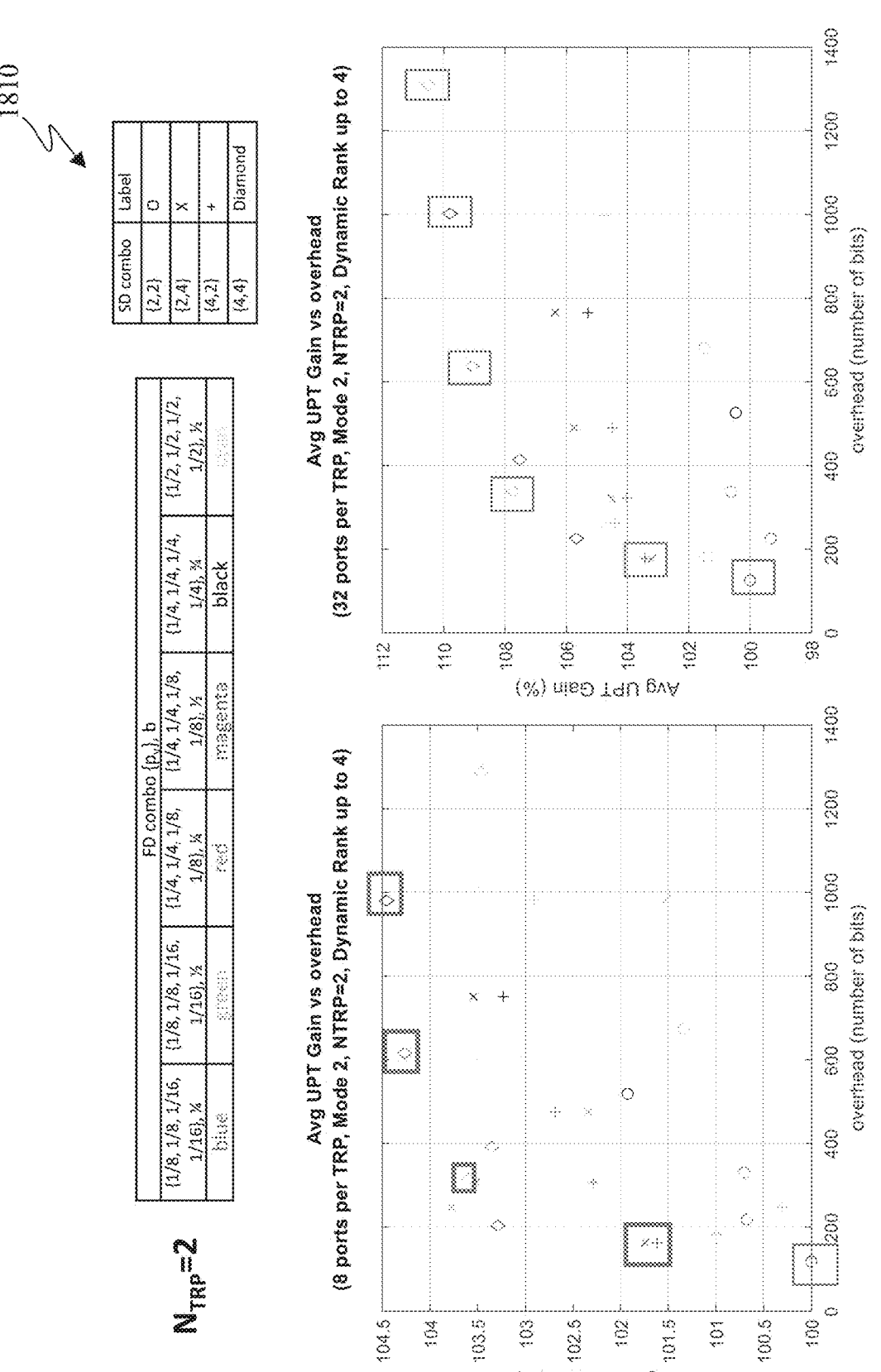
FIGS. 18A-18C illustrate example simulation results in additional scenarios to find best linkages between $\{L_n\}$ and $(p_v, \beta)$ for each $N_{TRP}$ according to embodiments of the present disclosure.
Figure 18B:
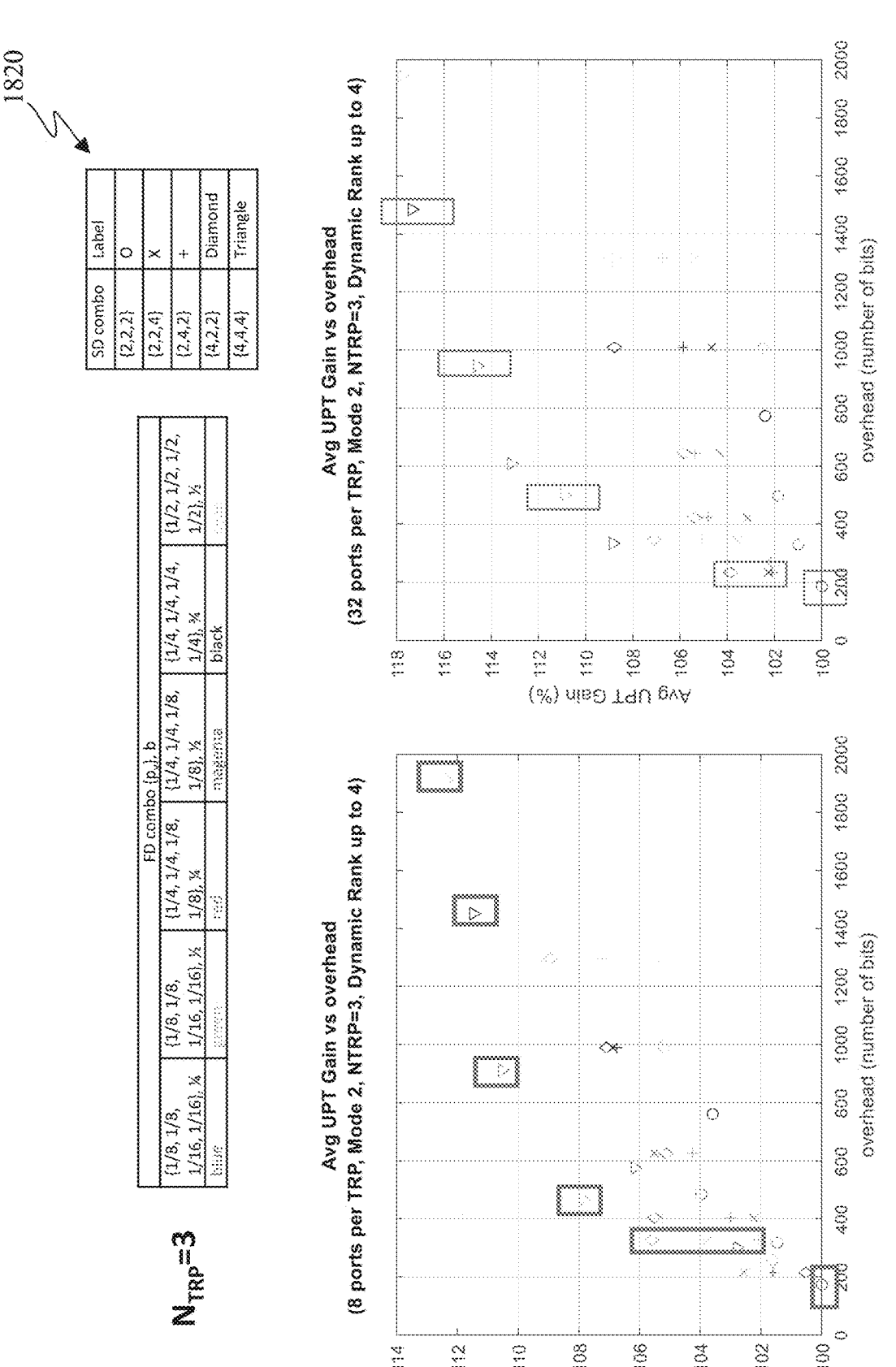
Figure 18C:
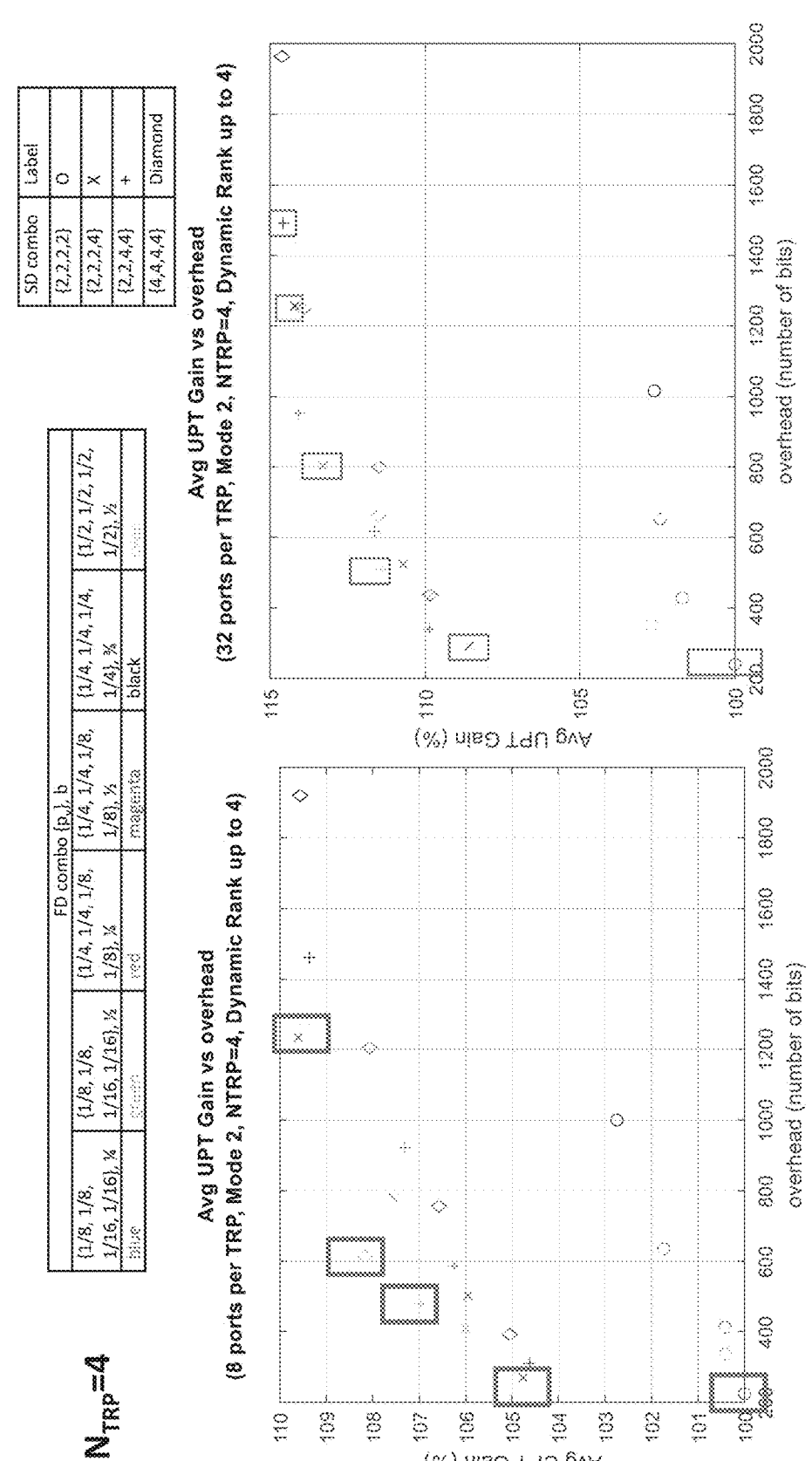

FIGS. 18A-18C illustrate example simulation results 1810, 120, and 1830 in additional scenarios to find best linkages between $\{L_n\}$ and $(p_v, \beta)$ for each $N_{TRP}$ according to embodiments of the present disclosure. The embodiment of the example simulation results 1810, 1820, and 1830 in additional scenarios to find best linkages between $\{L_n\}$ and $(p_v, \beta)$ for each $N_{TRP}$ illustrated in FIGS. 18A-18C is for illustration only. FIGS. 18A-18C do not limit the scope of this disclosure to any particular implementation of the example simulation results in additional scenarios to find best linkages between $\{L_n\}$ and $(p_v, \beta)$ for each $N_{TRP}$.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive information about a channel state information (CSI) report, the information including codebook parameters:

$N_L > 1$ combinations of values of $\{L_1, \ldots, L_{N_{TRP}}\}$ from a first table, and a value of $(p_v, \beta)$ from a second table, wherein $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors; and a processor operably coupled to the transceiver, the processor configured to determine the CSI report based on the information, wherein the transceiver is further configured to transmit the CSI report, wherein the codebook parameters are configured based on a third table that links the first and second tables.

2. The UE of claim 1, wherein a first radio resource control (RRC) parameter indicates the $N_L$ combinations of values of $\{L_1, \ldots, L_{N_{TRP}}\}$ from the first table given by:

| $N_{TRP}$ | First RRC parameter | $\{L_1, \ldots, L_{N_{TRP}}\}$ |
|---|---|---|
| 1 | A1 | {2} |
|   | A2 | {4} |
|   | A3 | {6} |
| 2 | A4 | {2, 2} |
|   | A5 | {2, 4} |
|   | A6 | {4, 2} |
|   | A7 | {4, 4} |
| 3 | A8 | {2, 2, 2} |
|   | A9 | {2, 2, 4} |
|   | A10 | {2, 4, 2} |
|   | A11 | {4, 2, 2} |
|   | A12 | {4, 4, 4} |
| 4 | A13 | {2, 2, 2, 2} |
|   | A14 | {2, 2, 2, 4} |
|   | A15 | {2, 2, 4, 4} |
|   | A16 | {4, 4, 4, 4} | wherein each of the $N_L$ combinations of values of $\{L_1, \ldots, L_{N_{TRP}}\}$ is indicated via $N_{TRP}$ and a value of the first RRC parameter that is configured from a set of values including A1, A2, . . . , and A16.

3. The UE of claim 1, wherein:

the second table comprises a first value of $p_v$ for a first rank set {1, 2} and a second value of $p_v$ for a second rank set {3, 4} and the CSI report is determined for a rank value v from one of the first and second rank sets.

4. The UE of claim 3, wherein a second radio resource control (RRC) parameter indicates a value of $(p_v, \beta)$ from the second table given by:

| Second RRC parameter | $p_v$ | | $\beta$ |
|---|---|---|---|
|  | $v \in \{1, 2\}$ | $v \in \{3, 4\}$ |  |
| B1 | $\frac{1}{8}$ | $\frac{1}{16}$ | $\frac{1}{4}$ |
| B2 | $\frac{1}{8}$ | $\frac{1}{16}$ | $\frac{1}{2}$ |
| B3 | $\frac{1}{4}$ | $\frac{1}{8}$ | $\frac{1}{4}$ |
| B4 | $\frac{1}{4}$ | $\frac{1}{8}$ | $\frac{1}{2}$ |
| B5 | $\frac{1}{4}$ | $\frac{1}{4}$ | $\frac{3}{4}$ |
| B6 | $\frac{1}{2}$ | $\frac{1}{4}$ | $\frac{1}{2}$ |
| B7 | $\frac{1}{2}$ | $\frac{1}{2}$ | $\frac{1}{2}$ | wherein the value of $(p_v, \beta)$ is indicated via a value of the second RRC parameter that is configured from a set of values including B1, B2, . . . , and B7.

5. The UE of claim 1, wherein the third table includes configurable combinations between a value of $\{L_1, \ldots, L_{N_{TRP}}\}$ and a value of $(p_v, \beta)$ marked with 'x' in the following table:

| $N_{TRP}$ | First radio resource control (RRC) parameter | Second RRC parameter | | | | | | |
|---|---|---|---|---|---|---|---|---|
|  |  | B1 | B2 | B3 | B4 | B5 | B6 | B7 |
| 1 | A1 |  |  | x | x |  |  |  |
|   | A2 |  |  | x | x | x | x |  |
|   | A3 |  |  |  | x | x |  |  |
| 2 | A4 | x |  |  |  |  |  |  |

-continued

| $N_{TRP}$ | First radio resource control (RRC) parameter | Second RRC parameter | | | | | | |
|---|---|---|---|---|---|---|---|---|
|  |  | B1 | B2 | B3 | B4 | B5 | B6 | B7 |
|   | A5 | x |  |  |  |  |  |  |
|   | A6 | x |  |  |  |  |  |  |
|   | A7 |  | x |  | x |  |  | x |
| 3 | A8 | x | x |  |  |  |  |  |
|   | A9 | x | x |  |  |  |  |  |
|   | A10 | x | x |  |  |  |  |  |
|   | A11 | x | x |  |  |  |  |  |
|   | A12 | x | x | x | x | x |  | x |
| 4 | A13 | x |  |  |  |  |  |  |
|   | A14 | x |  |  |  |  |  |  |
|   | A15 |  |  |  | x | x |  |  |
|   | A16 |  | x |  | x | x |  |  | where the first RRC parameter is associated with the first table;

the second RRC parameter is associated with the second table;

A1 corresponds to $L_1 = 2$;

A2 corresponds to $L_1 = 4$;

A3 corresponds to $L_1 = 6$;

A4 corresponds to $\{L_1, L_2\} = \{2, 2\}$;

A5 corresponds to $\{L_1, L_2\} = \{2, 4\}$;

A6 corresponds to $\{L_1, L_2\} = \{4, 2\}$;

A7 corresponds to $\{L_1, L_2\} = \{4, 4\}$;

A8 corresponds to $\{L_1, L_2, L_3\} = \{2, 2, 2\}$;

A9 corresponds to $\{L_1, L_2, L_3\} = \{2, 2, 4\}$;

A10 corresponds to $\{L_1, L_2, L_3\} = \{2, 4, 2\}$;

A11 corresponds to $\{L_1, L_2, L_3\} = \{4, 2, 2\}$;

A12 corresponds to $\{L_1, L_2, L_3\} = \{4, 4, 4\}$;

A13 corresponds to $\{L_1, L_2, L_3, L_4\} = \{2, 2, 2, 2\}$;

A14 corresponds to $\{L_1, L_2, L_3, L_4\} = \{2, 2, 2, 4\}$;

A15 corresponds to $\{L_1, L_2, L_3, L_4\} = \{2, 2, 4, 4\}$;

A16 corresponds to $\{L_1, L_2, L_3, L_4\} = \{4, 4, 4, 4\}$;

B1 corresponds to $$\{p_{v\in\{1,2\}}, p_{v\in\{3,4\}}, \beta\} = \left\{\frac{1}{8}, \frac{1}{16}, \frac{1}{4}\right\};$$

B2 corresponds to $$\{p_{v\in\{1,2\}}, p_{v\in\{3,4\}}, \beta\} = \left\{\frac{1}{8}, \frac{1}{16}, \frac{1}{2}\right\};$$

B3 corresponds to $$\{p_{v\in\{1,2\}}, p_{v\in\{3,4\}}, \beta\} = \left\{\frac{1}{4}, \frac{1}{8}, \frac{1}{4}\right\}$$

B4 corresponds to $$\{p_{v\in\{1,2\}}, p_{v\in\{3,4\}}, \beta\} = \left\{\frac{1}{4}, \frac{1}{8}, \frac{1}{2}\right\};$$

B5 corresponds to $$\{p_{v\in\{1,2\}},\ p_{v\in\{3,4\}},\ \beta\} = \left\{\frac{1}{4},\ \frac{1}{4},\ \frac{3}{4}\right\};$$

B6 corresponds to $$\{p_{v\in\{1,2\}},\ p_{v\in\{3,4\}},\ \beta\} = \left\{\frac{1}{2},\ \frac{1}{4},\ \frac{1}{2}\right\};$$

and

B7 corresponds to $$\{p_{v\in\{1,2\}},\ p_{v\in\{3,4\}},\ \beta\} = \left\{\frac{1}{2},\ \frac{1}{2},\ \frac{1}{2}\right\}.$$

6. The UE of claim 1, wherein a radio resource control (RRC) parameter indicates a value of $N_L$ from $\{1, 2, 4\}$.

7. The UE of claim 1, wherein each of the $N_{TRP}$ groups of ports corresponds to CSI reference signal (CSI-RS) antenna ports associated with a CSI-RS resource.

8. The UE of claim 1, wherein:

the UE is not expected to be configured with $N_{TRP}$ and a first radio resource control (RRC) parameter corresponding to $\{L_1, \ldots, L_{N_{TRP}}\}$ including 4 or 6, when $P_{CSI-RS}=4$, where $P_{CSI-RS}$ is a number of CSI-reference signal (CSI-RS) ports for each of $N_{TRP}$ CSI-RS resources; or the UE is not expected to be configured with $N_{TRP}$ and the first RRC parameter corresponding to $\{L_1\}=\{6\}$, when:

$$P_{CSI-RS} < 32;$$

allowed rank values for the CSI report include 3 or 4; or R=2, where R is a parameter configured with a higher-layer parameter numberOfPMI-SubbandsPerCQI-Subband.

9. A base station (BS) comprising:

a processor; and a transceiver operably coupled to the processor, the transceiver configured to:

transmit information about a channel state information (CSI) report, the information including codebook parameters:

$N_L>1$ combinations of values of $\{L_1, \ldots, L_{N_{TRP}}\}$ from a first table, and a value of $(p_v, \beta)$ from a second table, wherein $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors; and receive the CSI report that is based on the information, wherein the codebook parameters are configured based on a third table that links the first and second tables.

10. The BS of claim 9, wherein a first radio resource control (RRC) parameter indicates the $N_L$ combinations of values of $\{L_1, \ldots, L_{N_{TRP}}\}$ from the first table given by:

| $N_{TRP}$ | First RRC parameter | $\{L_1, \ldots, L_{N_{TRP}}\}$ |
|---|---|---|
| 1 | A1 | {2} |
|  | A2 | {4} |
|  | A3 | {6} |
| 2 | A4 | {2, 2} |
|  | A5 | {2, 4} |
|  | A6 | {4, 2} |
|  | A7 | {4, 4} |
| 3 | A8 | {2, 2, 2} |
|  | A9 | {2, 2, 4} |
|  | A10 | {2, 4, 2} |
|  | A11 | {4, 2, 2} |
|  | A12 | {4, 4, 4} |
| 4 | A13 | {2, 2, 2, 2} |
|  | A14 | {2, 2, 2, 4} |
|  | A15 | {2, 2, 4, 4} |
|  | A16 | {4, 4, 4, 4} | wherein each of the $N_L$ combinations of values of $\{L_1, \ldots, L_{N_{TRP}}\}$ is indicated via $N_{TRP}$ and a value of the first RRC parameter that is configured from a set of values including A1, A2, . . . , and A16.

11. The BS of claim 9, wherein:

the second table comprises a first value of $p_v$ for a first rank set $\{1, 2\}$ and a second value of $p_v$ for a second rank set $\{3, 4\}$ and the CSI report is for a rank value v from one of the first and second rank sets.

12. The BS of claim 11, wherein a second radio resource control (RRC) parameter indicates a value of $(p_v, \beta)$ from the second table given by:

| Second RRC parameter | $p_v$ | | $\beta$ |
|---|---|---|---|
|  | $v \in \{1, 2\}$ | $v \in \{3, 4\}$ |  |
| B1 | 1/8 | 1/16 | 1/4 |
| B2 | 1/8 | 1/16 | 1/2 |
| B3 | 1/4 | 1/8 | 1/4 |
| B4 | 1/4 | 1/8 | 1/2 |
| B5 | 1/4 | 1/4 | 3/4 |
| B6 | 1/2 | 1/4 | 1/2 |
| B7 | 1/2 | 1/2 | 1/2 | wherein the value of $(p_v, \beta)$ is indicated via a value of the second RRC parameter that is configured from a set of values including B1, B2, . . . , and B7.

13. The BS of claim 9, wherein the third table includes configurable combinations between a value of $\{L_1, \ldots, L_{N_{TRP}}\}$ and a value of $(p_v, \beta)$ marked with 'x' in the following table:

| $N_{TRP}$ | First radio resource control (RRC) parameter | Second RRC parameter | | | | | | |
|---|---|---|---|---|---|---|---|---|
|  |  | B1 | B2 | B3 | B4 | B5 | B6 | B7 |
| 1 | A1 |  |  | x | x |  |  |  |
|  | A2 |  |  | x | x | x | x |  |
|  | A3 |  |  | x | x |  |  |  |
| 2 | A4 | x |  |  |  |  |  |  |
|  | A5 | x |  |  |  |  |  |  |
|  | A6 | x |  |  |  |  |  |  |
|  | A7 |  | x |  | x |  |  | x |

-continued

| $N_{TRP}$ | First radio resource control (RRC) parameter | Second RRC parameter B1 | B2 | B3 | B4 | B5 | B6 | B7 |
|---|---|---|---|---|---|---|---|---|
| 3 | A8 | x | x | | | | | |
| | A9 | x | x | | | | | |
| | A10 | x | x | | | | | |
| | A11 | x | x | | | | | |
| | A12 | x | x | x | x | x | | x |
| 4 | A13 | x | | | | | | |
| | A14 | x | | | | | | |
| | A15 | | | x | x | | | |
| | A16 | | | x | x | x | | | where the first RRC parameter is associated with the first table;

the second RRC parameter is associated with the second table;

A1 corresponds to $L_1=2$;

A2 corresponds to $L_1=4$;

A3 corresponds to $L_1=6$;

A4 corresponds to $\{L_1, L_2\}=\{2, 2\}$;

A5 corresponds to $\{L_1, L_2\}=\{2, 4\}$;

A6 corresponds to $\{L_1, L_2\}=\{4, 2\}$;

A7 corresponds to $\{L_1, L_2\}=\{4, 4\}$;

A8 corresponds to $\{L_1, L_2, L_3\}=\{2, 2, 2\}$;

A9 corresponds to $\{L_1, L_2, L_3\}=\{2, 2, 4\}$;

A10 corresponds to $\{L_1, L_2, L_3\}=\{2, 4, 2\}$;

A11 corresponds to $\{L_1, L_2, L_3\}=\{4, 2, 2\}$;

A12 corresponds to $\{L_1, L_2, L_3\}=\{4, 4, 4\}$;

A13 corresponds to $\{L_1, L_2, L_3, L_4\}=\{2, 2, 2, 2\}$;

A14 corresponds to $\{L_1, L_2, L_3, L_4\}=\{2, 2, 2, 4\}$;

A15 corresponds to $\{L_1, L_2, L_3, L_4\}=\{2, 2, 4, 4\}$;

A16 corresponds to $\{L_1, L_2, L_3, L_4\}=\{4, 4, 4, 4\}$;

B1 corresponds to $$\{p_{v\in\{1,2\}}, p_{v\in\{3,4\}}, \beta\} = \left\{\frac{1}{8}, \frac{1}{16}, \frac{1}{4}\right\};$$

B2 corresponds to $$\{p_{v\in\{1,2\}}, p_{v\in\{3,4\}}, \beta\} = \left\{\frac{1}{8}, \frac{1}{16}, \frac{1}{2}\right\};$$

B3 corresponds to $$\{p_{v\in\{1,2\}}, p_{v\in\{3,4\}}, \beta\} = \left\{\frac{1}{4}, \frac{1}{8}, \frac{1}{4}\right\}$$

B4 corresponds to $$\{p_{v\in\{1,2\}}, p_{v\in\{3,4\}}, \beta\} = \left\{\frac{1}{4}, \frac{1}{8}, \frac{1}{2}\right\};$$

B5 corresponds to $$\{p_{v\in\{1,2\}}, p_{v\in\{3,4\}}, \beta\} = \left\{\frac{1}{4}, \frac{1}{4}, \frac{3}{4}\right\};$$

B6 corresponds to $$\{p_{v\in\{1,2\}}, p_{v\in\{3,4\}}, \beta\} = \left\{\frac{1}{2}, \frac{1}{4}, \frac{1}{2}\right\};$$

and

B7 corresponds to $$\{p_{v\in\{1,2\}}, p_{v\in\{3,4\}}, \beta\} = \left\{\frac{1}{2}, \frac{1}{2}, \frac{1}{2}\right\}.$$

14. The BS of claim 9, wherein a radio resource control (RRC) parameter indicates a value of $N_L$ from $\{1, 2, 4\}$.

15. The BS of claim 9, wherein each of the $N_{TRP}$ groups of ports corresponds to CSI reference signal (CSI-RS) antenna ports associated with a CSI-RS resource.

16. The BS of claim 9, wherein:

a user equipment (UE) is not expected to be configured with $N_{TRP}$ and a first radio resource control (RRC) parameter corresponding to $\{L_1, \ldots, L_{N_{TRP}}\}$ including 4 or 6, when $P_{CSI-RS}=4$, where $P_{CSI-RS}$ is a number of CSI-reference signal (CSI-RS) ports for each of $N_{TRP}$ CSI-RS resources; or the UE is not expected to be configured with $N_{TRP}$ and the first RRC parameter corresponding to $\{L_1\}=\{6\}$, when:

$$P_{CSI-RS} < 32;$$

allowed rank values for the CSI report include 3 or 4; or

R=2, where R is a parameter configured with a higher-layer parameter numberOfPMI-SubbandsPerCQI-Subband.

17. A method performed by a user equipment, the method comprising:

receiving information about a channel state information (CSI) report, the information including codebook parameters:

$N_L>1$ combinations of values of $\{L_1, \ldots, L_{N_{TRP}}\}$ from a first table, and a value of $(p_v, \beta)$ from a second table, wherein $\{L_1, \ldots, L_{N_{TRP}}\}$ is related to a number of first set of vectors associated with each of $N_{TRP}$ groups of ports, $N_{TRP}$ is a number $\geq 1$, $\beta$ is a parameter related to a maximum number of coefficients, and $p_v$ are parameters related to a second set of vectors;

determining the CSI report based on the information; and transmitting the CSI report, wherein the codebook parameters are configured based on a third table that links the first and second tables.

18. The method of claim 17, wherein a first radio resource control (RRC) parameter indicates the $N_L$ combinations of values of $\{L_1, \ldots, L_{N_{TRP}}\}$ from the first table given by:

| $N_{TRP}$ | First RRC parameter | $\{L_1, \ldots, L_{N_{TRP}}\}$ |
|---|---|---|
| 1 | A1 | {2} |
| | A2 | {4} |
| | A3 | {6} |
| 2 | A4 | {2, 2} |
| | A5 | {2, 4} |

-continued

| $N_{TRP}$ | First RRC parameter | $\{L_1, \ldots, L_{N_{TRP}}\}$ |
|---|---|---|
|  | A6 | $\{4, 2\}$ |
|  | A7 | $\{4, 4\}$ |
| 3 | A8 | $\{2, 2, 2\}$ |
|  | A9 | $\{2, 2, 4\}$ |
|  | A10 | $\{2, 4, 2\}$ |
|  | A11 | $\{4, 2, 2\}$ |
|  | A12 | $\{4, 4, 4\}$ |
| 4 | A13 | $\{2, 2, 2, 2\}$ |
|  | A14 | $\{2, 2, 2, 4\}$ |
|  | A15 | $\{2, 2, 4, 4\}$ |
|  | A16 | $\{4, 4, 4, 4\}$ | wherein each of the $N_L$ combinations of values of $\{L_1, \ldots, L_{N_{TRP}}\}$ is indicated via $N_{TRP}$ and a value of the first RRC parameter that is configured from a set of values including A1, A2, . . . , and A16.

19. The method of claim 17, wherein:
the second table comprises a first value of $p_v$ for a first rank set $\{1, 2\}$ and a second value of $p_v$ for a second rank set $\{3, 4\}$ and the CSI report is determined for a rank value v from one of the first and second rank sets.

20. The method of claim 19, wherein a second radio resource control (RRC) parameter indicates a value of $(p_v, \beta)$ from the second table given by:

| Second RRC parameter | $p_v$ | | $\beta$ |
|---|---|---|---|
|  | $v \in \{1, 2\}$ | $v \in \{3, 4\}$ | |
| B1 | $1/8$ | $1/16$ | $1/4$ |
| B2 | $1/8$ | $1/16$ | $1/2$ |
| B3 | $1/4$ | $1/8$ | $1/4$ |
| B4 | $1/4$ | $1/8$ | $1/2$ |
| B5 | $1/4$ | $1/4$ | $3/4$ |
| B6 | $1/2$ | $1/4$ | $1/2$ |
| B7 | $1/2$ | $1/2$ | $1/2$ | wherein the value of $(p_v, \beta)$ is indicated via a value of the second RRC parameter that is configured from a set of values including B1, B2, . . . , and B7.

* * * * *